(12) United States Patent
Lin et al.

(10) Patent No.: US 7,394,209 B2
(45) Date of Patent: Jul. 1, 2008

(54) LIQUID CRYSTAL DISPLAY SYSTEM WITH LAMP FEEDBACK

(75) Inventors: Yung-Lin Lin, Palo Alto, CA (US); Da Liu, Milpitas, CA (US)

(73) Assignee: 02 Micro International Limited, Grand Cayman (KY)

( * ) Notice: Subject to any disclaimer, the term of this patent is extended or adjusted under 35 U.S.C. 154(b) by 0 days.

(21) Appl. No.: 10/870,750

(22) Filed: Jun. 16, 2004

(65) Prior Publication Data

US 2005/0174818 A1 Aug. 11, 2005

Related U.S. Application Data

(63) Continuation of application No. 10/776,417, filed on Feb. 11, 2004, now Pat. No. 6,804,129.

(51) Int. Cl.
*H05B 37/02* (2006.01)

(52) U.S. Cl. .................. 315/247; 315/307; 363/98; 363/25

(58) Field of Classification Search ............. 363/16–20, 363/26, 41, 98, 131, 132, 127, 56, 15, 37, 363/97; 315/291, 224, 277, 307; 323/282–288, 323/267, 235
See application file for complete search history.

(56) References Cited

U.S. PATENT DOCUMENTS

| | | | | |
|---|---|---|---|---|
| 4,277,728 A | 7/1981 | Stevens | ...................... | 315/307 |
| 4,461,980 A | 7/1984 | Nilssen | ....................... | 315/225 |
| 4,461,990 A | 7/1984 | Bloomer | ...................... | 323/235 |
| 4,504,895 A | 3/1985 | Steigerwald | .................. | 363/17 |
| 4,535,399 A | 8/1985 | Szepesi | ....................... | 363/41 |
| 4,541,041 A * | 9/1985 | Park et al. | ...................... | 363/41 |
| 4,592,087 A | 5/1986 | Killion | ......................... | 381/68 |
| 4,626,979 A | 12/1986 | JaQuay | ........................ | 363/41 |
| 4,672,258 A | 6/1987 | Konishi | ........................ | 313/15 |
| 4,672,528 A | 6/1987 | Park et al. | ....................... | 363/98 |
| 4,682,084 A | 7/1987 | Kuhnel et al. | | |
| 4,689,819 A | 8/1987 | Killion | ......................... | 381/68 |
| 4,727,469 A | 2/1988 | Kammiller | ..................... | 363/56 |
| 4,794,506 A | 12/1988 | Hino et al. | ....................... | 363/25 |

(Continued)

FOREIGN PATENT DOCUMENTS

CN 1444332 9/2003

(Continued)

OTHER PUBLICATIONS

Chinese Encyclopedia of Electrical, pp. 564-565, Aug. 1994, Taipei Taiwan.

(Continued)

*Primary Examiner*—Rajnikant B. Patel

(57) ABSTRACT

A liquid crystal display system and CCFL power converter circuit is provided using a high-efficiency zero-voltage-switching technique that eliminates switching losses associated with the power MOSFETs. An optimal sweeping-frequency technique is used in the CCFL ignition by accounting for the parasitic capacitance in the resonant tank circuit. Additionally, the circuit is self-learning and is adapted to determine the optimum operating frequency for the circuit with a given load. An over-voltage protection circuit can also be provided to ensure that the circuit components are protected in the case of open-lamp condition.

20 Claims, 16 Drawing Sheets

U.S. PATENT DOCUMENTS

| | | | |
|---|---|---|---|
| 4,812,962 A * | 3/1989 | Witt | 430/30 |
| 4,814,692 A | 3/1989 | Baumann | 324/62 |
| 4,814,962 A | 3/1989 | Magalhaes et al. | 363/16 |
| 4,823,070 A * | 4/1989 | Nelson | 323/285 |
| 4,833,584 A | 5/1989 | Divan | 363/37 |
| 4,855,888 A | 8/1989 | Henze et al. | 363/17 |
| 4,859,912 A | 8/1989 | Lippmann et al. | 315/169.3 |
| 4,860,189 A | 8/1989 | Hitchcock | 363/132 |
| 4,864,483 A | 9/1989 | Divan | 363/37 |
| 4,870,327 A | 9/1989 | Jorgensen | 315/307 |
| 4,904,906 A | 2/1990 | Atherton et al. | 315/291 |
| 4,912,622 A | 3/1990 | Steigerwald et al. | 363/98 |
| 4,935,857 A | 6/1990 | Nguyen et al. | 363/17 |
| 4,939,429 A | 7/1990 | Rodriquez-Cavazos et al. | 315/411 |
| 4,952,849 A | 8/1990 | Fellows et al. | 315/307 |
| 4,953,068 A | 8/1990 | Henze | 363/17 |
| 4,958,108 A | 9/1990 | Jorgensen | 315/307 |
| 4,967,332 A | 10/1990 | Claydon et al. | 363/17 |
| 4,983,887 A | 1/1991 | Nilssen | 315/224 |
| 4,988,920 A | 1/1991 | Hoeksma | 315/101 |
| 4,992,919 A | 2/1991 | Lee et al. | 363/17 |
| 5,012,058 A | 4/1991 | Smith | 219/10.55 B |
| 5,017,800 A | 5/1991 | Divan | 307/66 |
| 5,027,263 A | 6/1991 | Harada et al. | 363/16 |
| 5,027,264 A | 6/1991 | DeDoncker et al. | 363/16 |
| 5,051,661 A | 9/1991 | Lee | 315/225 |
| 5,105,127 A | 4/1992 | Lavaud et al. | 315/291 |
| 5,113,334 A | 5/1992 | Tuson et al. | 363/25 |
| 5,132,888 A | 7/1992 | Lo et al. | 363/17 |
| 5,132,889 A | 7/1992 | Hitchcock et al. | 363/17 |
| 5,157,592 A | 10/1992 | Walters | 363/17 |
| 5,166,579 A | 11/1992 | Kawabata et al. | 315/209 |
| 5,198,969 A | 3/1993 | Redl et al. | 363/17 |
| 5,208,740 A | 5/1993 | Ehsani | 363/124 |
| 5,231,563 A | 7/1993 | Jitaru | 363/98 |
| 5,235,501 A | 8/1993 | Stuart et al. | 363/17 |
| 5,239,293 A | 8/1993 | Barbier | |
| 5,268,830 A | 12/1993 | Loftus, Jr. | 363/17 |
| 5,270,620 A | 12/1993 | Basch et al. | 315/291 |
| 5,285,372 A | 2/1994 | Huynh et al. | 363/132 |
| 5,287,040 A | 2/1994 | Lestician | 315/291 |
| 5,291,382 A | 3/1994 | Cohen | 363/16 |
| 5,305,191 A | 4/1994 | Loftus, Jr. | 363/17 |
| 5,311,104 A | 5/1994 | Antle | 315/307 |
| 5,315,498 A | 5/1994 | Berrios et al. | 363/98 |
| 5,363,020 A | 11/1994 | Chen et al. | 315/209 |
| 5,384,516 A | 1/1995 | Kawabata et al. | 315/160 |
| 5,402,043 A | 3/1995 | Nilssen | 315/307 |
| 5,402,329 A | 3/1995 | Wittenbreder, Jr. | 363/16 |
| 5,412,557 A | 5/1995 | Lauw | 363/37 |
| 5,416,387 A * | 5/1995 | Cuk et al. | 315/209 R |
| 5,418,703 A | 5/1995 | Hitchcock et al. | 363/17 |
| 5,420,779 A * | 5/1995 | Payne | 363/56.01 |
| 5,422,546 A | 6/1995 | Nilssen | 315/219 |
| 5,426,616 A | 6/1995 | Kajigaya et al. | |
| 5,430,632 A | 7/1995 | Meszlenyi | 363/17 |
| 5,430,641 A | 7/1995 | Kates | 363/133 |
| 5,438,242 A | 8/1995 | Simpson | 315/219 |
| 5,448,155 A | 9/1995 | Jutras | 323/285 |
| 5,448,467 A | 9/1995 | Ferreira | 363/17 |
| 5,451,041 A | 9/1995 | Greive | 271/98 |
| 5,464,836 A | 11/1995 | Camaggi et al. | 514/239.2 |
| 5,481,160 A | 1/1996 | Nilssen | 315/209 |
| 5,481,163 A | 1/1996 | Nakamura et al. | 315/308 |
| 5,486,740 A | 1/1996 | Yamashita et al. | 315/308 |
| 5,495,405 A | 2/1996 | Fujimura et al. | 363/133 |
| 5,510,974 A | 4/1996 | Gu et al. | 363/134 |
| 5,514,921 A | 5/1996 | Steigerwald | 307/125 |
| 5,546,300 A | 8/1996 | Lee et al. | 363/132 |
| 5,559,688 A | 9/1996 | Pringle | 363/89 |
| 5,583,402 A | 12/1996 | Moisin et al. | 315/307 |
| 5,606,224 A | 2/1997 | Hua | 315/121 |
| 5,615,093 A | 3/1997 | Nalbant | 363/25 |
| 5,619,104 A | 4/1997 | Eunghwa | 315/159 |
| 5,619,402 A | 4/1997 | Liu | 363/20 |
| 5,638,260 A | 6/1997 | Bees | 363/17 |
| 5,646,836 A | 7/1997 | Sadarnac et al. | 363/98 |
| 5,652,479 A * | 7/1997 | LoCascio et al. | 315/225 |
| 5,656,841 A | 8/1997 | Watanabe et al. | |
| 5,657,220 A | 8/1997 | Yan | 363/132 |
| 5,669,238 A | 9/1997 | Devers | 62/657 |
| 5,677,602 A | 10/1997 | Paul et al. | 315/224 |
| 5,684,683 A | 11/1997 | Divan et al. | 33/65 |
| 5,694,007 A | 12/1997 | Chen | 315/247 |
| 5,712,533 A | 1/1998 | Corti | 315/169.3 |
| 5,715,155 A | 2/1998 | Shahani et al. | 363/132 |
| 5,719,474 A | 2/1998 | Vitello | 315/307 |
| 5,719,759 A | 2/1998 | Wagner et al. | 363/132 |
| 5,731,652 A | 3/1998 | Shimada | 310/316 |
| 5,736,842 A | 4/1998 | Jovanivic | 323/222 |
| 5,742,495 A | 4/1998 | Barone | 363/65 |
| 5,742,496 A | 4/1998 | Tsutsumi | 363/95 |
| 5,744,915 A | 4/1998 | Nilssen | 315/209 |
| 5,748,457 A | 5/1998 | Poon et al. | 363/16 |
| 5,764,494 A | 6/1998 | Schutten et al. | 363/17 |
| 5,774,346 A | 6/1998 | Poon et al. | 363/17 |
| 5,781,418 A | 7/1998 | Chang et al. | 363/16 |
| 5,781,419 A | 7/1998 | Kutkut et al. | 363/17 |
| 5,784,266 A | 7/1998 | Chen | 363/16 |
| 5,796,598 A | 8/1998 | Norwalk et al. | 363/37 |
| 5,818,172 A | 10/1998 | Lee | 315/86 |
| 5,825,673 A | 10/1998 | Watanabe | |
| 5,825,695 A | 10/1998 | Hamaguchi | |
| 5,834,889 A | 11/1998 | Ge | 313/493 |
| 5,844,378 A | 12/1998 | LoCascio et al. | |
| 5,844,540 A | 12/1998 | Terasaki | 345/102 |
| 5,854,617 A | 12/1998 | Lee et al. | 345/102 |
| 5,856,916 A | 1/1999 | Bonnet | 363/20 |
| 5,870,298 A | 2/1999 | Hung | 363/98 |
| 5,875,103 A | 2/1999 | Bhagwat et al. | 363/17 |
| 5,880,940 A | 3/1999 | Poon | 363/20 |
| 5,886,477 A | 3/1999 | Honbo et al. | 315/209 |
| 5,886,884 A | 3/1999 | Back et al. | 363/48 |
| 5,894,412 A | 4/1999 | Faulk | 363/56 |
| 5,910,709 A | 6/1999 | Stevanovic et al. | 315/225 |
| 5,917,722 A | 6/1999 | Singh | 363/132 |
| 5,923,129 A | 7/1999 | Henry | 315/307 |
| 5,930,121 A | 7/1999 | Henry | 363/16 |
| 5,930,122 A | 7/1999 | Moriguchi et al. | 363/17 |
| 5,932,976 A | 8/1999 | Maheshwari et al. | 315/291 |
| 5,939,830 A | 8/1999 | Praiswater | 315/DIG. 4 |
| 5,946,200 A | 8/1999 | Kim et al. | 363/17 |
| 5,949,197 A | 9/1999 | Kastner | 315/291 |
| 6,002,210 A | 12/1999 | Nilssen | 315/219 |
| 6,011,360 A | 1/2000 | Gradzki et al. | 315/244 |
| 6,016,052 A | 1/2000 | Vaughn | 323/355 |
| 6,051,940 A | 4/2000 | Arun | 315/307 |
| 6,075,404 A | 6/2000 | Shindoh et al. | |
| 6,091,610 A * | 7/2000 | Garcia et al. | 363/17 |
| 6,104,146 A * | 8/2000 | Chou et al. | 315/277 |
| 6,114,814 A | 9/2000 | Shannon et al. | 315/219 |
| 6,151,232 A | 11/2000 | Furuhashi et al. | 363/97 |
| 6,198,234 B1 | 3/2001 | Henry | 315/291 |
| 6,259,615 B1 | 7/2001 | Lin | 363/98 |
| 6,271,730 B1 | 8/2001 | Abe et al. | |
| 6,376,999 B1 | 4/2002 | Li et al. | 315/307 |
| 6,396,722 B2 | 5/2002 | Lin | 363/98 |
| 6,437,550 B2 | 8/2002 | Andoh et al. | |
| 6,501,234 B2 | 12/2002 | Lin et al. | 315/307 |
| 6,552,603 B2 | 4/2003 | Ueda | |
| 6,804,129 B2 | 10/2004 | Lin | 363/98 |

| | | | |
|---|---|---|---|
| 6,815,906 B1 | 11/2004 | Aarons et al. | 315/209 |

FOREIGN PATENT DOCUMENTS

| | | |
|---|---|---|
| GB | 2213613 | 8/1989 |
| JP | 59032370 | 2/1984 |
| JP | 4-65546 | 10/1992 |
| JP | 07211472 | 8/1995 |
| JP | 08288080 | 11/1996 |
| JP | 2733817 | 1/1998 |
| JP | H11-3039 | 1/1999 |
| JP | 11146655 | 5/1999 |
| JP | 2000197368 | 7/2000 |
| JP | 2001-284464 | 10/2001 |
| WO | WO 98/09369 | 3/1998 |

OTHER PUBLICATIONS

English translation of Cancellation Brief filed by Monolithic Power Systems, Inc. in corresponding Taiwan Patent No. NI-152318, 7 pages.
English Translation of Defense Statement filed by O2 Micro International Limited in response to Cancellation Brief filed by Monolithic Power Systems, Inc. submitted on May 20, 2003, 9 pages.
English Translation of Supplementary Cancellation Brief filed my Monolithic Power Systems, Inc. submitted on Nov. 11, 2003, 19 pages.
English Translation of Supplementary Defense Statement filed by O2 Micro International Limited submitted on Jan. 19, 2004, 15 pages.
English Translation of Cancellation Brief filed by Beyond Innovation Technology Co., in corresponding Patent No. NI-152318, 12 pages.
English Translation of Abstract of Taiwan patent No. 357481, submitted by Beyond Innovation Technology Co., Ltd. in Cancellation Brief.
English Translation of Defense Statement filed by O2Micro International Limited in response to Cancellation Brief filed by Beyond Innovation Technology Co., LTD., submitted on May 18, 2004, 12 pages.
English Translation of Cancellation Brief filed by Mr. Tsan-Jung Chen in corresponding Taiwan Patent No. NI-152318, 58 pages.
English Translation of Power Electronics: Converters, Applications and Designs, pp. 10-49 to 10-50, 2 pages cited by Mr. Tsan-Jung Chen in Cancellation Brief.
English Translation of Defense Statement by O2Micro International Limited in response to Cancellation Brief filed by Mr. Tsan-Jung Chen, submitted on May 30, 2003, 14 pages.
English Translation of Supplementary Defense Statement by O2Micro International Limited in response to Cancellation Brief filed by Mr. Tsan-Jung Chen, submitted on Mar. 19, 2004, 12 pages.
Summary Translation of Taiwanese Office Action in corresponding Taiwanese Application No. 089114672N01, 2 pages.
Supplementary Defense Statement for ROC Pat Application. No. 089114672N01 Submitted on May 6, 2005; Title 'High-Efficiency Adaptive DC/AC Converter.
Supplementary Defense Statement for ROC Pat. Application. No. 089114672N02 Submitted on May 6, 2005; Titled "'High-Efficiency Adaptive DC/AC Converter".
Supplementary Defense Statement for ROC Pat. Application. No. 089114672N03 Submitted on Apr. 29, 2005; Titled "'High-Efficiency Adaptive DC/AC Converter".
Cancellation Decision of the Intellectual Property Office Patent Application No. under Cancellation: 089114672N01: Issuance Date May 26, 2005.
Cancellation Decision of the Intellectual Property Office Patent Application No. under Cancellation: 089114672N02: Issuance Date May 26, 2005.
Cancellation Decision of the Intellectual Property Office Patent Application No. under Cancellation: 089114672N03: Issuance Date May 26, 2005.
Dierberger, Ken, "A New Generation of Power MOSFET Offers Improved Performance as Reduced Cost." Application Note APT9703, Advanced Power Technology Inc., Dec. 1997: 1-12.

Andreycak, Bill, "Phase Shifted Zero Voltage Transition Design Considerations and the UC3875 PWM Controller." Application Note U-136A, Unitrode Corp., SLUA-May 1997: 1-14.
"Phase Shift Resonant Controller." Application Note US1879, UC2879, UC3879, Unitrode Corp., Jun. 1998: 1-6.
"CCFL Inverter Design AN01 Using MP1010", Microtek Inc., 1st Marketing Section, vol. 11, May 1999, Sep. 1999: 1-7.
"Zero-Voltage Switching Technique in DC/DC Converters", Kwang-Hwa Liu and Fred C. Lee, Department of Electrical Engineering, Virginia Polytechnic Institute and State University. 1986 IEEE, Reprinted with permission; PESC "86; Vancouver BC, Jun. 23-27, 1986; pp. 58-70.
"A Comparative Study of a Class of Full Bridge Zero-Voltage-Switched PWM Converters" W.Chen, F.C. Lee, M.M. Jovanovic and J.A. Sabate1995 IEEE, pp. 893-899. Virginia Power Electronics Center, The Bradley Department of Electrical Engineering.
"A Frequency/PWM Controlled Converter with Two Independently Regulated Outputs" R.A. Fisher, R.L. Steigerwald, C.F. Saj, GE Corporate Research and Development Center, HFPC May 1989 Proceedings pp. 459-471.
"A New and Improved Control technique Greatly Simplifies the Design of ZVS Resonant Inverters and DC/DC Power Supplies" Memet Nalbant, Linfinity Microelectronics (formerly Silicon General), 1995 IEEE, pp. 694-701.
"An Introduction to the Principles and Features of Resonant Power Conversion" Steve Freeland; Rockwell International Corporation, Autonetics ICBM Systems Division. pp. 20-43.
"Switching Power Supply Design" Abraham I. Pressman, Copyright 1991, by McGraw-Hill inc, Chapter 3 pp. 93-104, Chapter 13 pp. 471-492.
"Feasible Characteristics Evaluations of Resonant Tank PWM Inverter-Linked DC-DC High-Power Converters for Medical-Use High-Voltage Applications", H. Takano, J. Takahashi, M. Nakaoka. 1995 IEEE, pp. 913-919.
"Fixed-Frequency, Resonant-Switched Pulse Width Modulation with Phase-Shifted Control", Bob Mammano and Jeff Putsh, Sep. 1991, pp. 5-1 thru 5-7.
"High Density Power-Hybrid Design of a Half-Bridge Multi-Resonant Converter", Richard Farrington, et al. May 1990. Proceedings pp. 26-33.
Optimum ZVS Full-bridge DC/DC Converter with PWM Phase-Shift Control: Analysis, Design Considerations, and Experimental Results, Redl, et al. 1994 IEEE, pp. 159-165.
Unitrode Application Note U136, Phase Shifted, Zero Voltage Transition Design Considerations and the UC3875 PWM Controller Bill Andreycak, SLUA107 May 1997 pp. 1-14.
"Zero-Voltage Switching Resonant Power Conversion" Bill Andreycak, pp. A2-1 thruA2-3A.
"Resonant Mode Converter Topologies" Bob Mammano, pp. P3-1 thru P3-12.
"Small-Signal Analysis of the Zero-Voltage Switched Full-Bridge PWM Converter", V. Vlatkovic, et al. HFPC May 1990 Proceedings, pp. 262-269.
Unitrode Corporation U154, "The New UC3879 Phase-Shifted PM Controller Simplifies the Design of Zero Voltage Transition Full-Bridge Converters", Laszlo Balogh, pp. 1-8.
Shiga International Patent Office, English Translation of Citation 8 (CCFL Inverter Design AN01 Using MP1010), Monolithic Power Systems Inc. Excerpt from MSP Co. Applications Notes AN01 v.11 May 1999 pp. 1-7.
MPS Monolithic Power Systems, Inc. "Cold Cathode Fluorescent lamp" MP1010 Preliminary Data Sheer v.2 Feb. 1999 pp. 1-6.
United States District Court Eastern District of Texas Marshall Division, O2 Micro International Limited V. Monolithic Power Systems Inc, Monolithic power Systems Inc's Answer to first Amended Complaint; Counterclaims; Dec. 13, 2004 pp. 1-17.
LG Philips LCD Specification for Approval Liquid Crystal Display, LC300W01 Titled 30.0 WXGA TFT LCD pp. O2 615 009475-O2 615 009502.
LG Philips LCD Specification for Approval Liquid Crystal Display, LM181E1-H2MN Titled 18.1 SXGA TFT LCD pp. O2-615 009398-O2 615 009421.

Official Monthly Publication of the Society for Information Display, Nov. 1989 vol. 5, No. 11pp. ERI 009217-ERI 009223.
LG Philips LCD Specification for Approval Liquid Crystal Display, LB121S1-A2 Titled 12.1 SVGA TFT LCD pp. O2 615 009226-O2 615 009247.
LG Philips LCD Specification for Approval Liquid Crystal Display, BLB121S1-N Titled 12.1 SVGA TFT LCD pp. O2 615 009248-O2 615 009271.
Bi-Search International, Inc. BLB121S1-S Specification for Approval Titled 12.1 SVGA TFT LCD pp. O2 615 00272-O2 615 009295.
LG Philips LCD Specification for Approval Liquid Crystal Display, LM151X05 Titled 15.1 XGA TFT LCD pp. O2-615 009296-O2 615 009319.
LG Philips LCD Specification for Approval Liquid Crystal Display, LC151X01 Titled 15.1 XGA TFT LCD pp. O2-615 009320-O2 615 009371.
LG Philips LCD Specification for Approval Liquid Crystal Display, LM181E06 Titled 18.1 SXGA TFT LCD pp. 02-615 009372-02 615 009397.
LG Philips LCD Specification for Approval Liquid Crystal Display, LM201U1-A3 Titled 20.1 UXGA TFT LCD pp. 02-615 009422-02 615 009448.
LG Philips LCD Specification for Approval Liquid Crystal Display, LM220W1-A2MN Titled 22.0 WSXGA TFT LCD pp. 02-615 009449-02 615 009474.
Advanced Power Technology, Ken Dierberger, APT9703, Application Note "A New Generation of Power MOSFET Offers Improved Performance at Reduced Cost" pp. 1-32.
United States District Court for the Northern District of California. Case No. C-00-4071 CW and C-01-3995 CW Order Construing Disputed Claims and Terms O2 Micro International Limited v Monolithic Power Systems, Inc & Monolithic Power Systems, Inc V. O 2 Micro International Limited (Counterclaims) Dated Dec. 27, 2002.
United States District Court Northern District of California San Francisco Division. Case No. C 01 3995 JCS ADR Monolithic Power Systems Answer to the First Amended Complaint and Counterclaim O2 Micro International Limited v Monolithic Power Systems, Inc & Monolithic Power Systems, Inc V. O 2 Micro International Limited (Counterclaims) Dated Dec. 5, 2001.
United States District Court Northern District of California Oakland Division. Case No. CV-00-4071 CW and CV-01-3995 Defendant Monolithic Power Systems Final Invalidity Contentions O2 Micro International Limited v Monolithic Power Systems, Inc & Monolithic Power Systems, Inc V. O 2 Micro International Limited (Counterclaims) Dated Feb. 5, 2003.
United States District Court Northern District of California Oakland Division. Case No. CV-00-4071 CW (EDL) Defendant Monolithic Power Systems Preliminary Invalidity Contentions O2 Micro International Limited v Monolithic Power Systems, Inc & Monolithic Power Systems, Inc V. O 2 Micro International Limited (Counterclaims) Dated Jun. 7, 2002.
United States District Court Northern District of California Oakland Division. Case No. DV-00-4071 CW and CV-01-3995 CW Defendant and Counterclaimant Monolithic Power Systems Responsive Claim Construction Brief O2 Micro International Limited v Monolithic Power Systems, Inc & Monolithic Power Systems, Inc V. O 2 Micro International Limited (Counterclaims) Dated Sep. 6, 2002.
United States District Court Northern District of California Oakland Division. Case No. CV-00-4071 CW and CV-01-3995 CW Defendant and Counterclaimant Monolithic over Systems Surreply Claim Construction Brief O2 Micro International Limited v Monolithic Power Systems, Inc & Monolithic Power Systems, Inc V. O 2 Micro International Limited (Counterclaims) Dated Sep. 20, 2002.
"A New NMOS Temperature-Stable Voltage Reference", by Robert A. Blauschild et al. IEEE Journal of Solid-State Circuits. Vol. SC-13, No. 6, Dec. 1978, pp. 767-774.
"CMOS Analog Integrated Circuits Based on Weak Inversion Operation", by Eric Vittoz et al. IEEE Journal of Solid-State Circuits, vol. SC-12, No. 3, Jun. 1977, pp. 224-231.
"MOS Voltage Reference Based on Polysilicon Gate Work Function Difference", by Henri J. Oguey et al. IEEE Journal of Solid-State Circuits, vol. SC-15, No. 3, Jun. 1980, pp. 264-269.

Notice of Reasons for Rejection; Mailing date Nov. 2, 2004, Mailing No. 401750 Ref. No. F08427A1, Appl. No. 2001-008143 10 pages.
Decision of Rejection; mailing Date May 24, 2005, Mailing No. 184858 Ref No. F08427A1 Application No. 2001-008143 2 Pages.
Japanese Notification & Observation document 2001-008143 18 Pages.
English Translation of p. 38 of Citation 6; Shiga International patent Office 3 pages.
Fuji Electrics Development Specifications; 2001-008143 16 Pages.
Data Sheet (74HC/HCT4046A) Philips Semiconductors , Nov. 25, 1997.
Translation of Provisional Rejection dated Sep. 5, 2005 from the Korean Intellectual Property Office. Notice of Provisionally Rejection Application No. 2001-0001901.
English Translation Japanese Notification & Observation document 2001-008143: 29 Pages + previously submitted Japanese Notification & Observation Documents 18 pages.
Fuji Electric Chip data sheet dated Aug. 1999; SE 146960-75; SE 146944-59.
Linfinity Microelectronics LXM1640-01 "Direct Drive Quad Lamp CCFL Inverter Module" Product Data Sheet pp. 1, 24, 5. 11861 Western Ave., Garden Grove, CA 92841 Copyright 1998.
Micro Linear, Application Note 19, "Phase Modulated PWM Topology with the ML4818", By Mehmet K. Nalbant 16 pages.
Unitrode Products from Texas Instruments- "BiCMOS Cold Cathode Fluorescent Lamp Driver Controller." UCC1972/3-UCC2972/3-UCC3972/3 Oct. 1998-Revised Nov. 2000; 17 pages.
Product Innovations Electronic Design/Jul. 10, 1995, "DC-to-AC Inverter Ups CCFL Lumens per Watt", by Frank Goodenough-page 44-48.
Linfinity Microelectronics LXM1653-01 "Floating Output Drive, CCFL Inverter Modules" pp. 1-6 11861 Western Ave., Garden Grove, CA 92841 LIN Doc#: 1653.
"An Intelligent Inverter for high-power LCD backlight" By, T. Yana. F. HANzawa, Y. Watanabe, Journal of the SID Jul. 3, 1999 pp. 163-166.
BiTEK's Preliminary Invalidity Contentions for U.S. Patent 6,804129-pp. 1-5.
MPS Monolithic Power Systems Inc. MP1011 Cold Cathode Fluorescent Lamp Driver 4 pgs.
MPS Monolithic Power Systems Inc. MP1010 Cold Cathode Fluorescent Lamp Driver 6 pgs.
Fairchild Semiconductor ML4818 Phase Modulation/Soft Switching Controller Rev 1.0 Oct. 10, 2000 12 pgs.
Resonant Fluorescent Lamp Converter Provides Efficient and Compact Solution 0-7803-0982-0/93 $3.00 1993 IEEE pp. 424-431.
Integrated Circuits Unitrode Resonant Fluorescent Lamp Driver UC1871 UC2871 UC3871 6 pgs.
A New CCFL Inverter Circuit for AMLCD Panels Results in Significantly Higher Efficiency and Brightness. Mehmet Nalbant Linfinity Microelectronics AMLCD 1995 4 pgs.
OZ962-DS-010 "High Efficiency Inverter Controller" MPS 093340-MPS 093349—O2 Micro Breathing Life into Computing 10 pages.
"Resonant Inverters and Their Application to Electronics Ballasts and High Voltage Power Conversions" By, Yung-Lin LIN A Dissertation Submitted to the Faculty of the Requirements for the degree of Doctor of Philosophy in the Graduate College The University of Arizona 1996— 243 Pages.
"Class DE Inverters and Rectifiers for DC-DC Converters" by David C. Hamill; Department of Electronics Engineering University of Surrey, Guildford GU2 %xH, United Kingdom 8 Pages.
"ARC Discharge Supply Component Protection Circuitry" A.F. Ahrens and G. L. Cardwell, Space and Communications Group, Hughes Aircraft Company, El Segundo, California, pp. 326-333.
Design of a 10 kW, 500 kHz Phase-Shift Controlled Series-Resonant Inverter for Induction Heating L. Grajales, J.A. Sabate, K.R. Wang, W.A. tabisz and F.C. Lee pp. 843-849.
A Phase-Difference Angle Control-Mode PWM high-Frequency Resonant Inverters Using Static Induction-Transistors and -Thyristors M. Nakatoka, T. Maruhashi, T. Koga, S. Sugawara and T. Nishimura, Department of Electrical Engineering, Kobe University, Kobe 657 Japan 0275-9306/87/0000-0674 $1.00 1987 IEEE 674-681.

LinFinity Microelectronics LXM1592/LXM1593 Floating Output Drive Customizable CCFL Inverter Modules Preliminary Data Sheet 15 pgs.

Development of the Versatile Electronic Ballast for Metal Halide Lamps with Phase-Shift Soft-Switching Control, C.L. Tsay, H.S. Chun, L.M. Wu, K.S. Kwan Energy & Resources Laboratories Industrial Technology Research Institute Chutung Hsinchu Taiwan R.O. C. 0-7803-3544-0/96 $5.00 1996 IEEE pp. 2112-2119.

Micro Linear ML4877 Feb. 1997 Databook LCD Backlight Lamp Driver 8 pgs.

Micro Linear ML4878 Feb. 1997 Databook LCD Backlight Lamp Driver 8 pgs.

Fairchild Semiconductor Application Note 42010 George A Hall and Urs Mader, Theory and Application of the ML4874 and ML4876 LCD Backlight Controller ICs Jun. 1996 Rev. 01 Oct. 25, 2000 12 pgs.

Unitrode Application Note U-162 Ron Florello Unitrode Corporation, Driving a 35W AC Metal Halide High Intensity Discharge Lamp with the UCC3305 HID Lamp Controller 13 pgs.

Integrated Circuits Unitrode HID Lamp Controller UCC2035 UCC3305 8 pgs.

The LCC Inverter as a Cold Cathode Fluorescent Lamp Driver, Joel A, Donahue, P.E. and Mialn M. Jovanovic, Delta Power Electronics Lab, 0-7803-1456-5/94 $4.00 1994 IEEE 7 pgs.

IEEE Transactions on Industrial Electronics vol., 42, No. 1 Feb. 1995, Analysis and Design-Optimization of LCC Resonant Inverter for High-Frequency AC Distributed Power System J.A. Sabate, M.M. Jovanovic, Senior Member, IEEE F.C. Lee, Fellow, IEEE and R.T. Gean pp. 63-71.

A Low-Cost Control IC for Single-Transistor ZVS Cold-Cathode Fluorescent Lamp Inverters and DC/DC Converters, Richard Redl, ELFI S.A. Derrey-la-Cabuche CH-1756 Onnens FR Switzerland, Koji Arakawa Toko, Inc. 18 Oaza Gomigaya Tsurugashimashi Saitama 350-02 Japan 8 pgs.

Modern DC-to-DC Switchmode Power Converter Circuits, Rudolf P. Severns President Sprintime Enterprises Inc. Bloom Associates Inc. Gordon (ed) Bloom Copyright 1985 by Rudolph R. Severns and Gordon Bloom 4 pgs.

Switch Mode Power Conversion Basic Theory and Design by K.Kit Sum Chief Engineer LH Research Inc. Tustin, California. Markel Dekker inc, New York and Basel Copyright 1984 3 pgs.

EDN The Design Magazine of the Electronic Industry Feb. 15, 1996 Out in Front Whats Hot in Design Community Edited by Fran Granville. Reprinted from EDN by Cahners Publishing Company 1996 1 page.

Testing and Analysis of CS-ZVS Bases Floating and Non-Floating CCFL Inveters and Modeling of the Lamp to Panel Leakage Currents, Mehmet K. Nalbant LinFinity Microelectronics 9 pgs.

IEEE Transactions of Power Electronics vol. 13 No. 3 May 1998, Analysis, Design, and Optimization of the LCC Resonant Inverter as High-Intensity Discharge Lamp Ballast J. Marcos Alonso, Member IEEE, Cecilio Blanco, Member IEEE, Emilio Lopex, Antonio J. Calleja, Student Member, IEEE, and Manuel Rice, Member IEEE pp. 573-585.

Pulsewidth Modulation Control of Electronic Ballas for Dimming Control of Fluorescent Lamps, Christian Branas, Francsico J. Azcondo, Salvador Bracho, Department of Electronics Technology, System Engineering and Automation University of Cantabria 39005 Sanunder, Spain pp. 537-542.

Switched Mode Transistor Amplifiers M.L. Stephens Member IEEE J.P. Wittman Senior Member IEEE, Sep. 1963 p. 3.

Resonant Power Converters, Marian Kazimierczuk Wright State University, Dariusz Czarkowski University of Florida Copyright 1995 by John Wiley & Sons, Inc. 5 pgs.

LinFinity Microelectronics Infinite Power of Innovation LXM1597-01 5V CCFL iNverter Modules Preliminary Data Sheet, Copyright 1995, Rev.4 5/96 pp. 5.

Preliminary Data sheet for MP1010 MPS 003586-3591, MPS Feb. 1999.

Case No. C04 02000: *Monolithic Power Systems, Inc.* v. *02 Micro International Ltd.*—Defendants' Renewed Monions for Judgment as a Matter of Law and Conditional Motions for New Trial Document 1088 Filed Jul. 27, 2007 total 32 pages.

Case No. C04 02000: *Monolithic Power Systems, Inc.* v. *O2 Micro International Ltd.*—O2 Micro International Limited's Response to Counter-Defendant Advanced Semiconductor Manufacturing Corporation Limited's First Set of Requests for Admission Filed Jun. 28, 2006 total 14 pages.

Case No. C04 02000: *Monolithic Power Systems, Inc.* v. *O2 Micro International Ltd.*—O2 Micro International Limited's Response to Monolithic Ower Systems, Inc's First Set of Request for Admission filed Jun. 28, 2006 total 45 pages.

Case No. C04 02000CW (C06-02929CW): *Monolithic Power Systems, Inc.* v. *O2 Micro International Ltd.*, and *O2 Micro International Ltd.* v. *Monolithic Power Systems, Inc.* et al.—O2 Micro International Ltd.'s Responses and Objections to Monolithic Ower Systems, Inc., Advanced Semiconductor Manufacturing Corporation of Shanghai, Asustek Computer, Inc., and Michael Hising's First Set of Request for Admissions (Nos. 1-11) Filed Aug. 18, 2006 total 8 pages.

Case No. C04 02000CW (C06-02929CW): *Monolithic Power Systems, Inc.* v. *O2 Micro International Ltd.*, and *O2 Micro International Ltd.* v. *Monolithic Power Systems, Inc.* et al.—O2 Micro International Ltd's Responses to Counter-Defendant Advanced Semiconductor Manufacturing Corporation Limited's First Set of Request for Admission Filed Aug. 28, 2006 total 19 pages.

Case No. C04 02000CW (C06-02929CW): *Monolithic Power Systems, Inc.* v. *O2 Micro International Ltd.*, and *O2 Micro International Ltd.* v. *Monolithic Power Systems, Inc.* et al.—O2 Micro International Ltd.'s Responses and Objections to Monolithic Ower Systems, Inc.'s First Set of Requests for Admission (Nos. 1-154) Filed Aug. 28, 2006 total 53 pages.

Case No. C04 02000CW (C06-02929CW): *Monolithic Power Systems, Inc.* v. *O2 Micro International Ltd.*,—MPS's and Asustek's Opening Brief on Inequitable Conduct Filed Aug. 10, 2007 total 30 pages.

Case No. C04 02000CW (C06-02929CW): *Monolithic Power Systems, Inc.* v. *O2 Micro International Ltd.*,—Defendants' reply in Support of their Motions for Judgment as a Matter of Law or New Trial and Oppositeion to O2 Micro's Motions for Judgments as a Matter of law or a New Trial Filed Aug. 17, 2007 total 68 pages.

Case No. C04 02000CW (C06-02929CW): *Monolithic Power Systems, Inc.* v. *O2 Micro International Ltd.*,—MPS and Asustek's Reply in Support of their Inequitable Conduct Defense Filed Aug. 34, 2007 total 18 pages.

Case No. 2:04-CV-32-TJW: *O2 Micro International Limited* v. (1) *Beyond Innovation Technology Co., Ltd.*; (2) *SPI Electronic Co., Ltd.*; (3) *FSP Group* and (4) *Lien Chang Electronic Enterprise Co., Ltd.*—Joint Claim Construction and Prehearing Statement Filed Mar. 21, 2005 total 42 pages.

Case No. 2:04-CV-32-TJW: *O2 Micro International Limited* v. (1) *Beyond Innovation Technology Co., Ltd.*; (2) *SPI Electronic Co., Ltd.*; (3) *FSP Group* and (4) *Lien Chang Electronics Enterprise Co., Ltd.*—O2 Micro's Responses and Objections to Bitek's First Set of request for Admission (Nos. 1-8) and Second Set of Interrogatories (No. 19) Filed Nov. 9, 2004 total 11 pages.

Case No. 2:04-CV-32-TJW: *O2 Micro International Limited* v. (1) *Beyond Innovation Technology Co., Ltd.*; (2) *SPI Electronic Co., Ltd.*; (3) *FSP Group* and (4) *Lien Chang Electronic Entreprise Co., Ltd.*—Transcript of Trial Date: May. 15, 2006 total 51 pages.

Case No. 2:04-CV-32-TJW: *O2 Micro International Limited* v. (1) *Beyond Innovation Technology Co., Ltd.*, et al.—Videotaped Deposition of Yung-Lin Lin Date Oct. 6, 2005 total 88 pages.

Case No. 2007-1302, 1303, 1304 United States Court of Appeals for the Federal Circuit *O2 Micro International Limited* v. *Beyond Innovation Technology Co., Ltd.*; and *FSP Group* and *SPI Electronic Co., Ltd.*; and *Lien Chang Electronic Enterprise Co., Ltd* Appeals from the United States District Court for the Eastern District of Texas In 2:04-CV-32 Hon. T. John Ward—Brief of Defendant - Appellant Beyond Innovation Technology Co., Ltd. Filed Jul. 16, 2007 total 101 pages.

Case No. 2007-1302, 1303, 1304 United States Court of Appeals for the Federal Circuit *O2 Micro International Limited* v. *Beyond Innovation Technology Co., Ltd.*; and *FSP Group* and *SPI Electronic Co., Ltd.*; and *Lien Chang Electronic Enterprises Co., Ltd* Appeals from the United States District Court for the Eastern District of Texas In 2:04-CV-32 Hon. T. John Ward—Opening Brief of Appellants FSP Grouop and SPI Electronic Co., Ltd (Now Named FSP Technology Inc.) Filed Jul. 16, 2007 total 75 pages.
Case No. 2007-1302, 1303, 1304 United States Court of Appeals for the Federal Circuit *O2 Micro International Limited* v. *Beyond Innovation Technology Co., Ltd.*; and *FSP Group*and *SPI Electronic Co., Ltd.*; and *Lien Chang Electronic Enterprise Co., Ltd*Appeals fromn the United States District Court for the Eastern District of Texas In 2:04-CV-32 Hon. T. John Ward—Principal Brief of Defendant-Appellant Lien Chang Electronic Enterprise Co., Ltd. Filed Jul. 16, 2007 total 66 pages.
Case No. 2:04-cv-323-TJW: *O2 Micro International Limited* v. *Samsung Electronics Co., Ltd.*—Joint Claim Construction and Pre-Hearing Statement in Complaince with PLR-4-3 Filed Jan. 9, 2006 total 39 pages.
Case No. 2:04-cv-323-TJW: *O2 Micro International Limited* v. *Samsung Electronics Co., Ltd.* and *Samsung Electronics America, Inc.*—Defendants Samsung Electronics Co. Ltd. and Samsung Electronics America, Inc.'s Supplemental Preliminary Invalidity Contentions Filed Sep. 1, 2006 total 315 pages.
Case No. 2:04-cv-323-TJW: *O2 Micro International Limited* v. *Samsung Electronics Co., Ltd.* and *Samsung Electronics America, Inc.*—Deposition of Yung-Lin Lin vol. II Date: Jan. 30, 2007 total 120 pages.
Case No. 4:06-CV-02929-CW (C04-2000CW): *O2 Micro International Limited* v. *Monolithic Power Systems, Inc.* and *Monolithic Power Systems, Inc.* v. *O2 Micro International Limited*: Jury Trial Transcript of Proceedings Date: May 14, 2007 vol. 9 pp. 1528 - 1696 total 144 Pages.
Case No. 4:06-CV-02929-CW (C04-2000CW): *O2 Micro International Limited* v. *Monolithic Power Systems, Inc.*, et. al,—Michael Hisng's Supplemental Invalidity Contentions and Monolithic Power Systems, Inc's and Advanced Semiconductor Manufacturing Corporation Ltd.'s Second Supplemental Invalidity Contentions filed Aug. 7, 2006 total 524 pages.
Case No. 4:06-CV-02929-CW (C04-2000CW): *O2 Micro International Limited* v. *Monolithic Power Systems, Inc.*, et al.,—Michael Hisng's, Monolithic Power Systems, Inc's, Asustek Computer Inc's, and Advanced Semiconductor Manufacturing Corporation Ltd.'s Final Invalidility Contentions, Certificate of Service and MPS, Asustek, ASMC, and Compal's Disclosure Pursuant to 35 U.S.C §282 and Exhibits Filed Aug. 24, 2007 total 539 pages.
Case No. 2:05-CV-0323 (TJW): *O2 Micro International Limited* v. *Hon Hai Precision Industry Co., Ltd.* a/k/a *Foxconn*and *Ambit Microsystems Corporation*—Hon Hai Precision Industry Co., Ltd.'s Updated Preliminary Invalidity Contentions and Exhibits Filed Sep. 15, 2006 total 853 pages.
Case No. 2:05-CV-0323 (TJW): *O2 Micro International Limited* v. *Hon Hai Precision Industry Co., Ltd.* a/k/a *Foxconn*and *Ambit Microsystems Corporation*—O2 Micro International Ltd.'s Objections and Responses to Defendant's First Set of Requests for Admissions filed May 16, 2007 total 70 pages.
Case No. 2:05-CV-0323 : *O2 Micro International Limited* v. *Hon Hai Precision Industry Co., Ltd.* et al.— ORDER Document 165 Filed Jul. 31, 2007 total 1 page.
Case No. 2:05-CV-0323 (TJW): *O2 Micro International Limited* v. *Hon Hai Precision Industry Co., Ltd.* a/k/a *Foxconn*and *Ambit Microsystems Corporation*—Videotaped Deposition of Yung-Lin Lin Date: Mar. 23, 2007 total 108 pages.
Case No. 2:03-CV-00007-TJW: *O2 Micro International Limited* v. (1) *Sumida Corporation*and (2) *Taiwan Sumida Electronics Inc.*—Defendant Taiwan Sumida Electronics Electronics, Inc.'s Preliminary Invalidity Contentions filed Sep. 2, 2004 total 230 pages.
Case No. 2:03-CV-00007-TJW: *O2 Micro International Limited* v. (1) *Sumida Corporation*and (2) *Taiwan Sumida Electronics Inc.*—O2 Micro International Limited's Responses to Defendant Taiwan Sumida Electronics, Inc.'s First Set of Requests for Admissions Filed May 16, 2007 total 21 pages.
Case No. 2:03-CV-00007-TJW: *O2 Micro International Limited* v. (1) *Sumida Corporation*and (2) *Taiwan Sumida Electronics Inc.*—Transcript of Trial Date Nov. 16, 2005 total 120 pages.
Case No. 2006-1411, -1436: United States Court of Appeals for Federal Circuit *O2 Micro International Limted* vs. *Taiwan Sumida Electronics, Inc.* Appeals from the United States District Court for the Eastern District of Texas in Case No. 2:03-CV-00007, Judge T. John Ward.—Appellant Taiwan Sumida Electronics, Inc.'s Reply Brief Filed Feb. 28, 2007 total 40 pages.
Case No. 2006-1411, -1436: United States Court of Appeals for The Federal Circuit *O2 Micro International Limited* vs. *Taiwan Sumida Electronics, Inc.* Appeals from the United States District Court for the Eastern District of Texas in Case No. 2:03-CV-0007, Judge T. John Ward.—Brief for Defendant-Appellant Filed: Oct. 3, 2006 total 129 pages.
Case No. 2:05-CV-00211-TJW: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc.*—Rohm Co., Ltd.'s Invalididty Contentions Date Jul. 2, 2007 total 397 pages.
Case No. 2:05-CV-00211-TJW: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc. Sony Corporation and Sony Electronics Inc.* v. *Microsemi Corporation*—Microsemi Corporations' Preliminary Invalidity Contentions Regarding U.S. Patent Nos. 6,804,129, 6,259,615 and 6,396,722 Filed Jul. 2, 2007 total 1278 pages.
Case No. C04 02000: *Monolithic Power Systems, Inc.* v. *O2 Micro International Ltd.*—Trial Exhibit "Development of the Versatile Electronic Ballast for Metal Halide Lamps with Phase-Shift Soft-Switching Control" by C.L. Tsay et, al. p.p. MPS '129001108 to MPS '129 001115 total 8 pages.
Nalbant—Phase Modulated PWM Topology with the ML4818, Micro Linear Application Note 42026 Date: Jun. 1996 total 16 pages.
Inventor: Nagai—Projector Device Patent Abstracts of Japan Publication No.: 05-113604 Date of publication: May 7, 1993 total 20 pages.
Inventor: Koda, Takashima—Lighting Device Patent Abstract of Japan Publication No.: 64-014895 Date of publication: Jan. 19, 1989 total 15 pages.
Inventor: Koda, Takashima—Lighting Apparatus European Patent Application Publication No.: 0298934A1 Date of publication: Nov. 1, 1989 total: 14 pages.
Inventor: Takehara Cold-Cathode Tube Lighting Apparatus using Piezoelectric Transformer, Patent Abstract of Japan Publication No. 08-138876 Publication Date: May 31, 1996 total 25 pages.
Inventor: Ishikawa, Tanaka, Hirata—Retrieving Device Patent Abstract of Japan ublication No. 04-085672 Date of Publication: Mar. 18, 1992 total 1 page.
Inventor Nishimura, Kouoka - Solid-Liquid Recovery Device Patent Abstract of Japan Publication No. 06-050297 Date of Publication Date: Feb. 22, 1994 total 16 pages,
T.H. Yu et al.,—Comparisons Among Self-Excited Parallel Resonant, Series Resonant and Current-Fed Push-Pull Electronic Ballasts, IEEE 1994 (MPS trail exhibit '129 000914-000920) total 7 pages.
Products Highlights—DC/AC Inverter Improves Lighting Efficiency, Electronic Products Apr. 1996 total 1 page.
Raab—Analysis of Idealized Class-D Power Amplifiers, Green Mountain Radio Researc Company, 1982 total 21 pages.
Roddam—Transistor Inverters and Converters, Iliffe Books Ltd., 1963 MPS trail exhibit MPS'722000191-197 total 7 pages.
LMX1597-01 Preliminary Data Sheet Linfinity Microelectronics May 1996 (MPS trial exhibit MPS '722 000205-209) total 5 pages.
Linfinity Brochure Referencing Lin, 1997 (MPS trail exhibit MPS' 722 000203-204) total 2 pages.
Lin—Resonant Inverters and Their Applications to Electronic Ballasts and High Voltage Power Conversions University of Arizona 1996 total 246 pages.
Case No. C04 02000: *Monolithic Power Systems, Inc.* v. *O2 Micro International Ltd.*—Complaint for Declaratory Judgement Document 1, filed May 20, 2004 total 6 pages.
Case No. 4:04-cv-02000: *Monolithic Power Systems, Inc.* v. *O2 Micro International.*—Answer to O2 Micro's First Amended Counterclaim Document 22 Sep. 14, 2004 total 5 pages.
Case No. 4:04-cv-02000-CW: *Monolithic Power Systems, Inc.* v. *O2 Micro International Ltd.*—Motion and Brief in Support of Monolithic Power Systems' Motion for Summary Judgment that the Claims of the O2 Micro '722 Patent Are Not Valid Document 132 total 26 pages.

Case No. 4:04-cv-02000-CW: *Monolithic Power Systems, Inc.* v. *O2 Micro International Ltd.*—Reply in Support of Monolithic Power Systems' motion for Summary Judgment that the Claims of the O2 Micro '722 Patent Are Not Valid Document 161 Filed Apr. 11, 2006 total 17 pages.

Case No. 4:04-cv-02000-CW; *Monolithic Power Systems, Inc.* v. *O2 Micro International Ltd.*—Joint Claim Construction and Preheating Statement [Patent L.R.4-3] and Exhibit A-J Document 172 Filed Apr. 20, 2006 total 237 pages.

Case No. 4:04-cv-02000-CW; *Monolithic Power Systems, Inc.* v. *O2 Micro International Ltd.*—Monolithic Power Systems, Inc.'s First Amended Answer to O2 Micro International Limited's First Amended Counterclaim Document 286 Filed Aug. 3, 2006 total 12 pages.

Case No. 4:04-cv-02000-CW (consolidated with C 06-2929): *Monolithic Power Systems, Inc.* v. *O2 Micro International Ltd.*—Monolithic Power Systems, Inc.'s, Michael Hisng's, Advanced Semiconductor Manufacturing Company, Ltd.'s, Asustek computer, Inc.'s, and Compal Electronics, Inc.'s (1) Motion for Summary Judgment, (2) Oppositeion to Motion for Summary Judgment, and (3) Claim Construction Brief Document 363-1 Filed Sep. 1, 2006 total 48 pages.

Case No. 4:04-cv-02000-CW (consolidated with C 06-2929); *Monolithic Power Systems, Inc.* v. *O2 Micro International Ltd.*—O2 Micro International Limited's (1) Reply in Support of Motion for Summary Judgment, (2) Reply Claim Construction Brief and (3) Oppositeion to Defendants' Motions for Summary Judgment Document 417 Filed Seo. 15, 2006 total 40 pages.

Case No. 4:04-cv-02000-CW (consolidated with C 06-2929): *Monolithic Power Systems, Inc.* v. *O2 Micro International Ltd.*—Monolithic Power Systems, Inc.'s, Michael Hisng's, Advanced Semiconductor Manufacturing Company, Ltd.'s, Asustek Computer, Inc.'s, and Compal Electronics, Inc.'Reply Memorandum in Supoort of Motion for Summary Judment Document 504 Filed Sep. 29, 2006 total 27 pages.

Case No. 4:04-cv-02000-CW (consolidated with C 06-2929): *Monolithic Power Systems, Inc.* v. *O2 Micro International Ltd.*—Order on Claim Construction and Cross-Motions for Summary Judgment Document 741 Filed Feb. 8, 2007 total 30 pages.

Case No. 4:04-cv-02000-CW (consolidated with C 06-2929): *Monolithic Power Systems, Inc.* v. *O2 Micro International Ltd.*—Monolithic Power Systems, ASMC, and Asustek's Motion for Leave to File a Motion for Reconsideration of Denying MPS' Motion for Summary Judgment of Invalidity of the '722 Patent and Denying Asustek's Motion foe Summary Judgment Document 778 Filed Mar. 1, 2007 total: 10 pages.

Case No. 4:04-cv-02000-CW (consolidated with C 06-2929): *Monolithic Power Systems, Inc.* v. *O2 Micro International Ltd.*—Civil L.R. 7-9(B)(2) Motion for Reconsideration of Claim Construction Ruling and for Further Construction in View of New Intrinsic Evidence Submitted in Pending Reexamination Proceedings Document 804 Filed Mar. 15, 2007 total 13 pages.

Case No. 4:04-cv-02000-CW (consolidated with C 06-2929): *Monolithic Power Systems, Inc.* v. *O2 Micro International Ltd.*—Asustek's Motion for Partial Reconsideration of Order Denying its Motion for Summary Judgment Document 808 Filed Mar. 19, 2007 total 5 pages.

Case No. 4:04-cv-02000-CW (consolidated with C 06-2929): *Monolithic Power Systems, Inc.* v. *O2 Micro International Ltd.*—Reply in Support of Defendants' Motion for Reconsideration of Order on Claim Construction Document 818 Filed Mar. 27, 2007 total 19 pages.

Case No. 4:04-cv-02000-CW (consolidated with C 06-2929): *Monolithic Power Systems, Inc.* v. *O2 Micro International Ltd.*—Corrected Reply in Support of Defendants' Motion for Reconsideration of Order on Claim Construction Document 821 Filed Mar. 27, 2007 total 19 pages.

Case No. 4:04-cv-02000-CW (consolidated with C 06-2929): *Monolithic Power Systems, Inc.* v. *O2 Micro International Ltd.*—Reply to O2 Micro's Opposition to Asustek Computer, Inc.'s Motion for Partial Reconsideration of Order Denying Motion for Summary Judgment Document 824 Filed Mar. 28, 2007 total 8 pages.

Case No. 4:04-cv-02000-CW (consolidated with C 06-2929): *Monolithic Power Systems, Inc.* v. *O2 Micro International Ltd.*—Defendants' Monolithic Power Systems, ASMC, Asustek, Compal, and Michael Hisng's Discovery Designations Document 850 Filed Apr. 10, 2007 total 8 pages.

Case No. 4:04-cv-02000-CW (consolidated with C 06-2929): *Monolithic Power Systems, Inc.* v. *O2 Micro International Ltd.*—Joint Pretrial Conference Statement (Jury Trial) Document 857 Filed Apr. 10, 2007 total 41 pages.

Case No. 4:04-cv-02000-CW (consolidated with C 06-2929): *Monolithic Power Systems, Inc.* v. *O2 Micro International Ltd.*—Defendants' Motion for a Determination as a Matter of Law that O2 Micro Has No Evidence of the Required Nexus Between the Asserted Patent Claims and (1) The Commercial Success of its Products, (2) Copying; or (3) Any Other Secondary Consideration of Non-Obviousness Document 998 Filed May 9, 2007 total 8 pages.

Case No. 4:04-cv-02000-CW (consolidated with C 06-2929): *Monolithic Power Systems, Inc.* v. *O2 Micro International Ltd.*—Defendants Monolithic Power Systems, ASMC, Asustek, Compal's Conditional Motion for Judgment as a Matter of Law of Invalidity due to MPS's Prior Invention Date; Motion to Strike Testimony and Evidence Document 1002 Filed May 10 2007 total 10 pages.

Case No. 4:04-cv-02000-CW (consolidated with C 06-2929): *Monolithic Power Systems, Inc.* v. *O2 Micro International Ltd.*— Motion for Judgment as a Matter of Law that the Asserted Claims of the '722 Patent Are Obvious Document 1009 Filed May 10, 2007 total 6 pages.

Case No. 4:04-cv-02000-CW (consolidated with C 06-2929): *Monolithic Power Systems, Inc.* v. *O2 Micro International Ltd.*—O2Micro International Limited's Proposed Construction of "Phase Overlap" Document 1015 Filed May 10, 2007 total 3 pages.

Case No. 4:04-cv-02000-CW (consolidated with C 06-2929): *Monolithic Power Systems, Inc.* v. *O2 Micro International Ltd.*—Defendants' Oppositeion to Motion to Preclude Reference to OZ Datasheets or Products as Prior Art Document 1033-1 Filed May 13, 2007 total 4 pages.

Case No. 4:04-cv-02000-CW (consolidated with C 06-2929): *Monolithic Power Systems, Inc.* v. *O2 Micro International Ltd.*—Verdict Form Document 1045 Filed May 15, 2007 total 5 pages.

Case No. 4:04-cv-02000-CW (consolidated with C 06-2929): *Monolithic Power Systems, Inc.* v. *O2 Micro International Ltd.*—Expert Report of Mark N. Horenstein, PH.D., P.E. May 5, 2006 total 147 pages.

Case No. 4:04-cv-02000-CW (consolidated with C 06-2929): *Monolithic Power Systems, Inc.* v. *O2 Micro International Ltd.*—Expert Report of Jonathan R. Wood, May 5, 2006 total 78 pages.

Case No. 4:04-cv-02000-CW (consolidated with C 06-2929): *Monolithic Power Systems, Inc.* v. *O2 Micro International Ltd.*—Expert Report of Lawrence J. Goffney May 5, 2006 total 52 pages.

Case No. 4:04-cv-02000-CW (consolidated with C 06-2929): *Monolithic Power Systems, Inc.* v. *O2 Micro International Ltd.*—Expert Report of the Honorable Gerald J. Mossinghoff, May 5, 2006 total 48 pages.

Case No. 4:04-cv-02000-CW (consolidated with C 06-2929): *Monolithic Power Systems, Inc.* v. *O2 Micro International Ltd.*—U.S. District Court Northern District of California Docket Sheet for Case#: 4:05-CV-2000 last entry date Jun. 25, 2007 total 185 pages.

Case No. 4:04-cv-02000-CW (consolidated with C 06-2929): *Monolithic Power Systems, Inc.* v. *Micro International Ltd.*—Monolithic Power Systems, Inc.' and Advanced Semiconductor Manufacturing Corporation Ltd.' Supplemental Invalidity Contentions Apr. 5, 2006 total 296 pages.

Case No. 4:04-cv-02000-CW (consolidated with C 06-2929): *Monolithic Power Systems, Inc.* v. *Micro International Ltd.*—MPS, Asustek, ASMC, and Compal's Disclosure Pursuant to 35 U.S.C§ 282 Mar. 30, 2007 total 14 pages.

Case No. 2:04-CV-359-TJW: *O2 Micro International Limited* v. *Monolithic Power Systems, Inc.*—Complaint for Patent Infringement Document 1, Filed Oct. 12, 2004 total 26 pages.

Case No. 2:04CV-359-TJW: *O2 Micro International Limited* v. (1) *Monolithic Power Systems, Inc.*; (2) *Compal Electronics, Inc.*; (3) *Compal Information (Kunshan) Co., Ltd.*; (4) *Compal Electronics Technology (Kunshan) Co., Ltd.*, (5) *Asustek Computer Inc.*; (6) *Asustek Computer (Suzhou) Co., Ltd.*; (7) *Asustech (Suzhou) Co.,*

Ltd.; (8) *Advanced Semiconductor Manufacturing Corporation Limited*—First Amended Cmoplaint for Patent Infringement Document 9-1 Filed Dec. 6, 2004 total 10 pages.
Case No. 2:04-CV-359-TJW: *O2 Micro International Limited* v. *Monolithic Power Systems, Inc.*—Monolithic Power Systems, Inc. 'sAnswer to First Amended Complaint; Counterclaims Document 12 Filed Dec. 13, 2004 total 17 pages.
Case No. 2:04-CV-359-TJW: *O2 Micro International Limited* v. (1) *Monolithic Power Systems, Inc.*; (2) *Compal Electronics, Inc.*; (3) *Compal Information (Kunshan) Co., Ltd.*; (4) *Compal Electronics Technology (Kunshan) Co., Ltd.*, (5) *Asustek Computer Inc.*; (6) *Asustek Computer (Suzhou) Co., Ltd.*; (7) *Asustech (Suzhou) Co., Ltd.*; (8) *Advanced Semiconductor Manufacturing Corporation Limited Compal Electronics, Inc.* v. *Monolithic Power Systems, Inc.*; *Delta Electronics, Inc.*; *Delta Products Corporation*—Compal Electronics, Inc.'s First Amended Answer to Plaintiff's First Amended Complaint for Patent Infringement Document 53 Filed Aug. 29, 2005 total 21 pages.
Case No. 2:04-CV-359-TJW: *O2 Micro International Limited* v. (1) *Monolithic Power Systems, Inc.*; (2) *Compal Electronics, Inc.*; (3) *Compal Information (Kunshan) Co., Ltd.*; (4) *Compal Electronics Technology (Kunshan) Co., Ltd.*, (5) *Asustek Computer Inc.*; (6) *Asustek Computer (Suzhou) Co., Ltd.*; (7) *Asustech (Suzhou) Co., Ltd.*; (8) *Advanced Semiconductor Manufacturing Corporation Limited*; and (9) Michael Hising—Second Amended Complaint for Patent Infringement and Unfair Competition Document 112 Filed Nov. 18, 2005 total 12 pages.
Case No. 2:04-CV-359-TJW: *O2 Micro International Limited* v. (1) *Monolithic Power Systems, Inc.*; (2) *Compal Electronics, Inc.*; (3) *Compal Information (Kunshan) Co., Ltd.*; (4) *Compal Electronics Technology (Kunshan) Co., Ltd.*, (5) *Asustek Computer Inc.*; (6) *Asustek Computer (Suzhou) Co., Ltd.*; (7) *Asustech (Suzhou) Co., Ltd.*; (8) *Advanced Semiconductor Manufacturing Corporation Limited*; and (9) Michael Hising *Compal Electronics, Inc.* v. *Monolithic Power Systems, Inc.*, (10) *Delta Electronics, Inc.*; and (11) *Delta Products Corporation*—Compal Electronics, Inc.,'s Answer to Plaintiff O2Micro International Limited's Second Amended Complaint Document 117-1 Filed Dec. 2, 2005 total 19 pages.
Case No. 2:04-CV-359-TJW: *O2 Micro International Limited* v. (1) *Monolithic Power Systems, Inc.*; (2) *Compal Electronics, Inc.*; (3) *Compal Information (Kunshan) Co., Ltd.*; (4) *Compal Electronics Technology (Kunshan) Co., Ltd.*, (5) *Asustek Computer Inc.*; (6) *Asustek Computer (Suzhou) Co., Ltd.*; (7) *Asustech (Suzhou) Co., Ltd.*; and (8) *Advanced Semiconductor Manufacturing Corporation Limited*—Joint Claim Construction and Prehearing Statement and Exhibit A-F Document 120 Filed Dec. 2, 2005 57 total pages.
Case No. 2:04-CV-359-TJW: *O2 Micro International Limited* v. *Monolithic Power Systems, Inc.* et al.,—Monolithic Power Systems, Inc.' Answer to Delta Electronics, Inc.'s Cross-Complaint, Counterclaim Against Delta Electronics, Inc., and Third Party Complaint Against O2 Micro International Limited Document 125 Filed Dec. 19, 2005 total 15 pages.
Case No. 2:04-CV-359-TJW: *O2 Micro International Limited* v. *Monolithic Power Systems, Inc.* et al., *Compal Electronics, Inc.* v. *Monolithic Power Systems, Inc.*; *Delta Electronics, Inc.*; *Delta Products Corporation Delta Electronics, Inc.* v. *Monolithic Power Systems, Inc.* and *Compal Electronics, Inc.*,—Monolithic Power Systems, Inc.'s Amended Answer to Delta Electronics, Inc.'s Cross-Complaint, Amended Counterclaim Against Delta Electronics, Inc. and Amended Third Party Complaint Against O2 Micro International Limited Document 139 Filed Jan. 9, 2006 total 16 pages.
Case No. 2:04CV-359-TJW: *O2 Micro International Limited* v. *Monolithic Power Systems, Inc.* et al.,—Defendant Monolithic Power Systems, Inc.'s Answer to Second Amended Complaint; Counterclaims Document 144 Filed Jan. 9, 2006 total 23 pages.
Case No. 2:04-CV-359-TJW: *O2 Micro International Limited* v. *Monolithic Power Systems, Inc.* et al.,—Defendant Michael Hising's Answer to Second Amended Complaint Document 145 Filed Jan. 9, 2006 total 11 pages.
Case No. 2:04CV-359-TJW: *O2 Micro International Limited* v. *Monolithic Power Systems, Inc.* et al.,—Defendants' Responsive Claim Construction Brief Document 149 Filed Jan. 17, 2006 total 38 pages.

Case No. 2:04-CV-359-TJW: *O2 Micro International Limited* v. (1) *Monolithic Power Systems, Inc.*; (2) *Compal Electronics, Inc.*; (3) *Compal Information (Kunshan) Co., Ltd.*; (4) *Compal Electronics Technology (Kunshan) Co., Ltd.*, (5) *Asustek Computer Inc.*; (6) *Asustek Computer (Suzhou) Co., Ltd.*; (7) *Asustech (Suzhou) Co., Ltd.*; (8) *Advanced Semiconductor Manufacturing Corporation*—Plaintiff O2 Micro International Limited's Replay Claim Construction Brief Document 163 Filed Jan. 26, 2006 total 38 pages.
Case No. 2:04-CV-359-TJW: *O2 Micro International Limited* v. *Monolithic Power Systems, Inc.* et al.,—Motion and Brief in Support of Asustek Computer, Inc.'s Motion for Summary Judgement Document 169 Filed Feb. 3, 2006 total 30 pages.
Case No. 2:04CV-359-TJW: *O2 Micro International Limited* v. *Monolithic Power Systems, Inc.* et al.,—Reply in Support of Asustek Computer, Inc.'s Motion for Summary Judgement Document 196 Filed Mar. 10, 2006 total 20 pages.
Case No. 2:04CV-359-TJW: *O2 Micro International Limited* v. *Monolithic Power Systems, Inc.* et al.,—Michael Hising's Preliminary Invalidity Contentions and Monolithic Power Systems, Inc.'s, Asustek Computer Inc.', and Advanced Semiconductor Manufacturing Corporation Ltd.' Supplemental Invalidity Contentions Mar. 31, 2006 total 31 pages.
Case No. 2:04CV-359-TJW: *O2 Micro International Limited* v. *Monolithic Power Systems, Inc.* et al.,—U.S. District Court Eastern District of Texas (Marshall) Civil Docket for Case#:2:04-CV-00359-TJW last entry date: May 8, 2006 total 30 pages.
Case No. 2:04-CV-32-TJW: *O2 Micro International Limited* v. (1) *Beyond Innovation Technology Co., Ltd.*; (2) *SPI Electronic Co., Ltd.*; (3) *FSP Group* and (4) *Lien Chang Electronic Enterprise Co., Ltd.*—Complaint for Patent Infringement Document 1 Filed Jan. 30, 2004 total 6 pages.
Case No. 2;04-CV-32-TJW: *O2 Micro International Limited* v. (1) *Beyond Innovation Technology Co., Ltd.*; (2) *SPI Electronic Co., Ltd.*; (3) *FSP Group* and (4) *Lien Chang Electronic Enterprise Co., Ltd. SPI Electronic Co. Ltd.* v. *O2 Micro International Limited*—SPI'S Answer to Complaint and Counterclaims Document 6 Filed May 26, 2004 total 7 pages.
Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd. Beyond Innovation Technology Co., Ltd.*, and *Lien Chang Electronic Eneterprise Co., Ltd.*v. *O2 Micro Internal Limited*—Answer and Counterclaim of Defendants Beyond Innovation Technology Co., Ltd. and Lien Chang Electronic Enterprise Co., Ltd. Document 12 Filed Jul. 8, 2004 total 12 pages.
Case No. 2:04-CV-32-TJW: *O2 Micro International Limited* v. *Beyond Innovation Technology Co., Ltd,; SPI Electronic Co., Ltd.; FSP Group* and *Lien Chang Electronic Enterprise Co., Ltd. Beyond Innovation Technology Co., SPI*, and *Lien Chang Electronic Enterprise Co., Ltd.* v. *O2 Micro Internal Limited*—First Amended Complaint for Patent Infringement Document 47 Filed Nov. 17, 2004 total 8 pages.
Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—Answer to First Amended Complaint and Amended Counterclaims Document 49 Filed Dec. 2, 2004 total 14 pages.
Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd. Beyond Innovation Technology Co., Ltd.*, and *Lien Chang Electronic Enterprise Co., Ltd.* v. *O2 Micro Internal Limited*—Answer to First Amended Complaint and Counterclaim of Defendant Beyond Innovation Technology Co., Ltd. Document 50 Filed Dec. 2, 2004 total 21 pages.
Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd. Beyond Innovation Technology Co., Ltd.*, and *Lien Chang Electronic Enterprise Co., Ltd.* v. *O2 Micro Internal Limited*—Lien Chang's Answer to First Amended Complaint and Counterclaims Document 51 Filed Dec. 3, 2004 total 9 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd. Beyond Innovation Technology Co., Ltd., SPI Electronic Co., Ltd.* and *Lien Chang Electronic Enterprise Co., Ltd.* v. *O2 Micro Internal Limited*—O2 Micro International Limited's Opening Claim Construction Brief Document 102-1 Filed Apr. 25, 2005 total 21 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—SPI Electronics's Response Brief in Support of Its Proposed Claim Construction Document 105 Filed May 9, 2005 total 17 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—Defendant Beyond Innovation Technology Co., Ltd's Responsive Brief on Claim Construction Document 108-1 Filed May 10, 2005 total 17 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd. Beyond Innovation Technology Co., Ltd.; SPI Electronics Co., Ltd.* and *Lien Chang Electronic Enterprise Co., Ltd.* v. *O2 Micro Internal Limited*—O2 Micro International Limited's Reply Claim Construction Brief Document 116 Filed Jun. 6, 2005 total 9 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—FSP Group's Answer to First Amended Complaint and Counterclaims Document 118 Jul. 15, 2005 14 pages.

Case No. 2:04-CV-32-TJW: *O2 Micro International Limited* v. *Beyond Innovation Technology Co., Ltd* et al.—ORDER Document 129 Filed Aug. 26, 2005 total 2 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—Defendant Beyond Innovation Technology Co. Ltd.'s Motion for Summary Judgement of Invalidity Document 169 Filed Nov. 2, 2005 total p. 24.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—Defendant Beyond Innovation Technology Co. Ltd.'s Motion for Summary Judgement of Unenforceability Due to Inequitable Conduct Document 171 Filed Nov. 2, 2005 total 16 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—Defendant Beyond Innovation Technology Co. Ltd's Reply to O2 Micro International Ltd.'s Oppositeion to Bitek's Motion for Summary Judgement of Unenforceability Due to Inequitable Conduct Document 220 Filed Nov. 23, 2005 total 7 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—Defendant Beyond Innovation Technology Co. Ltd's Reply to O2 Micro International Ltd.'s Oppositeion to Bitek's Motion for Summary Judgement of Unenforceability Due to Inequitable Conduct Document 221 Filed Nov. 23, 2005 total 7 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—Second Amended Joint Final Pretrial Order Document 352 Filed May 9, 2006 total 54 pages.

Case No. 2:04-CV-32-TJW: *O2 Micro International Limited* v. *Beyond Innovation Technology Co., Ltd* et al.—Defendant Beyond Innovation Technology Co., Ltd.'s Supplemental Brief Regarding Inequitable Conduct Document 411 Filed Dec. 12, 2006 total 21 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—Defendant Beyond Innovation Technology Co. Ltd.'s Final Invalidity Contentions Filed Oct. 17, 2005 total 259 pages.

Case No. 2:04-CV-32-TJW: *O2 Micro International Limited* v. *Beyond Innovation Technology Co., Ltd.; SPI Electronic Co., Ltd.; FSP Group* and *Lien Chang Electronic Enterprise Co., Ltd.*—Expert Report of Dr. Praveen Jain Document 216 Filed Nov. 22, 2005 total 96 pages.

Case No. 2:04-CV-32-TJW: *O2 Micro International Limited* v. *Beyond Innovation Technology Co., Ltd.; SPI Electronic Co., Ltd.; FSP Group*and *Lien Chang Electronic Enterprise Co., Ltd.*—US District Eastern District of Texas (Marshall) Docket Sheet Case#: 2:04-CV-0032-TJW last entry date: Jul. 26, 2007 total 46 pages.

Case No. 2:04-cv-323-TJW: *O2 Micro International Limited* v. *Samsung Electronics Co., Ltd.*—Complaint for Patent Infringement Document 1-1 Filed Sep. 3, 2004 pp. 1-6.

Case No. 2:04-cv-323-TJW: *O2 Micro International Limited* v. (1) *Samsung Electronics Co., Ltd.*, (2) *Samsung Electronics America, Inc.*, (3) *Samsung SDI Co., Ltd.*, and (4) *Samsung SDI America, Inc.*—First Amended Complaint for Patent Infringement Document 2-1 Filed Oct. 15, 2004 total 7 pages.

Case No. 2:04-cv-323-TJW: *O2 Micro International Limited* v. *Samsung Electronics Co., Ltd., Samsung Electronics America, Inc., Samsung SDI Co., Ltd.*, and *Samsung SDI America, Inc.*—Defendants Samsung Electronics Co., Ltd. and Samsung Electronics America, Inc.'s Answer to Plaintiff's First Amended Complaint and Counterclaims Document 12 Filed Mar. 8, 2005 Total 11 pages.

Case No. 2:04-cv-323-TJW: *O2 Micro International Limited* v. *Samsung Electronics Co., Ltd., Samsung Electronics America, Inc., Samsung SDI Co., Ltd.*, and *Samsung SDI America, Inc.*—Defendants Samsung SDI Co., Ltd. and Samsung SDI America, Inc.'s Answer to Plaintiff's First Amended Complaint, and Counterclaims Document 16 Filed Mar. 22, 2005 Total 11 pages.

Case No. 2:04-cv-323-TJW: *O2 Micro International Limited* v. *Samsung Electronics Co., Ltd., Samsung Electronics America, Inc., Samsung SDI Co., Ltd.*, and *Samsung SDI America, Inc.*—Plaintiff O2 Micro International Limited's Opening Claim Construction Brief Document 57-1 Filed Feb. 17, 2006 Total 50 pages.

Case No. 2:04-cv-323-TJW: *O2 Micro International Limited* v. *Samsung Electronics Co., Ltd.*, and *Samsung Electronics America, Inc.*—Samsung Electronics Co., Ltd. and Samsung Electronics America, Inc.'s Responsive Brief on Claim Construction Document 60-1 Filed Mar. 3, 2006 total 44 pages.

Case No. 2:04-cv-323-TJW: *O2 Micro International Limited* v. *Samsung Electronics Co., Ltd., Samsung Electronics America, Inc., Samsung SDI Co., Ltd.*, and *Samsung SDI America, Inc.*—Pliantiff O2 Micro International Limited's Reply Brief on Claim Construction Document 63 Filed Mar. 17, 2006 total 26 pages.

Case No. 2:04-cv-323-TJW: *O2 Micro International Limited* v. *Samsung Electronics Co., Ltd., Samsung Electronics America, Inc., Samsung SDI Co., Ltd.*, and *Samsung SDI America, Inc.*—Defendants Samsung Electronics Co., Ltd. and Samsung Electronics America, Inc's First Amended Answer Document 66 Filed Mar. 20, 2006 total 18 pages.

Case No. 2:04-cv-323-TJW: *O2 Micro International Limited* v. *Samsung Electronics Co., Ltd.*, et al—Memorandum Opinion and Order Document 84 Filed Jun. 28, 2006 total 16 pages.

Case No. 2:04-cv-323-TJW: *O2 Micro International Limited* v. *Samsung Electronics Co., Ltd.*, and *Samsung Electronics America, Inc.*—Defendants Samsung Electronics Co., Ltd. and Samsung Electronics America , Inc.'s Second Amended Answer Docment 108 Filed Dec. 7, 2006 total 19 pages.

Case No. 2:04-cv-323-TJW: *O2 Micro International Limited* v. *Samsung Electronics Co., Ltd.*, and *Samsung Electronics America, Inc.*—Defendants' Motion for Summary Judgement on Invalidity of Asserted Claims of U.S. Patent No. 6,707,264 Document 131 Filed Feb. 21, 2007 total 8 pages.

Case No. 2:04-cv-323-TJW: *O2 Micro International Limited* v. *Samsung Electronics Co., Ltd.*, and *Samsung Electronics America, Inc.*—Defendants' Reply in Support of Their Motion for Summary Judgement of Invalidity of U.S. Patent No. 6,707,264 Document 169 Filed Mar. 16, 2007 total 3 pages.

Case No. 2:04-cv-323-TJW: *O2 Micro International Limited* v. *Samsung Electronics Co., Ltd.*, and *Samsung Electronics America, Inc.*—Joint Final Pretrail Order Document 207 Filed Apr. 2, 2007 total 67 pages Case No. 2:04-cv-323-TJW: *O2 Micro International Limited* v. *Samsung Electronics Co., Ltd.*, and *Samsung Electronics America, Inc.*—Defendants Samsung Electronics Co., Ltd. and Samsung Electronics America, Inc's Notice Under 35 U.S.C. §282 Document 141 Filed Mar. 2, 2007 total 9 pages.

Case No. 2:04-cv-323-TJW: *O2 Micro International Limited* v. *Samsung Electronics Co., Ltd.*, and *Samsung Electronics America, Inc.*—U.S. District Court [Live] Eastern District of Texas Live (Marshall) Civil Docket for Case#: 2:04-CV-00323-TJW last entry date Jul. 31, 2007 total 30 pages.

Case No. 2:05-CV-323-TJW: *O2 Micro International Limited* v. (1) *Hon Hai Precision Industry Co., Ltd.* a/k/a *Foxconn*, and (2) *Ambit Microsystems Corporation*—Complaint for Infringement Document 1-1 Filed Jul. 18, 2005 total 6 pages.

Case No. 2:05-CV-323-TJW: *O2 Micro International Limited* v. *Hon Hai Precision Industry Co., Ltd.* a/k/a *Foxconn*, and *Ambit Microsystems Corporation*—Answer and Demand for jury by Hon Hai Industry Co., Ltd. a/k/a/ Foxconn Document 13 filed Sep. 23, 2005 total 8 pages.

Case No. 2:05-CV-323-TJW: *O2 Micro International Limited* v. *Hon Hai Precision Industry Co., Ltd.* a/k/a *Foxconn*, and *Ambit Microsystems Corporation*—First Amended Answer and Counterclaims by Hon Hai Precision Industry Co., Ltd. a/s/a Foxconn Document 30 Filed Feb. 3, 2006 total 19 pages.

Case No. 2:05-CV-323-TJW: *O2 Micro International Limited* v. *Hon Hai Precision Industry Co., Ltd.* a/k/a *Foxconn*, and *Ambit Microsystems Corporation*—Joint Claim Construction and Prehearing Statement and Exhibit A Document 82 Filed Oct. 26, 2006 total 44 pages.

Case No. 2:05-CV-323-TJW: *O2 Micro International Limited* v. *Hon Hai Precision Industry Co., Ltd.* a/k/a *Foxconn*, and *Ambit Microsystems Corporation*—Plaintiff O2 Micro International Limited's Opening Claim Construction Brief Document 83 Filed Nov. 16, 2006 total 8 pages.

Case No. 2:05-CV-323-TJW: *O2 Micro International Limited* v. *Hon Hai Precision Industry Co., Ltd.* a/k/a *Foxconn*, and *Ambit Microsystems Corporation*—HonHai's Claim Construction Brief Document 88 Filed Dec. 7, 2006 total 39 pages.

Case No. 2:05-CV-323-TJW: *O2 Micro International Limited* v. *Hon Hai Precision Industry Co., Ltd.* a/k/a *Foxconn*, and *Ambit Microsystems Corporation*—Plaintiff O2 Micro International Limited's Reply Claim Construction Brief Document 90 Filed Dec. 18, 2006 total 28 pages.

Case No. 2:05-CV-323-TJW: *O2 Micro International Limited* v. *Hon Hai Precision Industry Co., Ltd.* a/k/a *Foxconn*, and *Ambit Microsystems Corporation*—Plaintiff O2 Micro International Limited's Response in Opposition to Second Supplement to Hon Hai's Claim Construction Brief Regarding the Reexamination of O2 Micro's '615 and '722 Patents Document 125 Filed Apr. 9, 2007 total 12 pages.

Case No. 2:05-CV-323-TJW: *O2 Micro International Limited* v. *Hon Hai Precision Industry Co., Ltd.* a/k/a *Foxconn*, and *Ambit Microsystems Corporation*—Reply in Support of Hon Hai's Second Supplement to Its Claim Construction Brief Document 127 Filed Apr. 16, 2007 total 9 pages.

Case No. 2:05-CV-323-TJW: *O2 Micro International Limited* v. *Hon Hai Precision Industry Co., Ltd.* a/k/a *Foxconn*, and *Ambit Microsystems Corporation*—Defendant Hon Hai Precision Industry Co., Ltd's Motion for Summary Judgement Document 134 Filed May, 14, 2007 total 52 pages.

Case No. 2:05-CV-323-TJW: *O2 Micro International Limited* v. *Hon Hai Precision Industry Co., Ltd.* a/k/a *Foxconn*, and *Ambit Microsystems Corporation*—Defendant Hon Hai Precision Industry Co., Ltd's Preliminary Invalidity Contentions Filed Mar. 28, 2006 total 33 pages.

Case No. 2:05-CV-323-TJW: *O2 Micro International Limited* v. *Hon Hai Precision Industry Co., Ltd.* a/k/a *Foxconn*, and *Ambit Microsystems Corporation*—Hon Hai Precision Industry Co., Ltd.'s Updated Preliminary Invalidity Contentions Sep. 15, 2006 total 40 pages.

Case No. 2:05-CV-323-TJW: *O2 Micro International Limited* v. *Hon Hai Precision Industry Co., Ltd.* a/k/a *Foxconn*, and *Ambit Microsystems Corporation*—U.S. District Court Eastern District of Texas (Marshall) Docket Sheet for Case#: 2:05-CV-323 last entry date Aug. 20, 2007 total 26 pages.

Case No. 4:06-CV-02929-CW: *O2 Micro International Limited* v. *Monolithic Power Systems, Inc.*—Advanced Semiconductor Manufacturing Corporation's Answer and Counterclaims to O2's Second Amended Complaint Document 4-1 Filed May, 19, 2006 total 17 pages.

Case No. 4:06-CV-02929-CW: *O2 Micro International Limited* v. *Monolithic Power Systems, Inc.*—Asustek Compluter, Inc.'s Answer and Counterclaims to O2's Second Amended Complaint Document 6-1 Filed May, 19, 2006 total 19 pages.

Case No. 4:06-CV-02929-CW: *O2 Micro International Limited* v. *Monolithic Power Systems, Inc., Asustek Computer Inc., Michael Hsing, Compal Electronics, Inc., Compal Information (Kunshan) Co., Ltd., Compal Electronics Technology (Kunshan) Co., Ltd., Asustek Computer (Suzhou) Co., Ltd.*, and *Advanced Semiconductor Manufacturing Corporation Limited* a/k/a *Advanced Semiconductor Manufacturing Corporation Limited of Shanghai*—[Proposed] Third Amended Complaint for Patent Infringement and Unfair Competition; Demand for Jury Trial Document 39 Filed Jul. 26, 2006 total 10 pages.

Case No. 4:06-CV-02929-CW: *O2 Micro International Limited* v. *Monolithic Power Systems, Inc*et al.—Compal Electronics, Inc.'s [Proposed] Answer to Plaintiff O2 Micro International Limited's Third Amended Complaint Document 41 Filed Jul. 28, 2006 total 22 pages.

Case No. 4:06-CV-02929-CW: *O2 Micro International Limited* v. *Monolithic Power Systems, Inc*et al.—Asustek Computer, Inc.'s Answer and Counterclaims to O2's Micro's Third Amended Complaint Document 42 Filed Jul. 28, 2006 total 19 pages.

Case No. 4:06-CV-02929-CW: *O2 Micro International Limited* v. *Monolithic Power Systems, Inc*et al.—Michael R. Hisng's Answer to O2 Micro's Third Amended Complaint Document 43 Filed Jul. 28, 2006 total 10 pages.

Case No. 4:06-CV-02929-CW: *O2 Micro International Limited* v. *Monolithic Power Systems, Inc*et al.—Monolithic Power Systems, Inc.'s Answer and Counterclaims to O2 Micro's Third Amended Complaint Document 44 Filed Jul. 28, 2006 total 29 pages.

Case No. 4:06-CV-02929-CW: *O2 Micro International Limited* v. *Monolithic Power Systems, Inc*et al.—Advanced Semiconductor Manufacturing Corporations Answer and Counterclaims to O2's Third Amended Complaint Document 45 Filed Jul. 28, 2006 total 18 pages.

Case No. 4:06-CV-02929-CW: *O2 Micro International Limited* v. *Monolithic Power Systems, Inc*et al.—Michael Hisng's Supplement Invalidity Contentions and Monolithic power Systems, Inc.'s, Asustek Computer Inc.'s, and Advanced Semiconductor Manufacturing Corporation Ltd.'s Second Supplemental Invalidity Contentions and Exhibits Filed Jul. 28, 2006 total 797 pages.

Case No. 4:06-CV-02929-CW: *O2 Micro International Limited* v. *Monolithic Power Systems, Inc*et al.—Michael Hisng's Supplemental Invalidity Contentions and Monolithic Power Systems, Inc.'s, Asustek Computer Inc.'s, and Advanced Semiconductor Manufacturing Corporation Ltd.'s Second Supplemental Invalidity Contentions Aug. 7, 2006 total 33 pages.

Case No. 4:06-CV-02929-CW: *O2 Micro International Limited* v. *Monolithic Power Systems, Inc*et al.—Michael Hisng's, Monolithic Power Systems, Inc.'s, Asustek Computer Inc.'s and Advanced Semiconductor Manufacturing Corporation Ltd.'s Final Invalidity Contentions Aug. 24, 2006 total 30 pages.

Case No. 4:06-CV-02929-CW: *O2 Micro International Limited* v. *Monolithic Power Systems, Inc*et al.—U.S. District Court California Northern District (Oakland) Civil Docket for Case #: 4:06-CV-02929-CW last entry date: Sep. 14, 2006 total 9 pages.

Case No. 2:03-CV-00007-TJW: *Micro International Limited* v. (1) *Sumida Corporation* and (2) *Taiwan Sumida Electronics Inc.*

—Complaint for Patent Infringement Document 1 Filed Jan. 6, 2003 total 43 pages.

Case No. 2:03-CV-00007-TJW: *Micro International Limited* v. *Sumida Corporation*and *Taiwan Sumida Electronics Inc.*—Sumida Corporation and Taiwan Sumida Electronics, Inc. Answer to O2 Micro's Complaint Document 55 Filed Apr. 5, 2004 total 6 pages.

Case No. 2:03-CV-00007-TJW: *Micro International Limited* v. *Taiwan Sumida Electronics Inc.*—O2 Micro International Limited's Opening Claim Construction Brief Document 90 Filed Dec. 1, 2004 total 33 pages.

Case No. 2:03-CV-00007-TJW: *Micro International Limited* v. *Taiwan Sumida Electronics Inc.*—Joint Claim Construction and Prehearing Statement and Exhibit A Document 89-1 and 89-2 Filed Oct. 22, 2004 total 60 pages.

Case No. 2:03-CV-00007-TJW: *Micro International Limited* v. (1) *Sumida Corporation*and (2) *Taiwan Sumida Electronics Inc.*—O2 Micro International Limited's Reply Claim Construction Brief Document 96 Filed Dec. 22, 2004 total 37 pages.

Case No. 2:03-CV-00007-TJW: *Micro International Limited* v. *Sumida Corporation*et al.—Memorandum Opinion and Order Document 102 Filed Mar. 8, 2005 total 15 pages.

Case No. 2:03-CV-00007-TJW: *Micro International Limited* v. *Taiwan Sumida Electronics Inc.*—Motion for Summary Judgement No. 3 (Invalidity of Claim 39 and 40) Document 125-1 Filed Apr. 27, 2005 total 7 pages.

Case No. 2:03-CV-00007-TJW: *Micro International Limited* v. *Taiwan Sumida Electronics Inc.*—Joint Final Pretrial Order Document 178-1 Filed Aug. 23, 2005 total 30 pages.

Case No. 2:03-CV-00007-TJW: *Micro International Limited* v. *Taiwan Sumida Electronics Inc.*—TSE's Amended Renewed Motion for Judgement As a Matter of Law Document 250 Filed Jan. 9, 2006 total 27 pages.

Case No. 2:03-CV-00007-TJW: *Micro International Limited* v. *Taiwan Sumida Electronics Inc.*—TSE's Reply in Support of Amended Renewed Motion for Judgement As a Matter of Law Document 276 Filed Mar. 6, 2006 total 20 pages.

Case No. 2:03-CV-00007-TJW: *Micro International Limited* v. *Taiwan Sumida Electronics Inc.*—Defendant Taiwan Sumida Electronics, Inc.'s Final Invalidity Contentions and Exhibits Filed May 2, 2006 total 166 pages.

Case No. 2:03-CV-00007-TJW: *Micro International Limited* v. *Taiwan Sumida Electronics Inc.*—Expert Report of Clyde M. Brown Jr., P.E. Mar. 25, 2005 total 65 pages.

Case No. 2:03-CV-00007-TJW: *Micro International Limited* v. *Taiwan Sumida Electronics Inc.*—U.S. District Court Estern District of Texas (Marshall) Civil Docket for Case#: 2:03-CV-00007-TJW last entry date Jul. 26, 2007 total 16 pages.

Case No. 2:03-CV-00007-TJW: *Micro International Limited* v. *Taiwan Sumida Electronics Inc.*—Defendant Taiwan Sumida Electronics, Inc.'s Final Invalidity Contentions May 2, 2005 total 6 pages.

Case No. 2:03-CV-00007-TJW: *Micro International Limited* v. *Taiwan Sumida Electronics Inc.*—Defendant Taiwan Sumida Electronics, Inc.'s Notice Under 35 U.S.C. §282 May 3, 2005 total 6 pages.

Case No. 2:05-CV-00211-TJW: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc.*—Complaint for Patent Infringement Document 1-1 Filed Jun. 3, 2005 total 7 apges.

Case No. 2:05-CV-00211-TJW: *O2 Micro International Limited* v. *Rohm Co., Ltd., Sony Corporation, Sony EMCS Corporation, Sony Corporation of America* and *Sony Electronics Inc.*—Defendant Rohm Co. Ltd.'s Answer and Counterclaims to Plaintiff's Complaint Document 38 Filed Feb. 15, 2006 total 10 pages.

Case No. 2:05-CV-00211-TJW: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc.*—Sony Corporation, Sony EMCS Corporation, Sony Corporation of America and Sony Electronics Inc.'s Answer to O2 Micro's Complaint Document 41 Filed Feb. 16, 2006.

Case No. 2:05-CV-00211-TJW: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc.*—First Amended Complaint for Patent Infringement Document 84 Filed Dec. 11, 2006 total 9 pages.

Case No. 2:05-CV-00211-TJW: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc.*—Rohm Co. Ltd.'s Answer to O2 Micro's First Amended Complaint for Patent Infringement, First Amended Defenses, and First Amended Counterclaims Document 89 Filed Jan. 5, 2007 total 71 pages.

Case No. 2:05-CV-00211-TJW: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc.*—Sony Corporation, Sony EMCS Corporation, Sony Corporation of America and Sony Electronics Inc.'s Answer to O2 Micro's First Amended Complaint With Counterclaims Document 90 Filed Jan. 5, 2007 total 63 pages.

Case No. 2:05-CV-00211-TJW: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc.*—Sony Corporation, Sony EMCS Corporation, Sony Corporation of America and Sony Electronics Inc.'s Answer to O2 Micro's First Amended Complaint and First Amended Counterclaims Document 100 Filed Jan. 30, 2007 total 62 pages.

Case No. 2:05-CV-00211-TJW: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc.*—Rohm Co. Ltd.'s Amended Answer to O2 Micro's First Amended Complaint for Patent Infringement, First Amended Defenses, and Second Amended Counterclaims Document 102 Filed Feb. 1, 2007 total 71 pages.

Case No. 2:05-CV-00211-TJW-CE: *O2 Micro International Limited* v. *Rohm Co., Ltd., Sony Corporation, Sony EMCS Corporation, Sony Corporation of America*and *Sony Electronics Inc. Sony Corporation*and *Sony Electronics Inc.* v. *Microsemi Corporation*—Third-Party Defendant Microsemi Corporation's Answer to Sony Corporation and Sony Electronics Inc.'s Third-Party Complaint; and Microsemi Corporation's Claims Against Plaintiff O2 Micro International Ltd. Document 128 Filed Apr. 13, 2007 total 39 pages.

Case No. 2:05-CV-00211-TJW-CE: *O2 Micro International Limited* v. *Rohm Co., Ltd., Sony Corporation, Sony EMCS Corporation, Sony Corporation of America*and *Sony Electronics Inc. Sony Corporation*and *Sony Electronics Inc.* v. *Microsemi Corporation*—Microsemi Corporation's Reply to Counterclaims of O2 Micro International Limited and Demand for Jury Trial Document 139 Filed Jun. 1, 2007 total 14 pages.

Case No. 2:05-CV-00211-TJW-CE: *O2 Micro International Limited* v. *Rohm Co., Ltd., Sony Corporation, Sony EMCS Corporation, Sony Corporation of America*and *Sony Electronics Inc. Sony Corporation*and *Sony Electronics Inc.* v. *Microsemi Corporation*—Third-Party Defendant Microsemi Corporation's Answer to Sony Corporation and Sony Electronics Inc.'s Third-Party Complaint; and Microsemi Corporation's Amended Claims Against Plaintiff O2 Micro International Ltd. Document 160 Filed Jul. 9, 2007 total 51 pages.

Case No. 2:05-CV-00211-TJW-CE: *O2 Micro International Limited* v. (1)*Rohm Co., Ltd.*, (2) *Sony Corporation*(3) *Sony EMCS Corporation*(4) *Sony Corporation of America*and (5) *Sony Electronics Inc.* (1) *Sony Corporation*and (2) *Sony Electronics Inc.* v. (1) *Microsemi Corporation*—Joint Claim Construction and Prehearing Statement Pursuant to Patent Rule 4-3 and Exhibit A-D Document 167 Filed Jul. 18, 2007 total 61 pages.

Case No. 2:05-CV-00211-TJW-CE: *O2 Micro International Limited* v. (1) *Rohm Co., Ltd.*, (2) *Sony Corporation*(3) *Sony EMCS Corporation*(4) *Sony Corporation of America*and (5) *Sony Electronics Inc.* v. *Microsemi Corporation*—Plaintiff O2 Micro International Limited's Opening Claim Construction Brief Document 172 Filed Jul. 23, 2007 total 18 pages.

Case No. 2:05-CV-00211-TJW-CE: *O2 Micro International Limited* v. *Rohm Co., Ltd., Sony Corporation, Sony EMCS Corporation, Sony Corporation of America*and *Sony Electronics Inc. Sony Corporation*and *Sony Electronics Inc.* v. *Microsemi*

*Corporation*—Rohm's Responsive Brief on Claim Construction Document 198 Filed Aug. 8, 2007 total 43 pages.

Case No. 2:05-CV-00211-TJW-CE: *O2 Micro International Limited v. Rohm Co., Ltd., Sony Corporation, Sony EMCS Corporation, Sony Corporation of America* and *Sony Electronics Inc. Sony Corporation* and *Sony Electronics Inc. v. Microsemi Corporation*—Microsemi Corporation's Responsive Brief on Claim Construction Document 199 Filed Aug. 8, 2007 total 53 pages.

Case No. 2:05-CV-00211-TJW-CE: *O2 Micro International Limited v. (1)Rohm Co., Ltd., (2) Sony Corporation, (3) Sony EMCS Corporation, (4) Sony Corporation of America* and *(5) Sony Electronics Inc. v. Microsemi Corporation*—Plaintiff O2 Micro International Limited's Reply Claim Construction Brief Document 209 Filed Aug. 13, 2007 total 30 pages.

Case No. 2:05-CV-00211-TJW-CE: *O2 Micro International Limited v. Rohm Co., Ltd., Sony Corporation, Sony EMCS Corporation, Sony Corporation of America* and *Sony Electronics Inc. Sony Corporation* and *Sony Electronics Inc. v. Microsemi Corporation*—Notice of Filing Joint Claim Construction Chart and Exhibit A-C Document 223 total 122 pages.

Case No. 2:05-CV-00211-TJW-CE: *O2 Micro International Limited v. Rohm Co., Ltd., Sony Corporation, Sony EMCS Corporation, Sony Corporation of America* and *Sony Electronics Inc. Sony Corporation* and *Sony Electronics Inc. v. Microsemi Corporation*—Rohm Co., Ltd's Invalidity Contentions total 18 pages.

Case No. 2:05-CV-00211-TJW-CE: *O2 Micro International Limited v. Rohm Co., Ltd., Sony Corporation, Sony EMCS Corporation, Sony Corporation of America* and *Sony Electronics Inc. Sony Corporation* and *Sony Electronics Inc. v. Microsemi Corporation*—U.S. District Court [Live] Eastern District of Texas Live (Marshall) Civil Docket for Case#: 2:05-CV-00211-TJW last entry date Aug. 24, 2007 total 29 pages.

Case No. 2:05-CV-00211-TJW-CE: *O2 Micro International Limited v. Rohm Co., Ltd., Sony Corporation, Sony EMCS Corporation, Sony Corporation of America* and *Sony Electronics Inc. Sony Corporation* and *Sony Electronics Inc. v. Microsemi Corporation*—Microsemi Corporations' Preliminary Invalidity Contentions Regarding U.S. Patent Nos. 6,804,129 and 6,396,722 total 28 pages.

*O2 Micro International Limited* v. *Monolithic Power Systems, Inc.* U.S. District Eastern District of Texas (Marshall) Civil Docket for Case# 2:04-cv-00359-TJW Fate Filed Oct. 13, 2004.

U.S. District Court [Live] Eastern District of Texas Live (Marshall) Civil Docket for Case# 2:04-cv-00323-TJW Date Filed Sep. 3, 2004.

*O2Micro International* v. (1) *Hon Hai Precision Industry Co., Ltd, a/k/a/ Foxconn*(2) *Ambit Microsystems Corporation* U.S. District Court Eastern District of Texas (Marshall) Case No.# 2:05-cv-323 date filed Jul. 18, 2005.

U.S. District Court [Live] Eastern District of Texas Live (Marshall) Civil Docket for Case No.# 2:05-cv-00211-TJW date filed Jun. 3, 2005.

U.S. District Court [Live] Eastern District of Texas Live (Marshall) Civil Docket for Case No.# 2:04-cv-00323-TJW date filed Sep. 3, 2004.

U.S. District Court [Live] Eastern District of Texas Live (Marshall) Civil Docket for Case No.# 2:04-cv-00323-TJW date filed Jan. 6, 2003.

Docket Text and dated filed 1 page.

*O2Micro International* v. *BiTek, SPI, FSP., Lien-Chang* U.S. District Court eastern District of Texas (Marshall) Case # 2:04-cv-00032-TJW Date Filed Jan. 30, 2004 updated on Feb. 1, 2007.

U.S. District Court California Northern District (Oakland) Civil Docket for Case #4:06-cv-02929-CW Date Filed May 1, 2006 Related Case: 4:04-cv-2000-CW.

*Monolithic Power Systems Inc* v. *O2Micro International* U.S. District Court Northern District of California CASE# 4"04-cv-2000 Date Filed May 20, 2004.

*O2Micro International* v. *BiTek, SPI, FSP, Lien-Chang* U.S. District Court eastern District of Texas (Marshall) Case# 2:04-cv-00032-TJW Date Filed Jan. 30, 2004 updated on Dec. 25, 2006.

U.S. District Court [Live] Eastern District of Texas Live (Marshall) Civil Docket for Case# 2:04-cv-00323-TJW Date Filed Sep. 3, 2004 Updated on Dec. 25, 2006.

\* cited by examiner

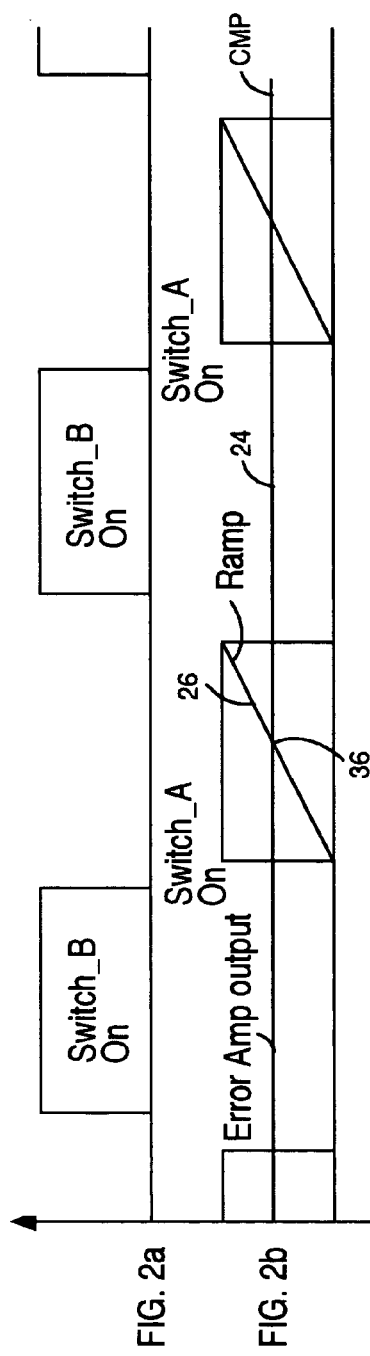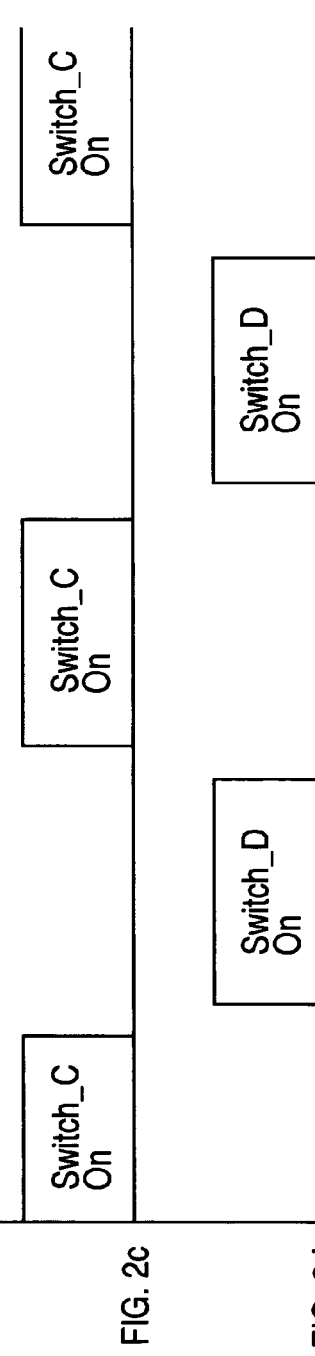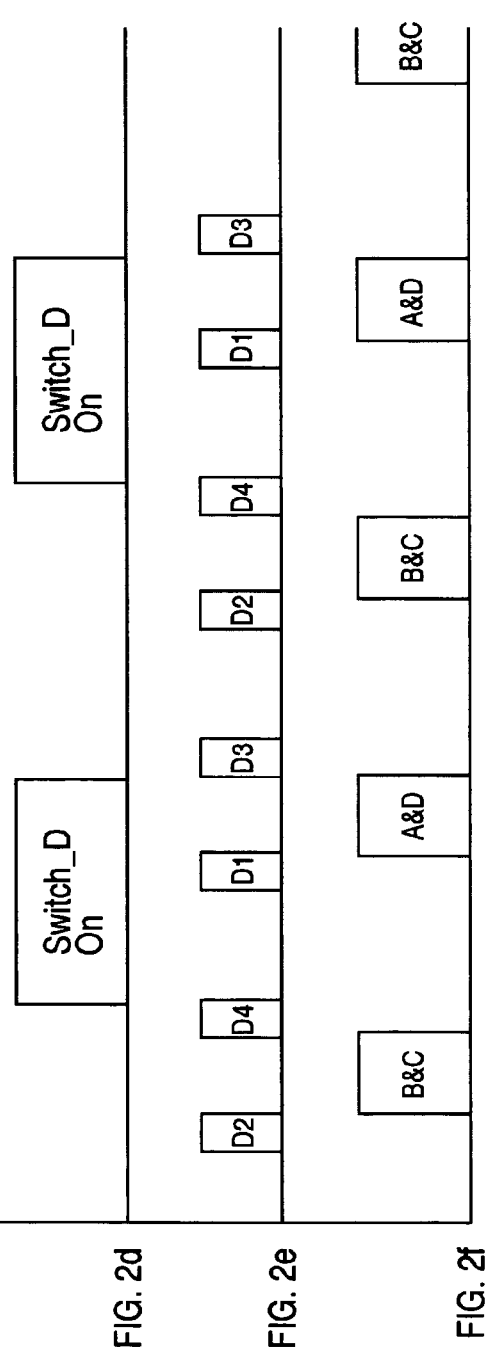

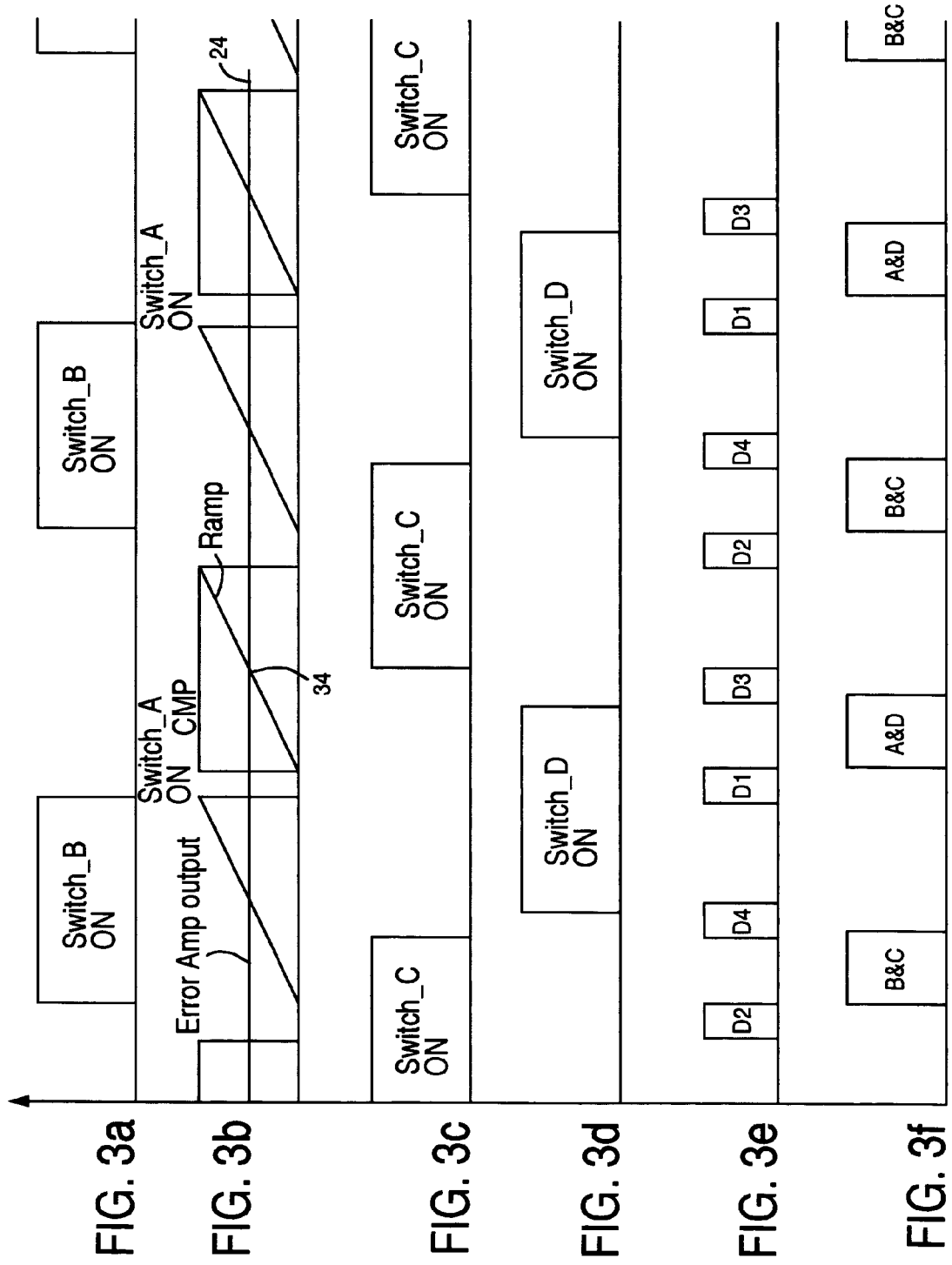

US 7,394,209 B2

LIQUID CRYSTAL DISPLAY SYSTEM WITH LAMP FEEDBACK

This application is a continuation of U.S. application Ser. No. 10/776,417 filed Feb. 11, 2004 and now U.S. Pat. No. 6,804,129.

FIELD OF THE INVENTION

The present invention is directed to a DC to AC power converter circuit. More particularly, the present invention provides a high efficiency controller circuit that regulates power delivered to a load using a zero-voltage-switching technique. General utility for the present invention is found as a circuit for driving one or more Cold Cathode Fluorescent Lamps (CCFLs), however, those skilled in the art will recognize that the present invention can be utilized with any load where high efficiency and precise power control is required.

DESCRIPTION OF RELATED ART

FIG. 1 depicts a convention CCFL power supply system 10. The system broadly includes a power supply 12, a CCFL driving circuit 16, a controller 14, a feedback loop 18, and one or more lamps CCFL associated with an LCD panel 20. Power supply 12 supplies a DC voltage to circuit 16, and is controlled by controller 14, through transistor Q3. Circuit 16 is a self-resonating circuit, known as a Royer circuit. Essentially, circuit 16 is a self-oscillating dc to ac converter, whose resonant frequency is set by L1 and C1, and N1–N4 designate transformer windings and number of turns of the windings. In operation, transistors Q1 and Q2 alternately conduct and switch the input voltage across windings N1 and N2, respectively. If Q1 is conducting, the input voltage is placed across winding N1. Voltages with corresponding polarity will be placed across the other windings. The induced voltage in N4 makes the base of Q2 positive, and Q1 conducts with very little voltage drop between the collector and emitter. The induced voltage at N4 also holds Q2 at cutoff. Q1 conducts until the flux in the core of TX1 reaches saturation.

Upon saturation, the collector of Q1 rises rapidly (to a value determined by the base circuit), and the induced voltages in the transformer decrease rapidly. Q1 is pulled further out of saturation, and $V_{CE}$ rises, causing the voltage across N1 to further decrease. The loss in base drive causes Q1 to turn off, which in turn causes the flux in the core to fall back slightly and induces a current in N4 to turn on Q2. The induced voltage in N4 keeps Q1 conducting in saturation until the core saturates in the opposite direction, and a similar reversed operation takes place to complete the switching cycle.

Although the inverter circuit 16 is composed of relatively few components, its proper operation depends on complex interactions of nonlinearities of the transistors and the transformer. In addition, variations in C1, Q1 and Q2 (typically, 35% tolerance) do not permit the circuit 16 to be adapted for parallel transformer arrangements, since any duplication of the circuit 16 will produce additional, undesirable operating frequencies, which may resonate at certain harmonics. When applied to a CCFL load, this circuit produces a "beat" effect in the CCFLs, which is both noticeable and undesirable. Even if the tolerances are closely matched, because circuit 16 operates in self-resonant mode, the beat effects cannot be removed, as any duplication of the circuit will have its own unique operating frequency.

Some other driving systems can be found in U.S. Pat. Nos. 5,430,641; 5,619,402; 5,615,093; 5,818,172. Each of these references suffers from low efficiency, two-stage power conversion, variable-frequency operation, and/or load dependence. Additionally, when the load includes CCFL(s) and assemblies, parasitic capacitances are introduced, which affects the impedance of the CCFL itself. In order to effectively design a circuit for proper operation, the circuit must be designed to include consideration of the parasitic impedances for driving the CCFL load. Such efforts are not only time-consuming and expensive, but it is also difficult to yield an optimal converter design when dealing with various loads. Therefore, there is a need to overcome these drawbacks and provide a circuit solution that features high efficiency, reliable ignition of CCFLs, load-independent power regulation and single frequency power conversion.

SUMMARY OF THE INVENTION

A liquid crystal display system is described comprising a liquid crystal display panel; a cold cathode fluorescent lamp for illuminating said liquid crystal display panel; a secondary transformer winding coupled to said cold cathode fluorescent lamp for providing current to said cold cathode fluorescent lamp; a primary transformer winding coupled to said secondary transformer winding for providing magnetic flux to said secondary transformer winding; a switch coupled to said primary transformer winding for allowing current to pass through said primary transformer winding; a feedback control loop circuit coupled to said cold cathode fluorescent lamp receiving a feedback signal indicative of power being supplied to said cold cathode fluorescent lamp and controlling the power supplied to said cold cathode fluorescent lamp only if said feedback signal is above a predetermined threshold.

Under an alternative embodiment, the liquid crystal display system comprises a liquid crystal display panel; a cold cathode fluorescent lamp for illuminating said liquid crystal display panel; a secondary transformer winding coupled to said cold cathode fluorescent lamp for providing current to said cold cathode fluorescent lamp; a primary transformer winding coupled to said secondary transformer winding for providing magnetic flux to said secondary transformer winding; a switch coupled to said primary transformer winding for allowing current to pass through said primary transformer winding; a feedback control loop circuit coupled to said cold cathode fluorescent lamp receiving a feedback signal from said cold cathode fluorescent lamp to reduce the power supplied to said cold cathode fluorescent lamp when said feedback signal indicates an open lamp condition.

Under an alternative embodiment, the liquid crystal display system comprises a liquid crystal display panel; a cold cathode fluorescent lamp for illuminating said liquid crystal display panel; a secondary transformer winding coupled to said cold cathode fluorescent lamp for providing current to said cold cathode fluorescent lamp; a primary transformer winding coupled to said secondary transformer winding for providing magnetic flux to said secondary transformer winding; a first switch coupled to said primary transformer winding for allowing current to pass in a first direction through said primary transformer winding; a second switch coupled to said primary transformer winding for allowing current to pass in a second direction through said primary transformer winding; a third switch coupled to said primary transformer winding and said first switch configured to provide current to said primary transformer winding when an overlap condition exists between said third switch and said first switch; and a feedback control loop circuit coupled to said cold cathode fluorescent lamp receiving a feedback signal from said cold cathode fluorescent lamp and maintaining a predetermined minimum power to said cold cathode fluorescent lamp by maintaining a minimum overlap between said third switch and said first switch.

A method is also described for controlling power to a cold cathode fluorescent lamp in a liquid crystal display system comprising the steps of providing a pulse signal to a transistor for a conduction path to a primary transformer winding; generating a feedback signal from a cold cathode fluorescent lamp coupled to a secondary transformer winding indicative of an electrical condition at said cold cathode fluorescent lamp; receiving said feedback signal from said cold cathode fluorescent lamp; and adjusting power to said cold cathode fluorescent lamp only if said feedback signal indicates ignition of said cold cathode fluorescent lamp.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 2a-2f is an exemplary timing diagram of the circuit of FIG. 2;

FIG. 3a-3f is an exemplary timing diagram of the circuit of FIG. 3;

DETAILED DESCRIPTION OF THE INVENTION

While not wishing to be bound by example, the following Detailed Description will proceed with reference to a CCFL panel as the load for the circuit of the present invention. However, it will be apparent that the present invention is not limited only to driving one or CCFLs, rather, the present invention should be broadly construed as a power converter circuit and methodology independent of the particular load for a particular application.

As an overview, the present invention provides circuitry to controllably deliver power to a load using feedback signals and pulse signals to adjust the ON time of two pairs of switches. When one pair of switches are controllably turned ON such that their ON times overlap, power is delivered to a load (via a transformer), along a conduction path defined by the pair of switches. Likewise, when the other pair of switches are controllably turned ON such that their ON times overlap, power is delivered to a load (via a transformer), along a conduction path defined by other pair of switches. Thus, by selectively turning ON switches and controlling the overlap between—switches, the present invention can precisely control power delivered to a given load. Additionally, the present invention includes over-current and over-voltage protection circuits, which discontinues power to the load in the event of a short circuit or open circuit condition. Moreover, the controlled switching topology described herein enables the circuit to operate irrespective of the load, and with a single operating frequency independent of the resonant effects of the transformer arrangement. These features are discussed below with reference to the drawings.

Figure 1:
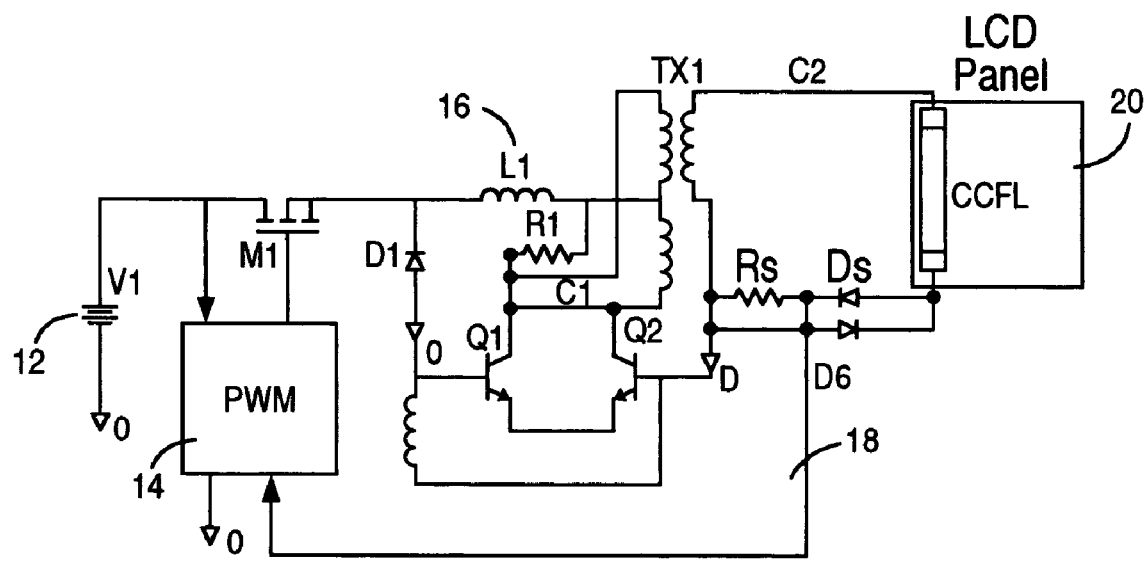
FIG. 1 is a conventional DC/AC converter circuit.
Figure 2:
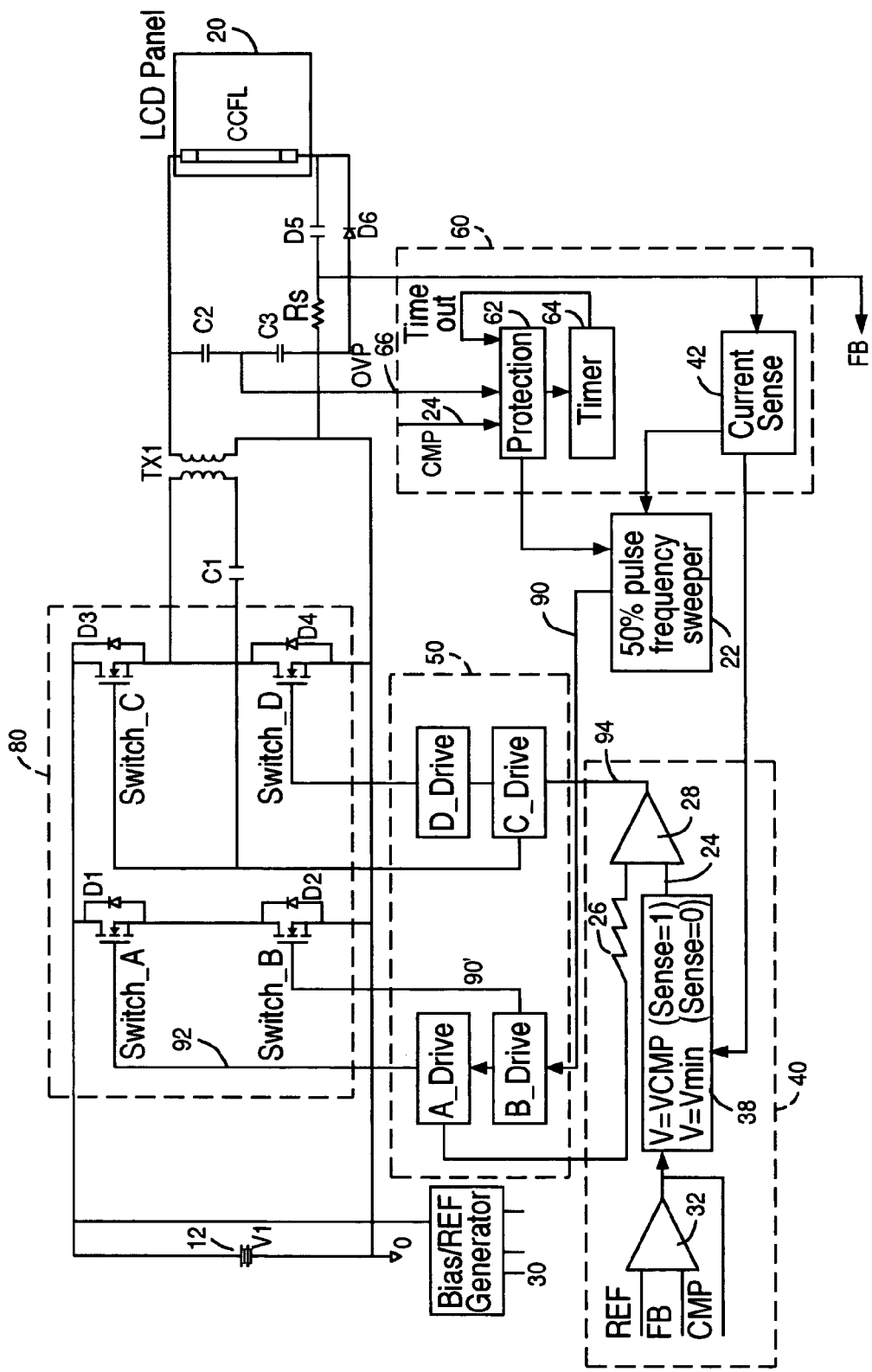
FIG. 2 is one preferred embodiment of a DC/AC converter circuit of the present invention.

The circuit diagram shown in FIG. 2 illustrates one preferred embodiment of a phase-shift, full-bridge, zero-voltage-switching power converter of the present invention. Essentially, the circuit shown in FIG. 2 includes a power source 12, a plurality of switches 80 arranged as diagonal pairs of switches defining alternating conduction paths, drive circuitry 50 for driving each of the switches, a frequency sweeper 22 which generates a square wave pulse to the drive circuitry 50, a transformer TX1 (with an associated resonant tank circuit defined by the primary side of TX1 and C1) and a load. Advantageously, the present invention also includes an overlap feedback control loop 40 which controls the ON time of at least one of each pair of switches, thereby permitting controllable power to be delivered to the load.

A power source 12 is applied to the system. Initially, a bias/reference signal 30 is generated for the control circuitry (in control loop 40) from the supply. Preferably, a frequency sweeper 22 generates a 50% duty-cycle pulse signal, starting with an upper frequency and sweeping downwards at a pre-determined rate and at pre-determined steps (i.e., square wave signal of variable pulse width). The frequency sweeper 22 preferably is a programmable frequency generator, as is known in the art. The pulse signal 90 (from the sweeper 22) is delivered to B_Drive (which drives the Switch_B, i.e., controls the gate of Switch_B), and is delivered to A_Drive, which generates a complementary pulse signal 92 and a ramp signal 26. The complementary pulse signal 92 is approximately 180° out of phase with pulse signal 90, and the ramp signal 26 is approximately 90° out of phase with pulse signal, as will be described below. The ramp signal is preferably a sawtooth signal, as shown in the Figure. The ramp signal 26 is compared with the output signal 24 (referred to herein as CMP) of the error amplifier 32, through comparator 28, thus generating signal 94. The output signal 94 of the comparator 28 is likewise a 50% duty pulse delivered to C_Drive to initiate the turning on of Switch_C which, in turn, determines the amount of overlap between the switches B and C, and switches A and D. Its complimentary signal (phased approximately 180°) is applied to Switch_D, via D_Drive. It will be understood by those skilled in the art that circuits Drive_A-Drive_D are connected to the control lines (e.g., gate) of Switch_A–Switch_D, respectively, which permits each of the switches to controllably conduct, as described herein. By adjusting the amount of overlap between switches B, C and A, D, lamp-current regulation is achieved. In other words, it is the amount of overlapping in the conduction state of the pairs of switches that determines the amount of power processed in the converter. Hence, switches B and C, and switches A and D, will be referred to herein as overlapping switches.

While not wishing to be bound by example, in this embodiment, B_Drive is preferably formed of a totem pole circuit, generic low-impedance op-amp circuit, or emitter follower circuit. C_Drive is likewise constructed. Since both A-Drive and D_Drive are not directly connected to ground (i.e., floating), it is preferred that these drives are formed of a boot-strap circuit, or other high-side drive circuitry known in the art. Additionally, as stated above, A_Drive and D_Drive include an inverter to invert (i.e., phase) the signal flowing from B_Drive and C_Drive, respectively.

High-efficiency operation is achieved through a zero-voltage-switching technique. The four MOSFETs (Switch_A–Switch_D) 80 are turned on after their intrinsic diodes (D1–D4) conduct, which provides a current flowing path of energy in the transformer/capacitor (TX1/C1) arrangement, thereby ensuring that a zero voltage is across the switches when they are turned on. With this controlled operation, switching loss is minimized and high efficiency is maintained.

The preferred switching operation of the overlapping switches 80 is shown with reference to the timing diagrams of FIGS. 2a–2f. Switch_C is turned off at certain period of the conduction of both switches B and C (FIG. 2f). The current flowing in the tank (refer to FIG. 2) is now flowing through diode D4 (FIG. 2e) in Switch_D, the primary of transformer, C1, and Switch_B, after Switch_C is turned off, thereby resonating the voltage and current in capacitor C1 and the transformer as a result of the energy delivered when switches B and C were conducting (FIG. 2f). Note that this condition must occur, since an instantaneous change in current direction of the primary side of the transformer would violate Faraday's Law. Thus, current must flow through D4 when Switch_C turns off. Switch_D is turned on after D4 has conducted. Similarly, Switch_B is turned off (FIG. 2a), the current diverts to Diode D1 associated with Switch_A before Switch_A is turned on (FIG. 2e). Likewise, Switch_D is turned off (FIG. 2d), and the current is now flowing now from Switch_A, through C1, the transformer primary and Diode D3. Switch_C is turned on after D3 has conducted (FIG. 2e). Switch_B is turned on after Switch_A is turned off which allows the diode D2 to conduct first before it is turned on. Note that the overlap of turn-on time of the diagonal switches B,C and A,D determines the energy delivered to the transformer, as shown in FIG. 2f.

In this embodiment, FIG. 2b shows that the ramp signal 26 is generated only when Switch_A is turned on. Accordingly, Drive_A, which generates the ramp signal 26, preferably includes a constant current generator circuit (not shown) that includes a capacitor having an appropriate time constant to create the ramp signal. To this end, a reference current (not shown) is utilized to charge the capacitor, and the capacitor is grounded (via, for example a transistor switch) so that the discharge rate exceeds the charge rate, thus generating the sawtooth ramp signal 26. Of course, as noted above, this can be accomplished by integrating the pulse signal 90, and thus, the ramp signal 26 can be formed using an integrator circuit (e.g., op-amp and capacitor).

In the ignition period, a pre-determined minimum overlap between the two diagonal switches is generated (i.e., between switches A,D and B,C). This gives a minimum energy from the input to the tank circuit including C1, transformer, C2, C3 and the CCFL load. Note that the load can be resistive and/or capacitive. The drive frequency starts at a predetermined upper frequency until it approaches the resonant frequency of the tank circuit and equivalent circuit reflected by the secondary side of the transformer, a significant amount of energy is delivered to the load where the CCFL is connected. Due to its high-impedance characteristics before ignition, the CCFL is subjected to high voltage from the energy supplied to the primary side. This voltage is sufficient to ignite the CCFL. The CCFL impedance decreases to its normal operating value (e.g., about 100 Kohm to 130 Kohm), and the energy supplied to the primary side based on the minimum-overlap operation is no longer sufficient to sustain a steady state operation of the CCFL. The output of the error amplifier 26 starts its regulating function to increase the overlap. It is the level of the error amplifier output determines the amount of the overlap. For example:

Referring to FIGS. 2b and 2c and the feedback loop 40 of FIG. 2, it is important to note that Switch_C is turned on when the ramp signal 26 (generated by Drive_A) is equal to the value of signal CMP 24 (generated by error amplifier 32), determined in comparator 28. This is indicated as the intersection point 36 in FIG. 2b. To prevent a short circuit, switches A,B and C,D must never be ON simultaneously. By controlling the CMP level, the overlap time between switches A,D and B,C regulates the energy delivered to the transformer. To adjust the energy delivered to the transformer (and thereby adjust the energy delivered to the CCFL load), switches C and D are time-shifted with respect to switches A and B, by controlling the error amplifier output, CMP 24. As can be understood by the timing diagrams, if the driving pulses from the output of comparator 28 into switches C and D are shifted to the right by increasing the level of CMP, an increase in the overlap between switches A,C and B,D is realized, thus increasing the energy delivered to the transformer. In practice, this corresponds to the higher-lamp current operation. Conversely, shifting the driving pulses of switches C and D to the left (by decreasing the CMP signal) decreases the energy delivered.

To this end, error amplifier 32 compares the feedback signal FB with a reference voltage REF. FB is a measure of the current value through the sense resistor Rs, which is indicative of the total current through the load 20. REF is a signal indicative of the desired load conditions, e.g., the desired current to flow through the load. During normal operation, REF=FB. If, however, load conditions are intentionally offset, for example, from a dimmer switch associated with an LCD panel display, the value of REF will increase/decrease accordingly. The compared value generates CMP accordingly. The value of CMP is reflective of the load conditions and/or an intentional bias, and is realized as the difference between REF and FB (i.e., REF–FB).

To protect the load and circuit from an open circuit condition at the load (e.g., open CCFL lamp condition during normal operation). the FB signal is also preferably compared to a reference value (not shown and different from the REF signal described above) at the current sense comparator 42, the output of which defines the condition of switch 28, discussed below. This reference value can be programmable, and/or user-definable, and preferably reflects the minimum or maximum current permitted by the system (for example, as may be rated for the individual components, and, in particular, the CCFL load). If the value of the feedback FB signal and the reference signal is within a permitted range (normal operation), the output of the current sense comparator is 1 (or, HIGH). This permits CMP to flow through switch 38, and the circuit operates as described herein to deliver power to the load. If, however, the value of the FB signal and the reference signal is outside a predetermined range (open circuit or short circuit condition), the output of the current sense comparator is 0 (or, LOW), prohibiting the CMP signal from flowing through the switch 38. (Of course, the reverse can be true, in which the switch triggers on a LOW condition). Instead a minimal voltage Vmin is supplied by switch 38 (not shown) and applied to comparator 28 until the current sense comparator indicates permissible current flowing through Rs. Accordingly, switch 38 includes appropriate programmable voltage selection Vmin for when the sense current is 0. Turning again to FIG. 2b, the effect of this operation is a lowering of the CMP DC value to a nominal, or minimum, value (i.e., CMP=Vmin) so that a high voltage condition is not appearing on the transformer TX1. Thus, the crossover point 36 is shifted to the left, thereby decreasing the amount of overlap between complementary switches (recall Switch_C is turned ON at the intersection point 36). Likewise, current sense comparator 42 is connected to the frequency generator 22 to turn the generator 22 off when the sense value is 0 (or some other preset value indicative of an open-circuit condition). The CMP is fed into the protection circuit 62. This is to shut off the frequency sweeper 22 if the CCFL is removed during operation (open-circuit condition).

To protect the circuit from an over-voltage condition, the present embodiment preferably includes protection circuit 60, the operation of which is provided below (the description of the over current protection through the current sense comparator 42 is provided above). The circuit 60 includes a protection comparator 62 which compares signal CMP with a voltage signal 66 derived from the load 20. Preferably, voltage signal is derived from the voltage divider C2 and C3 (i.e., in parallel with load 20), as shown in FIG. 2. In the open-lamp condition, the frequency sweeper continues sweeping until the OVP signal 66 reaches a threshold. The OVP signal 62 is taken at the output capacitor divider C2 and C3 to detect the voltage at the output of the transformer TX1. To simplify the analysis, these capacitors also represent the lump capacitor of the equivalent load capacitance. The threshold is a reference and circuit is being designed so that the voltage at the secondary side of the transformer is greater than the minimum striking voltage (e.g., as may be required by the LCD panel) while less than the rated voltage of the transformer. When OVP exceeds the threshold, the frequency sweeper stops the frequency sweeping. Meanwhile, the current-sense 42 detects no signal across the sense resistor Rs. Therefore the signal at 24, the output of a switch block 38, is set to be at minimum value so that minimum overlap between switches A,C and B,D is seen. Preferably, a timer 64 is initiated once the OVP exceeds the threshold, thereby initiating a time-out sequence. The duration of the time-out is preferably designed according to the requirement of the loads (e.g., CCFLs of an LCD panel), but could alternately be set at some programmable value. Drive pulses are disabled once the time-out is reached, thus providing safe-operation output of the converter circuit. That is, circuit 60 provides a sufficient voltage to ignite the lamp, but will shut off after a certain period if the lamp is not connected to the converter, so that erroneous high voltage is avoided at the output. This duration is necessary since a non-ignited lamp is similar to an open-lamp condition.

Figure 3:
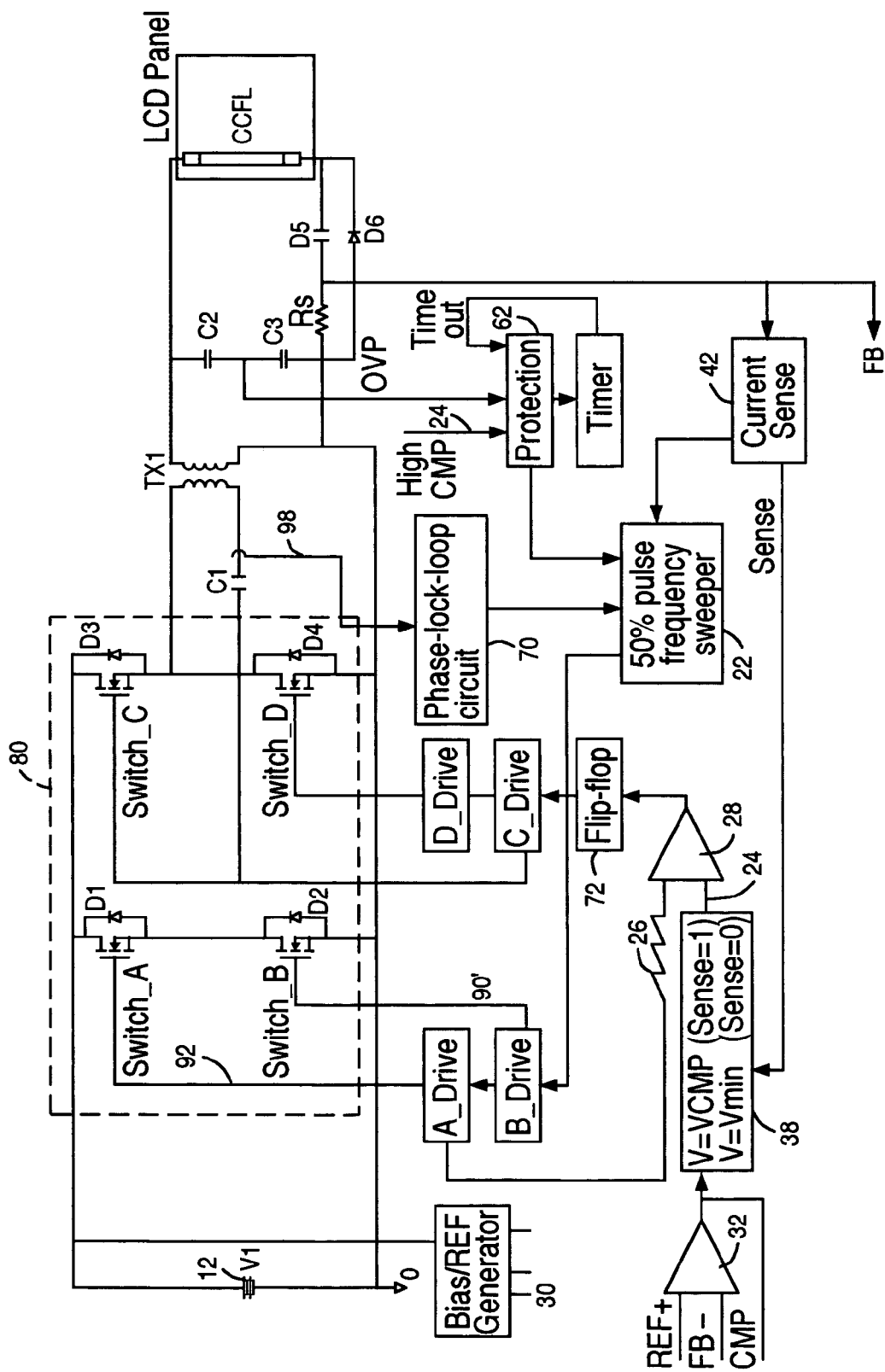
FIG. 3 is another preferred embodiment of a DC/AC converter circuit of the present invention.

FIGS. 3 and 3a–3f depict another preferred embodiment of the DC/AC circuit of the present invention. In this embodiment, the circuit operates in a similar manner as provided in FIG. 2 and FIGS. 2a–2f, however this embodiment further includes a phase lock loop circuit (PLL) 70 for controlling the frequency sweeper 22, and a flip-flop circuit 72 to time the input of a signal into C_Drive. As can be understood by the timing diagrams, if the 50% driving pulses of switches C and D are shifted to the right by increasing the level of CMP, an increase in the overlap between switches A,C and B,D is realized, thus increasing the energy delivered to the transformer. In practice, this corresponds to the higher-lamp current operation (as may be required, e.g., by a manual increase in the REF voltage, described above). Conversely, shifting the driving pulses of switches C and D to the left (by decreasing the CMP signal) decreases the energy delivered. The phase-lock-loop circuit 70 maintains the phase relationship between the feedback current (through Rs) and tank current (through TX1/C1) during normal operation, as shown in FIG. 3. The PLL circuit 70 preferably includes input signals from the tank circuit (C1 and the primary of TX1) signal 98 and Rs (FB signal, described above). Once the CCFL is ignited, and the current in the CCFL is detected through Rs, the PLL 70 circuit is activated which locks the phase between the lamp current and the current in the primary resonant tank (C1 and transformer primary). That is, the PLL is provided to adjust the frequency of the frequency sweeper 22 for any parasitic variations such as temperature effect, mechanical arrangement like wiring between the converter and the LCD panel and distance between the lamp and metal chassis of LCD panel that affect the capacitance and inductance. Preferably, the system maintains a phase difference of 180 degrees between the resonant tank circuit and the current through Rs (load current). Thus, irrespective of the particular load conditions and/or the operating frequency of the resonant tank circuit, the system finds an optimal operation point.

The operation of the feedback loop of FIG. 3 is similar to the description above for FIG. 2. However, as shown in FIG. 3b, this embodiment times the output of an initiating signal through C_Drive through flip-flop 72. For instance, during normal operation, the output of the error amplifier 32 is fed through the controlled switch block 38 (described above), resulting in signal 24. A certain amount of overlap between switches A,C and B,D is seen through comparator 28 and flip-flop 72 which drives switches C and D (recall D_Drive produces the complementary signal of C_Drive). This provides a steady-state operation for the CCFL (panel) load. Considering the removal of the CCFL (panel) during the normal operation, CMP rises to the rail of output of the error amplifier and triggers the protection circuit immediately. This function is inhibited during the ignition period.

Referring briefly to FIGS. 3a–3f, the triggering of switches C and D, through C-Drive and D_Drive, is, in this embodiment, alternating as a result of the flip-flop circuit 72. As is shown in FIG. 3b, the flip-flop triggers every other time, thereby initiating C_Drive (and, accordingly, D_Drive). The timing otherwise operates in the same way as discussed above with reference to FIG. 2a-2f.

Figure 4A:
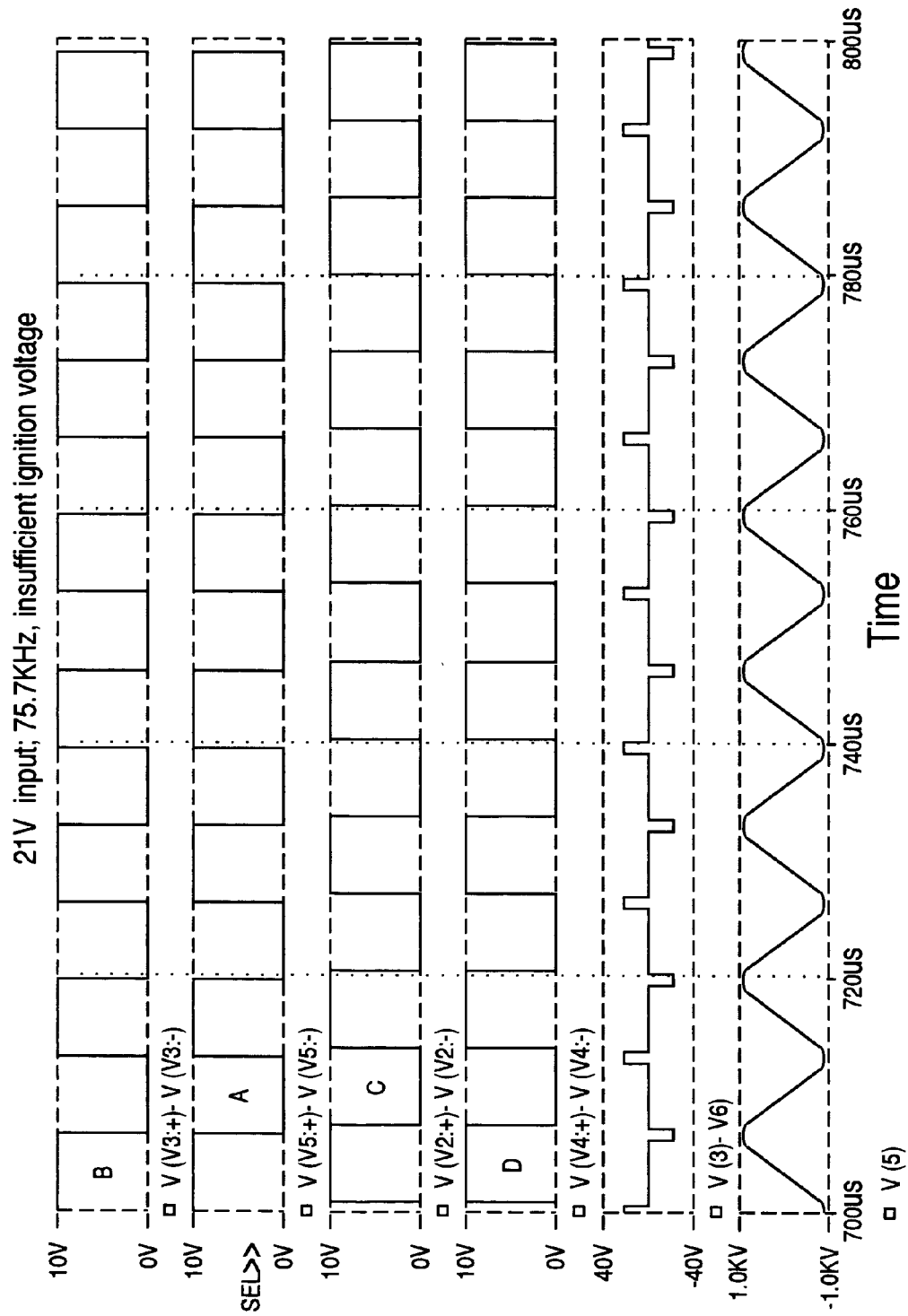
FIGS. 4a-4f depict emulation diagrams for the circuits shown in FIGS. 2 and 3.
Figure 4B:
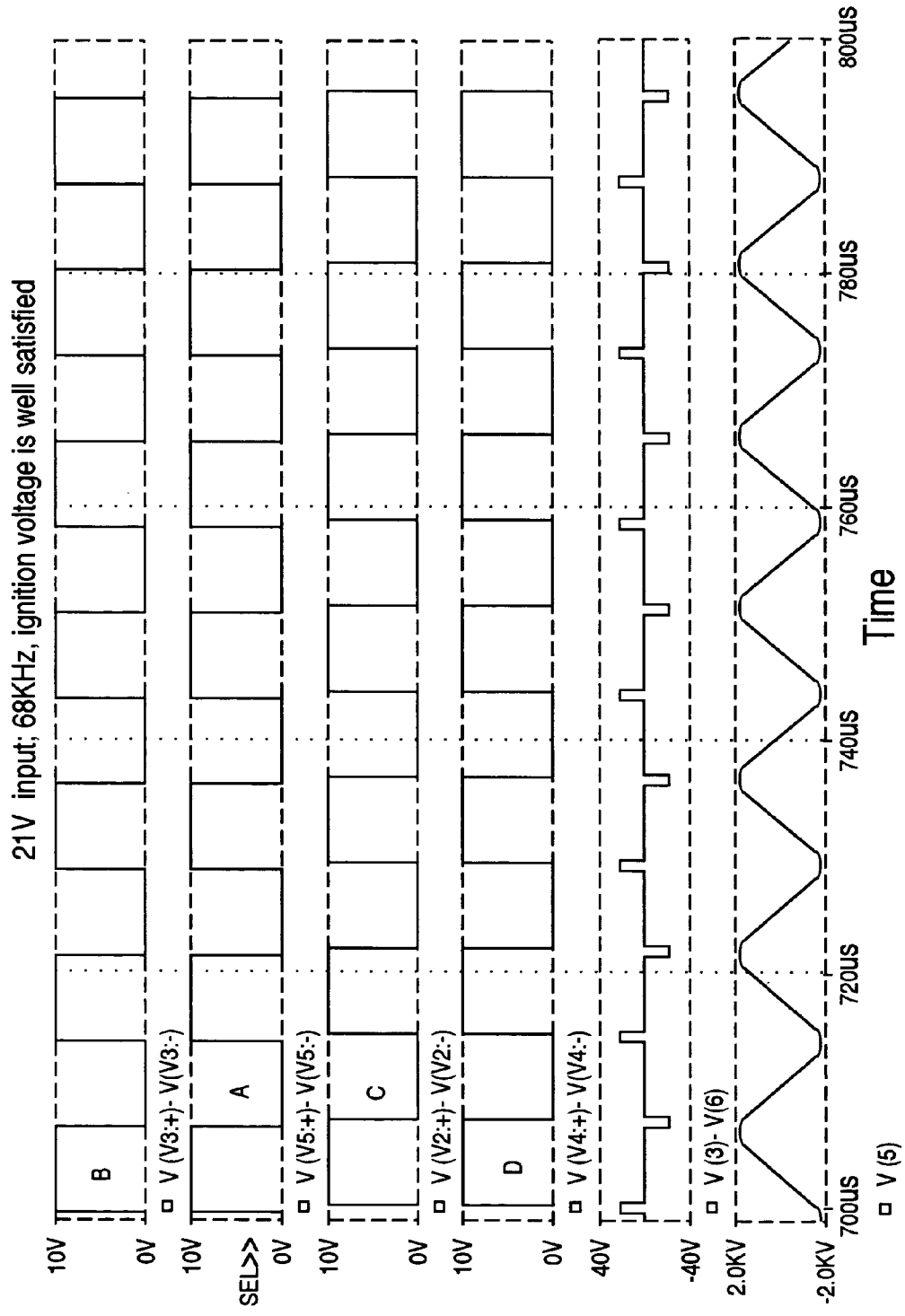
Figure 4C:
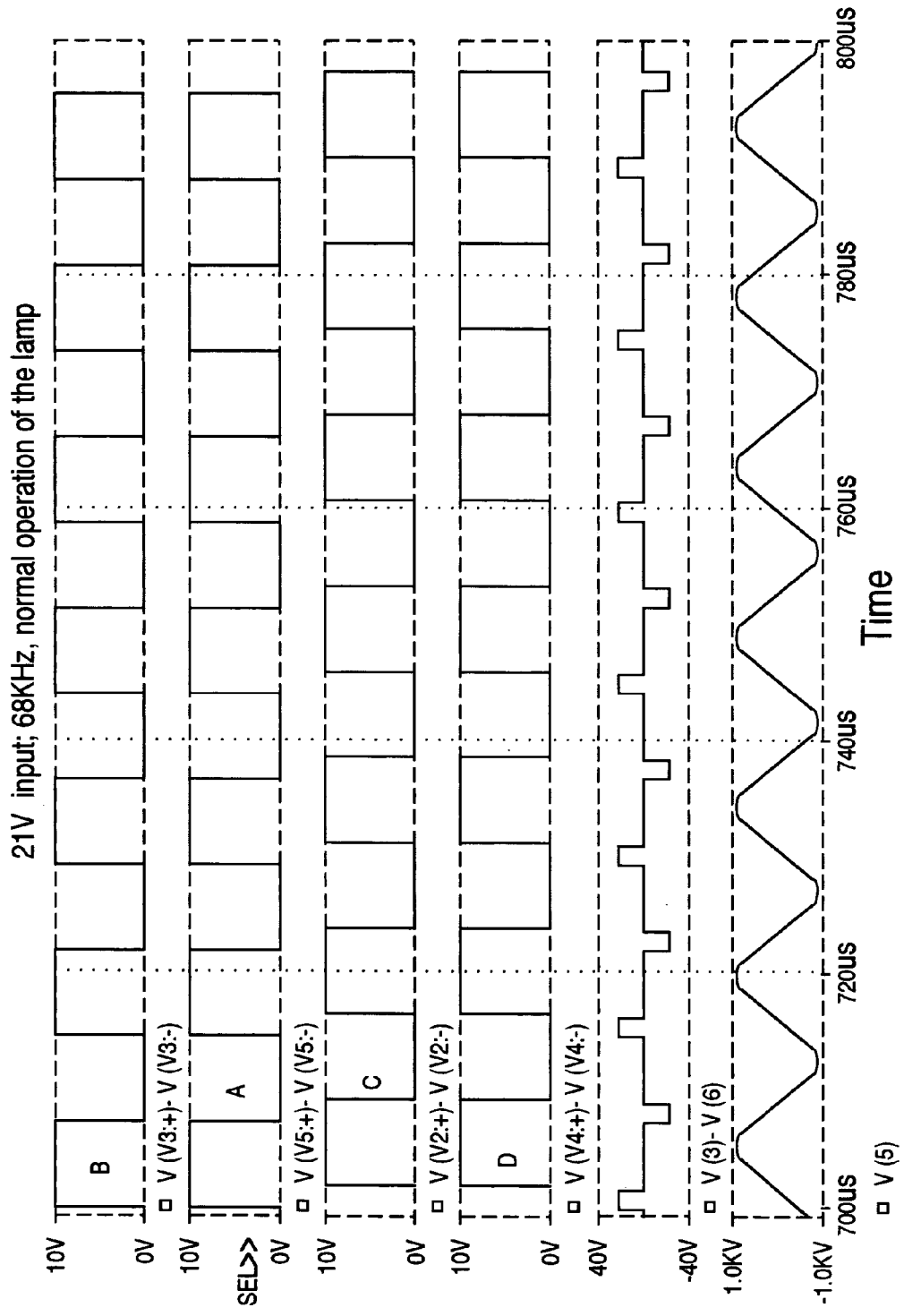
Figure 4D:
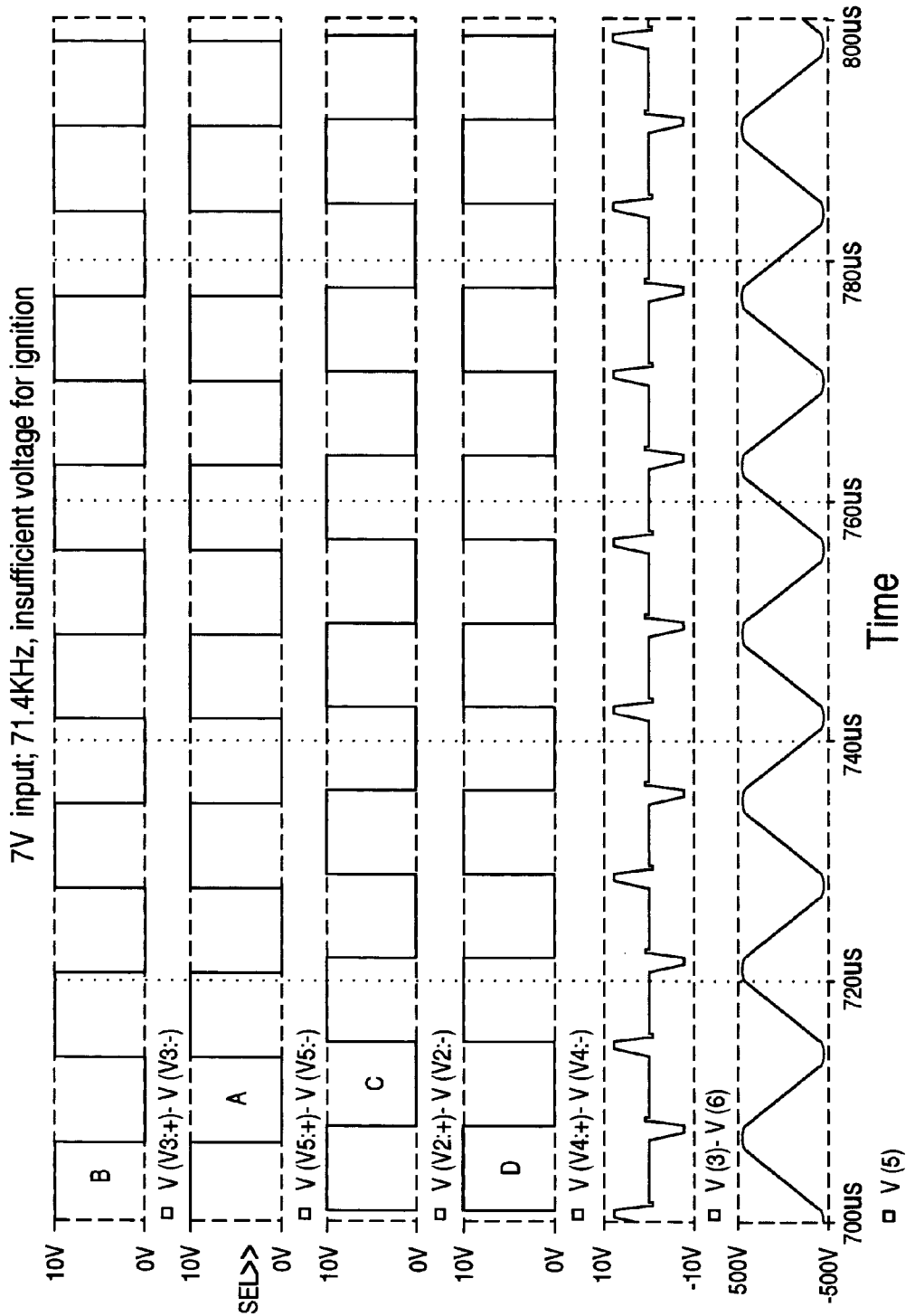
Figure 4E:
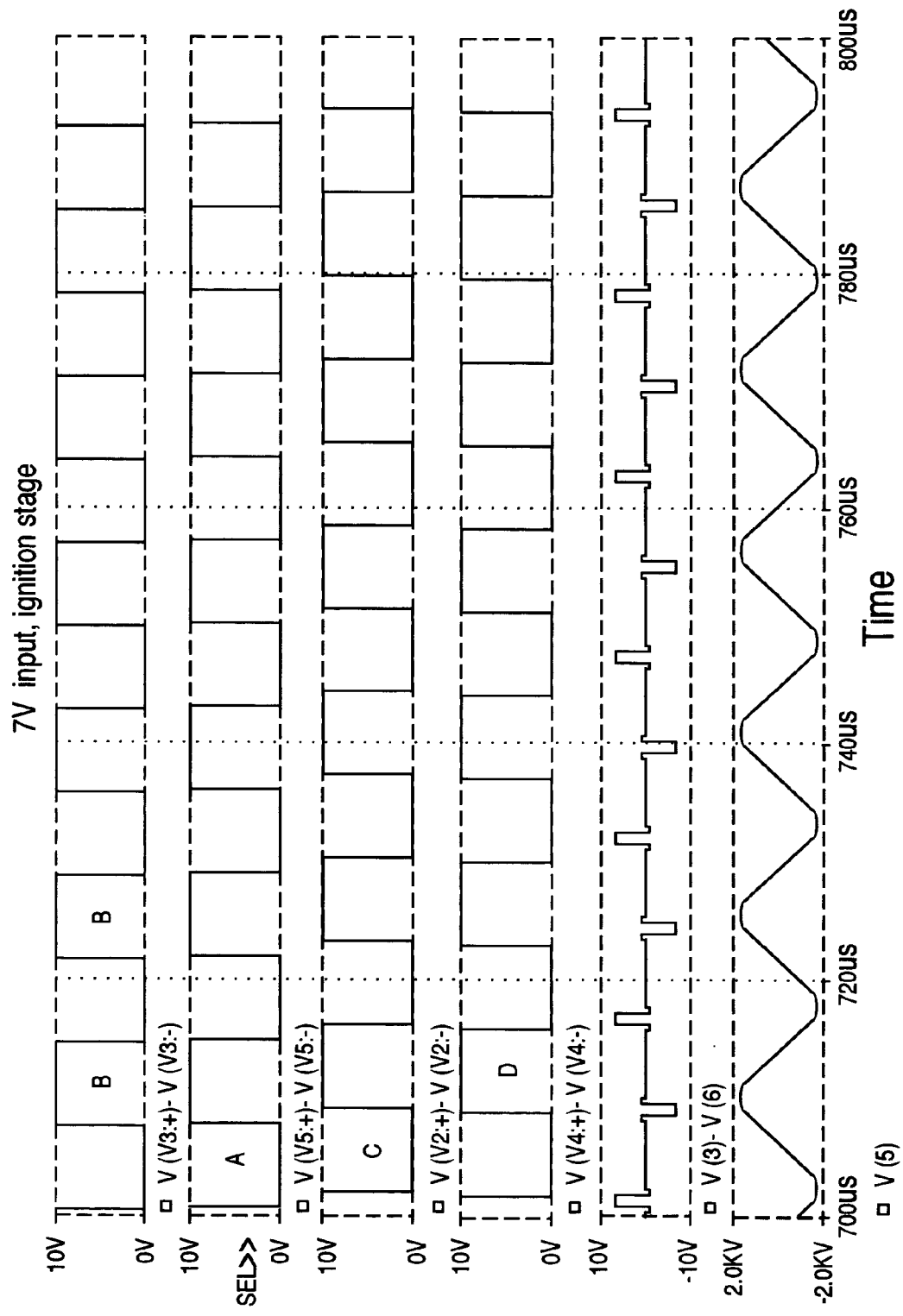
Figure 4F:
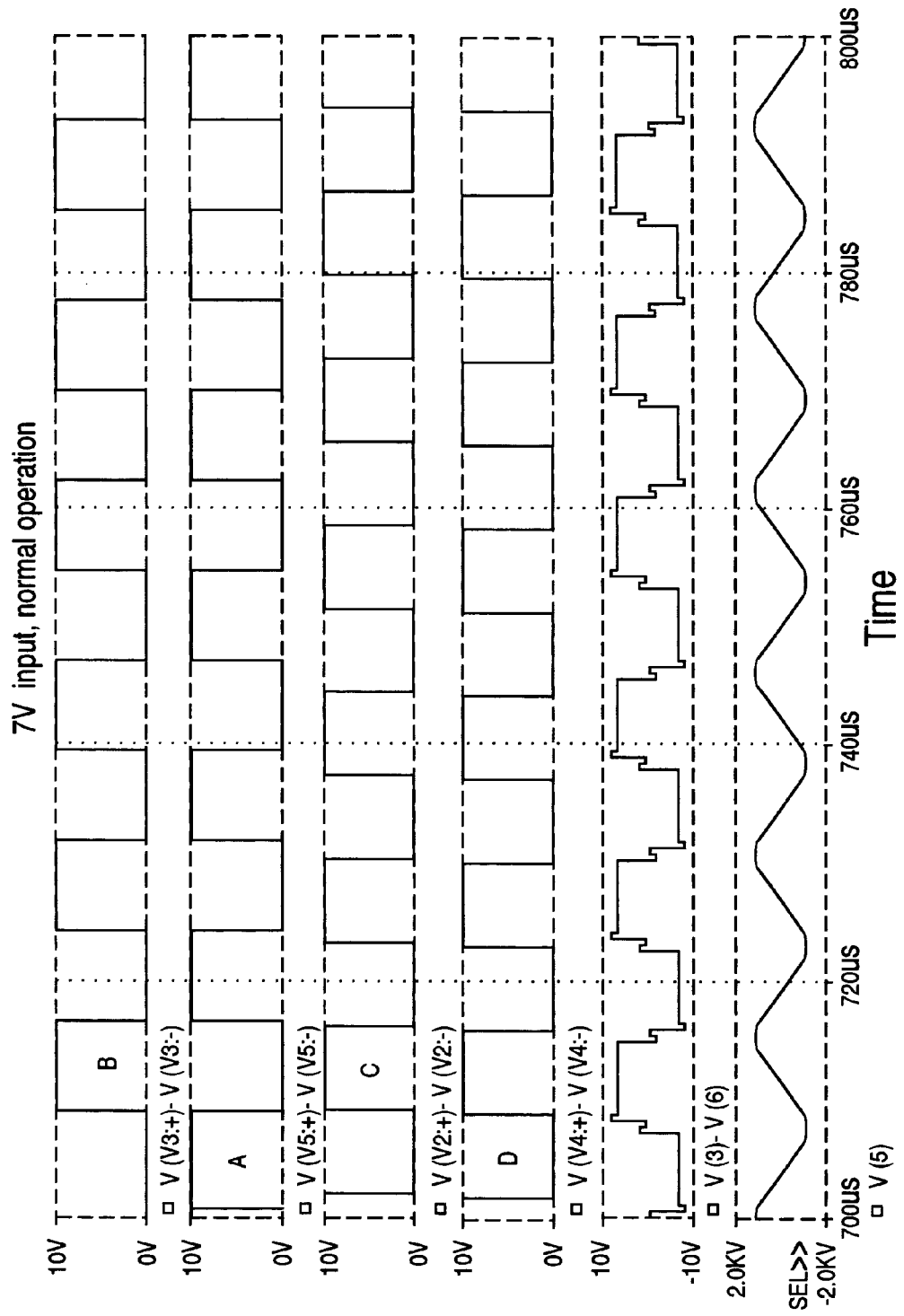

Referring now to FIGS. 4a–4f, the output circuit of FIG. 2 or 3 is emulated. For example, FIG. 4a shows that at 21V input, when the frequency sweeper approaches 75.7 KHz (0.5 us overlapping), the output is reaching 1.67 KVp-p. This voltage is insufficient to turn on the CCFL if it requires 3300 Vp-p to ignite. As the frequency decreases to say 68 KHz, the minimum overlap generates about 3.9 KVp-p at the output, which is sufficient to ignite the CCFL. This is illustrated in FIG. 4b. At this frequency, the overlap increases to 1.5 us gives output about 1.9 KVp-p to operate the 130 Kohm lamp impedance. This has been shown in FIG. 4c. As another example, FIG. 4d illustrates the operation while the input voltage is 7V. At 71.4 KHz, output is 750 Vp-p before the lamp is striking. As the frequency decreases, the output voltage increases until the lamp ignites. FIG. 4e shows that at 65.8 KHz, the output reaches 3500 Vp-p. The regulation of the CCFL current is achieved by adjusting the overlap to support 130 Kohm impedance after ignition. The voltage across the CCFL is now 1.9 KVp-p for a 660 Vrms lamp. This is also illustrated in FIG. 4f. Although not shown, the emulation of the circuit of FIG. 3 behaves in a similar manner.

It should be noted that the difference between the first and second embodiments (i.e., by the addition of the flip flop and the PLL in FIG. 3) will not effect the overall operational parameters set forth in FIG. 4a-4f. However, the addition of the PLL has been determined to account for non-ideal impedances that develop in the circuit, and may be added as an alternative to the circuit shown in FIG. 2. Also, the addition of the flip-flop permits the removal of the constant current circuit, described above.

Thus, it is evident that there has been provided a high efficiency adaptive DC/AC converter circuit that satisfies the aims and objectives stated herein. It will be apparent to those skilled in the art that modifications are possible. For example, although the present invention has described the use of MOSFETs for the switched, those skilled in the art will recognize that the entire circuit can be constructed using BJT transistors, or a mix of any type of transistors, including MOSFETs and BJTs. Other modifications are possible. For example, the drive circuitry associated with Drive_B and Drive_D may be comprised of common-collector type circuitry, since the associated transistors are coupled to ground and are thus not subject to floating conditions. The PLL circuit described herein is preferably a generic PLL circuit 70, as is known in the art, appropriately modified to accept the input signal and generate the control signal, described above. The pulse generator 22 is preferably a pulse width modulation circuit (PWM) or frequency width modulation circuit (FWM), both of which are well known in the art. Likewise, the protection circuit 62 and timer are constructed out of known circuits and are appropriately modified to operate as described herein.

Figure 5:
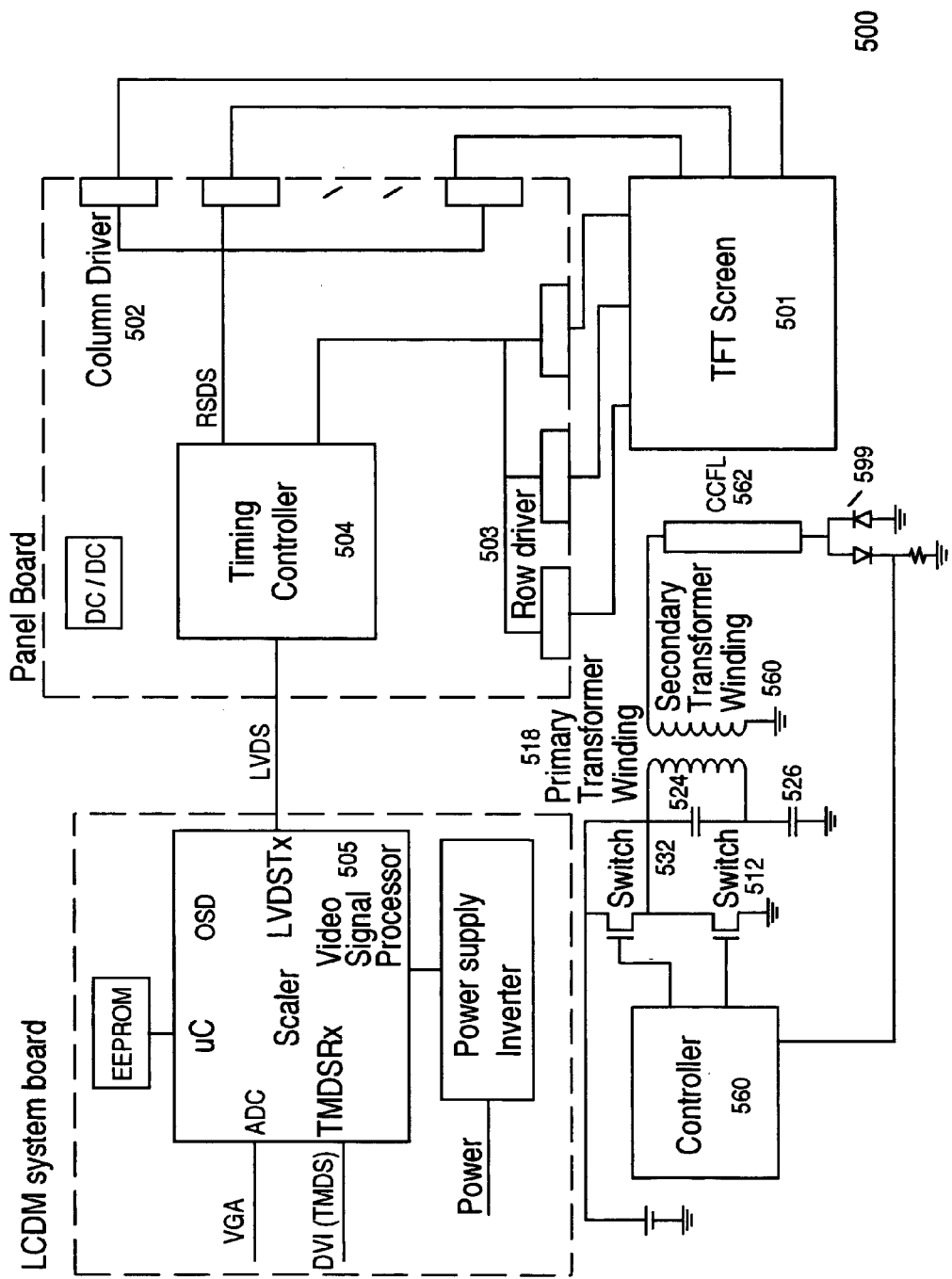
FIG. 5 illustrates a liquid crystal display system of an embodiment of the invention.

FIG. 5 illustrates a liquid crystal display system of an embodiment of the invention. Liquid crystal display system 100 comprises thin film transistor screen 501. Thin film transistor screen 501 is coupled to column driver 502. Column driver 502 controls columns on thin film transistor screen 501. Thin film transistor screen 501 is also coupled to row driver 503. Row driver 503 controls rows on thin film transistor screen 501. Column driver 502 and row driver 503 are coupled to timing controller 504. Timing controller 504 controls timing for column driver 502 and row driver 503. Timing controller 504 is coupled to video signal processor 505. Video signal processor 505 processes video signals. In an alternative embodiment, video signal processor 505 could be a scaler device.

Thin film transistor screen 501 is illuminated by display lighting system 599. Display lighting system 599 comprises cold cathode fluorescent lamp 562. Cold cathode fluorescent lamp 562 is coupled to secondary transformer winding 560. Secondary transformer winding 560 provides current to cold cathode fluorescent lamp 562. Secondary transformer winding 560 is coupled to primary transformer winding 518. Primary transformer winding 518 provides magnetic flux to secondary transformer winding 560. Primary transformer winding 518 is coupled to switch 532. Switch 532 allows current to pass through primary transformer winding 518. Primary transformer winding 518 is also coupled to switch 512. Switch 512 allows current to pass through primary transformer winding 518. Switch 532 and switch 512 are coupled to controller 550. Controller 550 provides pulse signals to control switching of switch 532 and switch 512. It will be appreciated that any controller described herein can be used for controller 550. It will also be appreciated that any display lighting system described herein can be used in lieu of display lighting system 599.

Figure 6:
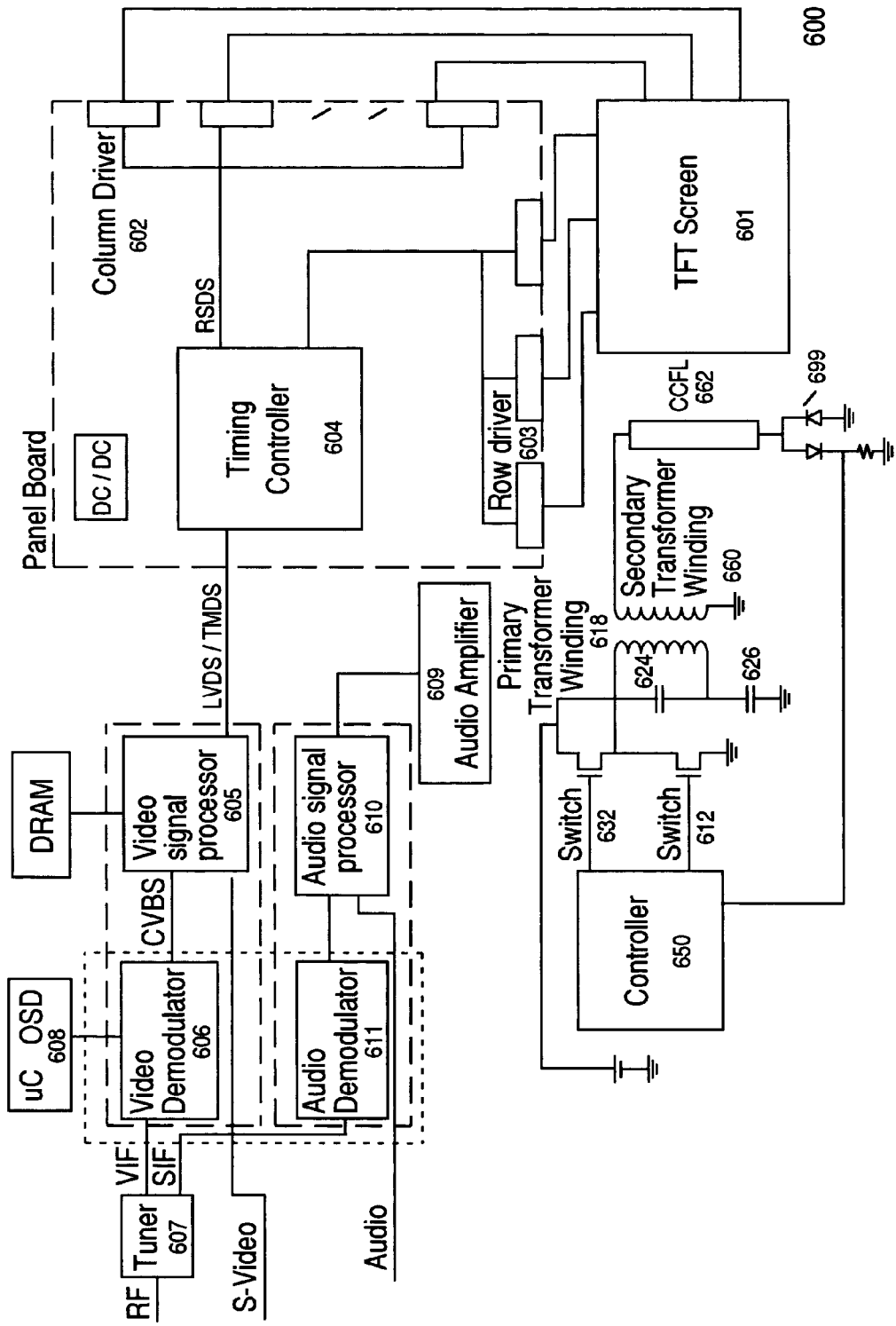
FIG. 6 illustrates a liquid crystal display system of an embodiment of the invention.

FIG. 6 illustrates a liquid crystal display system of an embodiment of the invention. Liquid crystal display system 600 comprises thin film transistor screen 601. Thin film transistor screen 601 is coupled to column driver 602. Column driver 602 controls columns on thin film transistor screen 601. Thin film transistor screen 601 is also coupled to row driver 603. Row driver 603 controls rows on thin film transistor screen 601. Column driver 602 and row driver 603 are coupled to timing controller 604. Timing controller 604 controls timing for column driver 602 and row driver 603. Timing controller 604 is coupled to video signal processor 605. Video signal processor 605 processes video signals. Video signal processor 605 is coupled to video demodulator 606. Video demodulator 606 demodulates video signals. Video demodulator 606 is coupled to tuner 607. Tuner 607 provides video signals to video demodulator 606. Tuner 607 tunes liquid crystal display system 600 to a particular frequency. Video demodulator 606 is also coupled to microcontroller 608. Tuner 607 is also coupled to audio demodulator 611. Audio demodulator 611 demodulates audio signals from tuner 607. Audio demodulator 611 is coupled to audio signal processor 610. Audio signal processor 610 processes audio signals from audio demodulator 610. Audio signal processor 610 is coupled to audio amplifier 609. Audio amplifier 609 amplifies audio signals from audio signal processor 610.

Thin film transistor screen 601 is illuminated by display lighting system 699. Display lighting system 699 comprises cold cathode fluorescent lamp 662. Cold cathode fluorescent lamp 662 is coupled to secondary transformer winding 660. Secondary transformer winding 660 provides current to cold cathode fluorescent lamp 662. Secondary transformer winding 660 is coupled to primary transformer winding 618. Primary transformer winding 618 provides magnetic flux to secondary transformer winding 660. Primary transformer winding 618 is coupled to switch 632. Switch 632 allows current to pass through primary transformer winding 618. Primary transformer winding 618 is also coupled to switch 612. Switch 612 allows current to pass through primary transformer winding 618. Switch 632 and switch 612 are coupled to controller 650. Controller 650 provides pulse signals to control switching of switch 632 and switch 612. It will be appreciated that any controller described herein can be used for controller 650. It will also be appreciated that any display lighting system described herein can be used in lieu of display lighting system 699.

Figure 7:
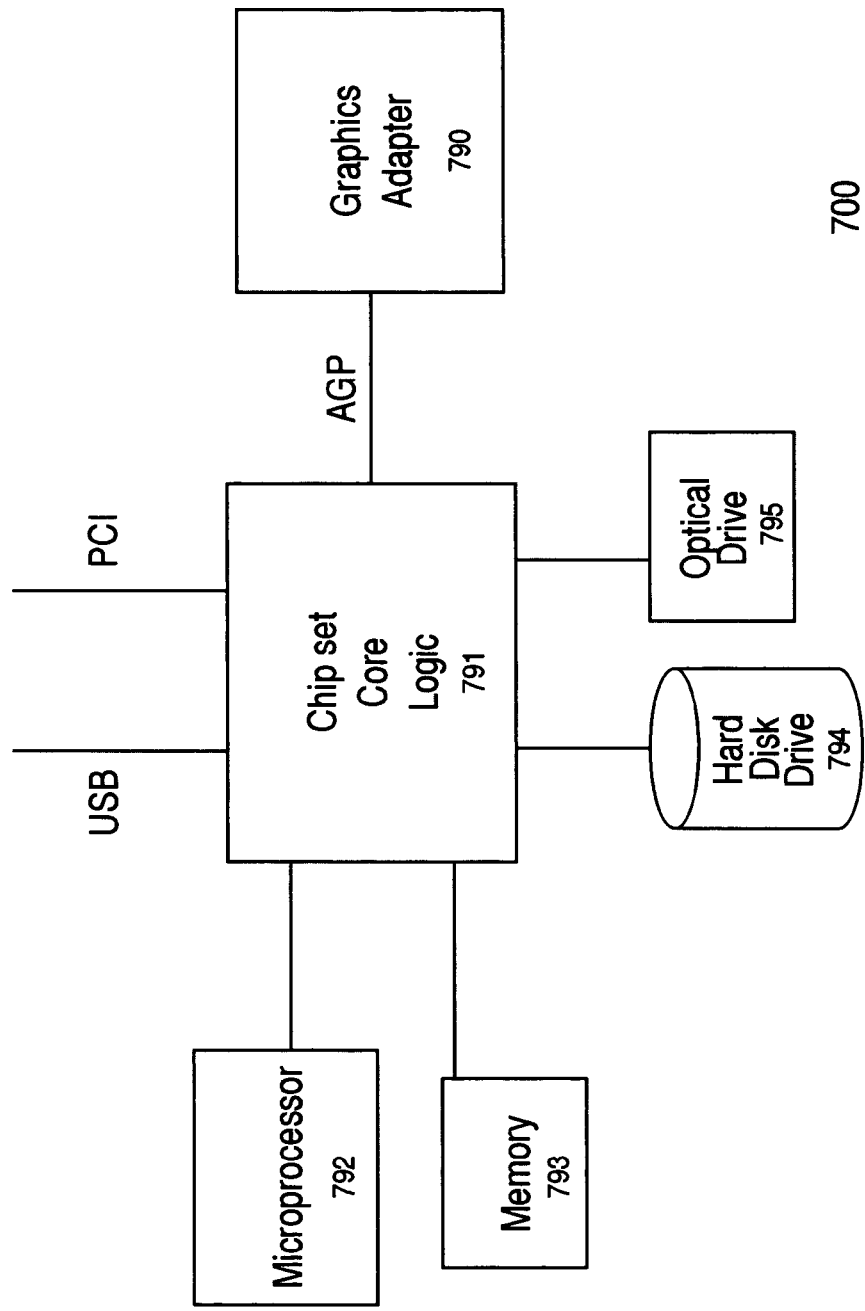
FIG. 7 illustrates a liquid crystal display system of an embodiment of the invention.

FIG. 7 illustrates a liquid crystal display system of an embodiment of the invention. Liquid crystal display system 700 comprises graphics adaptor 790. Liquid crystal display system 700 can also comprise the components of liquid crystal display system 500 described above and illustrated in FIG. 5 or can also comprise the components of liquid crystal display system 600 described above and illustrated in FIG. 6. Graphics adaptor 790 is coupled to a video signal processor which can be video signal processor 505 described above and illustrated in FIG. 5 or video signal processor 605 described above and illustrated in FIG. 6.

Graphics adaptor 790 is coupled to chipset core logic 791. Chipset core logic 791 transfers data between devices coupled to it. Chipset core logic 791 is also coupled to microprocessor 792. Microprocessor 792 processes data including video data. Chipset core logic 791 is also coupled to memory 793. Memory 793 can be random access memory and provides short term storage of data. Chipset core logic 791 is also coupled to hard disk drive 794. Hard disk drive 794 provides long term storage of data. Chipset core logic 791 is also coupled to optical drive 795. Optical drive 795 retrieves data from a CD-ROM or a DVD-ROM.

Figure 8:
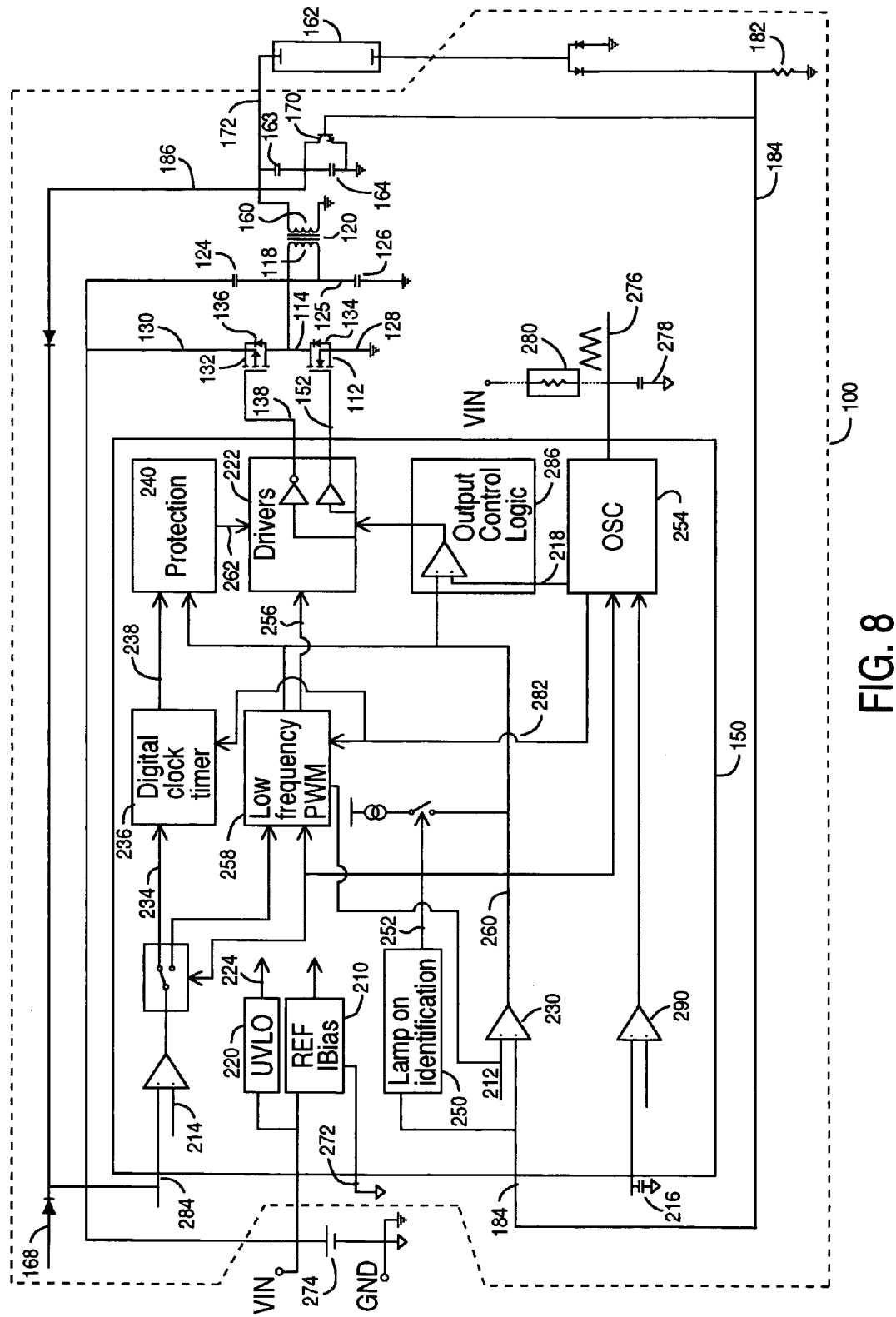
FIG. 8 illustrates a display lighting system of a liquid crystal display system of an embodiment of the invention.

Referring to FIG. 8, it depicts an embodiment of a switched-mode CCFL power supply 100 in accordance with the present invention.

The present invention is a switched-mode power supply for supplying energy to a cold cathode fluorescent lamp (CCFL).

The power supply converts a low, direct current (DC) voltage into a high, alternating current (AC) voltage that supplies to a CCFL.

The switched-mode power supply circuit includes a first switch having a source terminal, a drain terminal and a gate terminal. The drain terminal of the first switch connects to a primary winding of a step-up transformer. The secondary winding of the step-up transformer having a number of turns that is at least twenty times greater, and preferably fifty to one hundred-fifty times, than number of turns of the primary winding. The source terminal of the first switch connects to a power source.

A second switch also having a source terminal, a drain terminal and a gate terminal. The drain terminal of the second switch connects to both the drain terminal of the first switch and one end of the primary winding of the transformer. The source terminal of the second switch connects to a ground reference of a power source. The primary winding has a second end that is coupled to a center point of a two-capacitor divider. In this way, the two switches are connected in series, approximately evenly share the voltage input of the power source. The two capacitors are connected in series that is across the power source.

A controller circuit transmits control signals to the first and the second switches for alternately turning on the switches with 180 degree phase shift. While the first switch is turned on, a current flows through the first switch and through the primary winding of the transformer, in a referenced forward direction. When the second switch is turned on, the current flows through the primary winding of the transformer, in a reversed direction, and through the second switch.

The transformer is driven in both directions so that the flux swing around the core is utilized in both quadrants of the hysteresis curve associated with a transformer. In this way, it reduces the size of the core of the transformer and thus, the cost of the transformer.

Two capacitors form a capacitor divider that connects to one end of the primary winding of the transformer. Both capacitors are either being charged or discharged with current flowing through the primary winding of the transformer when each switch is turned on. The current charges the second capacitor while discharges the first capacitor when the first switch is turned on, and is reset when the first switch is turned off while the body diode associated with the second switch is conducting. The current flowing through the primary of the transformer is reversed when the second switch is turned on. The first capacitor is charging while the second capacitor is discharging with the direction of the current flow. After the second switch turns off, the current is picked up through the body diode of the first switch. If turn-on of the switches occurs while their associated body diode is conducting, the switches are turned on at essentially zero voltage across the switches. This zero-voltage-switching technique minimizes the switching loss of the switches. Therefore, the power conversion efficiency is increased.

The power supply 100 includes a controller 150, a first switches 112, a second switch 132, and a transformer 120 and is connected to a power source 274 for supplying power to a load, such as a CCFL 162 in a panel display, such as a liquid crystal display.

The first switch 112 can be a N-channel metal oxide semiconductor field effect transistor (MOSFET) gate-controlled switch and includes a drain terminal 114 which is connected to one end of a primary winding 118 of the step-up transformer 120. A second end 125 of the primary winding 118 is connected to the connection of a first capacitor 124 and a second capacitor 126. The source terminal 128 of the first switch 112 is connected to a ground reference of a power source 274. The second switch 132 can be a P-channel MOSFET gate-controlled switch. A drain terminal of the P-channel switch 132 also is connected to the drain terminal 114 of the switch 112. Both the switch 112 and the switch 132 include a body diode 134 and 136, respectively. Gate terminals 138 and 152 of the switches 132 and 112 connect to output terminals of the controller 150.

A secondary winding 160 of the step-up transformer 120 is connected to the CCFL 162. In contrast to the non-linear permeability of the saturable-core employed for the transformer in the prior art Royer circuit, a linear permeability core that does not saturate during the operation of the power supply circuit 100 is formed in the step-up transformer 120. The step-up transformer has the turns ratio at least 20:1, and generally ranges between 50:1 to 150:1.

The secondary winding 160 of the step-up transformer 120 is connected in parallel with two capacitors 163 and 164 that are connected in series. The capacitors 163 and 164 form a voltage divider to sense the voltage at the secondary winding 160 of the step-up transformer 120, and shape the rectangular wave at the primary winding 118 into a quasi-sinusoidal waveform for supplying to the CCFL load 162. During normal operation, the sensed voltage 186 is always reset by a switch 170 controlled by a current flowing through the CCFL 162. The function of the switch 170 will be disclosed in detail hereinafter.

The controller 150 can be a pulse-width-modulation controller for supplying a first gate drive signal 152 to the gate 152 of the switch 112 and a second gate drive signal 138 to the gate 138 of the switch 132. In addition to providing drive signals to the switches 112, 132, the controller 150 also provides other functions such as two distinct frequencies for CCFL striking and normal operation. A lamp-on identification circuit 250 in the control 150 is used to determine whether the CCFL 162 is turned on or not and to determine which one of the two frequencies will be outputted. During the ignition of the CCFL 162, the lamp-on signal 252 is de-asserted, and indicative of the electrical absence of the CCFL 162 which is not turned on. A first frequency is obtained at the oscillator 254 based on the signal 252. After ignition, a current flows through the CCFL 162 is detected. Therefore, the signal 252 will be asserted that indicates CCFL is turned on. A second frequency is obtained at the output of the oscillator 254. It should be noted that the lamp-on signal 252 also determines the output 256 of the low-frequency pulse width modulation (PWM) circuit 258. During ignition period, the signal 256 cannot interfere the waveform applied to the CCFL 162 to obtain a smooth ignition voltage. In other words, before signal 252 is asserted, signal 256 is negated of affecting the output control logic 286.

The controller 150 also includes lamp current and voltage sensing and control functions. Lamp current is sensed via sense resistor 182. The sensed value 184 is compared with a reference 212 through a comparator, such as an error amplifier 230 to control the turn-on time of the switches 112 and 132. Lamp voltage is sensed via the capacitor divider 163 and 164. The sensed value 186 is compared with a reference 214 through a comparator 232. The output 234 of the comparator 232 determines the start of the digital clock timer 236. After a period, such as one to two seconds, later than the start of the clock timer 236, if the output 234 is still de-asserted, the output signal 238 of the clock timer 236 asserts the protection circuit 240 to halt the operation of the switches 112 and 132. The period is used to provide an ignition time, for example one or two second, for the CCFL 162. Oscillator 254 provides two frequencies for the operation of power supply 100, a higher frequency for lamp ignition and a lower frequency for normal operation. The higher frequency can be 20–30% higher than the lower frequency. The lower frequency can be 68 kHz as described in FIG. 4b or 65.8 kHz as described in FIG. 4e or any value below either frequencies.

The low-frequency PWM circuit 258 is provided to generate the signal 256 for modulating the energy delivered to the lamp to achieve dimming control. The frequency of the signal 256 is preferably in the range of 150 Hz to 400 Hz. The lamp-on identification 250 receives the lamp current sensed signal 184 and the output signal 252 thereof is asserted to identify the presence or the ignition completeness of CCFL load 162. The protection circuit 240 receives signal 252 indicative of the presence of the CCFL 162, signal 260 indicates the presence of current sensed at the CCFL 162, and signal 238 is indicative of a time out of an open-lamp condition. Therefore, the output 262 of the protection circuit 240 can be asserted to halt the operation of the switches 112 and 132 when either an open-lamp, over-current, over-voltage conditions at the lamp 162 or under-voltage at the voltage input 130 occurs.

The controller 150 includes a ground pin 272 that electrically connects the circuit ground, and a voltage input pin 130 that connects to a DC voltage source. Within the controller 150, the voltage input pin 130 connects to a Reference/Bias circuit 210 that generates various reference voltages 212, 214 etc. for internal uses. The voltage input pin 130 is also connected to an under-voltage lock-out circuit 220 and the output driver 222. While the voltage supplied to the voltage input pin 130 exceeds a threshold, an output signal 224 of circuit 220 enables the operation of the rest of the controller 150. On the other hand, if the voltage at voltage input pin 130 is less than the threshold, the signal 224 will halt the operation of the rest of the controller 150.

In operating a CCFL, the dimming function of the CCFL and open-lamp function are inherently complementary. Advantageously, two signals 168 and 186 can be multiplexed so that both or the signals 168 and 186 are received at one pin 284 of the controller 150. The implementation reduces the cost of the controller 150.

A clock pin 276 of the controller 150 connects to oscillator 254 that connects a capacitor 278 to circuit ground or a resistor 280 to voltage input pin 130 for providing a clock signal at 276, preferably a ramp signal.

Advantageously, in the present invention, the power supply 100 utilizes the minimum number of connections of controller 150 to implement maximum functions needed for driving a CCFL load. The operation of the power supply can be described as follows.

Applying DC voltage VIN to the power supply 100. Once the voltage input at 130 is above a threshold set by under-voltage lockout circuit 220, the controller 150 starts the operation. The Ref/I-Bias circuit 210 generates reference voltages for the rest of the circuit in controller 150.

Since the CCFL 162 is not ignited and there is no current feedback signal 184 from the CCFL load 162, the oscillator 254 generates a higher frequency pulse signal. The driver 222 outputs a pulse-width-modulated drive signals 152 and 138 to both switches 112 and 132, respectively. The capacitor 216 is charged gradually, and thus the voltage 260 is increased gradually with time. The pulse width of the drive signals 138 and 152 increase gradually because the voltage at 260 increases gradually with time. Therefore, the power delivered to the step-up transformer 120 and the load 162 is increased gradually as well. The capacitors 124 and 126 are designed so that the voltage across each capacitor is approximately half of the input voltage. During the first half cycle, switch 132 is turned on, a current flows from power source to the primary winding 118 through switch 132. The current then flows into capacitor 126 and comprises magnetizing current and the reflected load current. While capacitor 126 is being charged, capacitor 124 discharges. When switch 132 is turned off, the current in the primary winding 118 continues to flow in the same direction. The diode 134 picks up the current flow. Switch 112 is turned on approximately 180 degree after switch 132 was turned on. The power source delivers current flow through capacitor 124 to primary winding 118, in a reversed direction to reference circuit ground 272 through switch 112. The current, which comprises magnetizing current and reflected load current, flows in a reversed direction. At the same time, capacitor 124 is being charged while capacitor 126 is being discharging. When switch 112 is turned off, the diode 136 supports the continuation of the current flow in the primary winding 118. Switch 132 is turned on approximately 180 degree after switch 112 was turned on. Cycle-by-cycle, switching operation continues. Therefore, the voltage across the primary winding 118 is a substantial rectangular wave.

Figure 9:
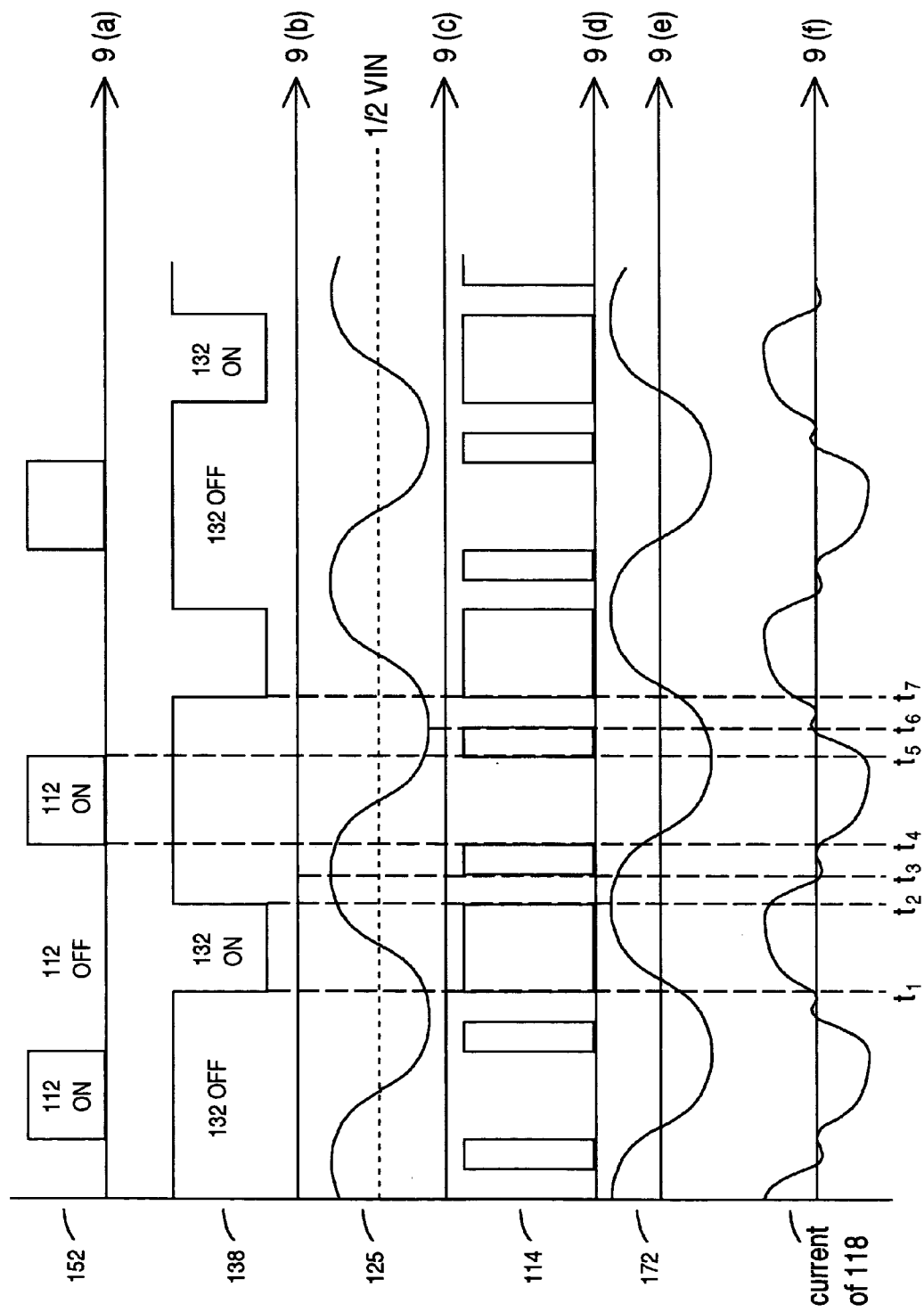
FIG. 9 illustrates waveforms of a liquid crystal display system of an embodiment of the invention.

Referring to FIG. 9, it illustrates the waveforms at the different terminals. FIG. 9(a) shows the drive waveform at 152. FIG. 9(b) shows the corresponding drive waveforms at 138. Note that the turn-on time of switches 112 and 132 are 180 degree apart. Of course, switches 132 can be altered to be a N-channel device. In this case, the drive signal 138 will be reversed in logic to represent ON/OFF drive signal. FIG. 9(c) represents the voltage waveform at 125. The small ripple superimposed on a DC voltage (half of the voltage input VIN) illustrates the charging and discharging of the capacitor 126. Subtracting input voltage VIN by the voltage at 125 yields a similar waveform representing the voltage across capacitor 124 that also has a small ripple superimposed of half of the input voltage. FIG. 9(d) shows the voltage at 114, while current flowing in the primary winding 118 is shown in FIG. 9(f). Note that when switch 132 is turned on at t1, voltage at 114 is near VIN. The current in the primary winding 118 flows in a referenced positive direction, that charges capacitor 126 while discharges capacitor 124. Therefore, the voltage at capacitor 126 increases (positive slope). At time t2, switch 132 is turned off. The current in the primary winding 118 continue to flow in the same direction but in a decreasing manner. Diode 134 picks up the current flow until the current reduces to zero at time t3. During t2 to t3 period, apparently the voltage at 114 is near zero. Since the current flows in the same direction, the voltage at capacitor 126 still increases. Momentarily after t3, a small amount of current is flowing in the reverse direction due to the reversed magneto-motive force in the primary winding 118, diode 136 conducts such that voltage at 114 reaches VIN plus the forward voltage drop of 136. At time t4, switch 112 is turned on. Voltage 114 drops to near zero while current in the primary winding 118 increases but in a reversed direction. Capacitor 126 discharges while capacitor 124 is being charged. Voltage at capacitor 126 is therefore decreased (negative slope). Switch 112 is turned off at time t5, diode 136 conducts and continues the current flow. Diode 136 ceases conduction when the current in the primary winding 118 reaches zero. At this moment, a small amount of current is flowing in the reference positive direction. In other words, diode 134 conducts such that voltage at 114 is near zero. This continues until the next cycle starts at time equals t7 where switch 132 is turned on again. The step-up transformer 120 has been driven in both directions that maximizes the uses of flux swing to provide power to the CCFL load. The step-up transformer 120, output capacitors 163, 164 and all parasitic reactive components associated with the secondary-side circuit of the transformer 120 form a tank circuit. The tank circuit selects out higher harmonic components associated with a rectangle waves present at the primary winding 118; yield a shaped, near-sinusoidal waveform at the CCFL 162. This is seen in FIG. 9(e). Note that depending upon the parasitic elements of the secondary winding 160 and the load 162, the waveform 172 may have different phase shift with respect to the waveforms shown in FIGS. 9(a)–9(d) and FIG. 9(f). The voltage at 172 is divided by capacitors 163 and 164. Therefore, capacitors 163 and 164 serve two purposes. One purpose is for voltage sense 186, the other purpose is for wave shaping.

When CCFL 162 is connected, the amount of current flowing through the CCFL 162 is detected by resistor 182. The sensed signal 184 is fed into a current amplifier 230 with compensation capacitor 216 connected at the output 260. The signal 260 is compared with a signal from the oscillator 254 and yields an output to control logic 286 to determine the turn-on time of the switches 112 and 132. One means of adjusting the amount of power delivered to the load is to apply a command signal 168 to an input 284 of the controller 150. The signal at 284 is converted through the low-frequency PWM circuit 258 for generating a low-frequency pulse signal to the output control logic 286 so that the driver 222 outputs 138 and 152 are modulated with the low frequency pulse signal, and thereby effectively controlling the amount of energy delivered to the CCFL 162.

During ignition period, the CCFL 162 behaves as an infinite-impedance device to the power supply circuit 100. Also, the CCFL 162 usually requires a predetermined turn-on voltage during this period. The power supply circuit 100 including capacitors 163 and 164 detects the voltage at the CCFL 162. The predetermined turn-on voltage is therefore scaled at signal 186 that transmits to an input 284 of the controller 150 for voltage regulation. The lamp-on identification circuit 250 generates a signal 252 indicative that CCFL 162 is not turned on. A signal 234 is asserted to initiate the digital clock timer circuit 236. Also, the signal 252 commands the oscillator 254 to generate a higher frequency suitable for striking the CCFL 162. During this period, the voltage at the CCFL 162 is regulated to the predetermined value. A signal 238 generated from the digital clock timer 236 approximately 1 to 2 seconds after the assertion of the signal 234. If the CCFL 162 is turned on before the assertion of signal 238, then the operation of the CCFL 162 continues as described in the above paragraph. If the CCFL 162 is not turned on (broken, not connected or loosely connected) the assertion of signal 238 initiates the protection circuit 240. A signal 262 of the output of the protection circuit 240 is generated to halt the operation of the driver 222 so that switches 112 and 132 are shut off. Since the CCFL 162 is not turned on during this period, no power being delivered to the CCFL 162, the power control command signal 168 is naturally ineffective to the operation of the power supply. In other words, when power supply circuit 100 performs the function of ignition of the CCFL 162, the dimming control of adjusting power to the CCFL 162 is negated. Also, during the normal operation, the voltage sense signal 186 is reset by device 170 so that it does not affect the dimming control of the CCFL. Therefore, the multiplexing function reduces the number of pins and thus saves the cost of the controller 150 and power supply circuit.

The oscillator circuit 254 generates pulse signals by connecting a capacitor 278 to reference circuit ground or a resistor 280 to voltage input. When connecting capacitor 278 to circuit ground, the oscillator circuit 254 sources and sinks current to and from capacitor 278. When connecting resistor 280 to voltage input, the oscillator circuit 254 sinks current from voltage input and resistor 280. The features of sink-and-source current or sink-only enables the differentiation of different control modes for adjusting power delivered to the CCFL 162. For a linear mode, to differentiate the low-frequency PWM mode as described previously, the power control command signal 168 commands and adjusts the power delivered to CCFL 162 without going through the low-frequency PWM circuit 258. The signal 168 and thus, 284 feeds through the low-frequency PWM circuit 258 to generate/over-write a reference signal 212 to the amplifier 230 when the oscillator circuit connects the resistor 280 to voltage input. The command signal 168 is thus directly commanding the amount of current feedback signal 184, adjusting the current flowing through the CCFL 162. In this mode of operation, the signal at 282 shuts off the low-frequency PWM circuit 258 and allows the signal 284 to feed through. Therefore, connecting resistor 280 or capacitor 278 to oscillator circuit not only generates pulse signals but also determines the control mode of power adjustment to the CCFL load 162—either in a linear control mode or in low-frequency pulse-width-modulation mode. Such design minimizes number of components used around the controller 150 while providing a high flexibility to the designers.

As described hereinbefore, the first switch 112 and the second switch 132 of the power supply 100 according to the present invention is controlled by the controller 150 and is alternatively turned on, such that the current pass the CCFL 162 alternatively in a first direction and a second direction and the power supply 100 converts the DC power source into the AC power for supplying the power to the CCFL 162.

Consequently, without departing from the spirit and scope of the invention, various modifications and/or alternative applications of the invention will be obvious be suggested to those skilled in the art after having read the preceding disclosure. Accordingly, it is intended that the following claims be interpreted as encompassing all modifications or alternative applications as fall within the true spirit and scope of the invention.

Other circuitry will become readily apparent to those skilled in the art, and all such modifications are deemed within the spirit and scope of the present invention, only as limited by the appended claims.

What is claimed is:

1. A liquid crystal display system comprising:
   a liquid crystal display panel;
   a cold cathode fluorescent lamp for illuminating said liquid crystal display panel;
   a secondary transformer winding coupled to said cold cathode fluorescent lamp for providing current to said cold cathode fluorescent lamp;
   a primary transformer winding coupled to said secondary transformer winding for providing magnetic flux to said secondary transformer winding;
   a first switch coupled to said primary transformer winding for allowing a forward-biased DC current to pass through said primary transformer winding;
   a second switch coupled to said primary transformer winding for allowing a reverse-biased DC current to pass through said primary transformer winding;
   a sense resistor electrically coupled to said cold cathode fluorescent lamp and electrically coupled to ground for providing a voltage feedback signal representing current through said cold cathode fluorescent lamp;
   a feedback control loop circuit coupled to said cold cathode fluorescent lamp and electrically coupled to said sense resistor for receiving a said voltage feedback signal and controlling power supplied to said cold cathode fluorescent lamp when said voltage feedback signal is above a predetermined threshold; and
an input selector pin coupled to said feedback control loop circuit for selecting between linear mode power control and pulse width modulation power control.

2. A liquid crystal display system comprising:
a liquid crystal display panel;
a cold cathode fluorescent lamp for illuminating said liquid crystal display panel;
a secondary transformer winding coupled to said cold cathode fluorescent lamp for providing current to said cold cathode fluorescent lamp;
a primary transformer winding coupled to said secondary transformer winding for providing magnetic flux to said secondary transformer winding;
 a first switch coupled to said primary transformer winding for allowing a forward-biased DC current to pass through said primary transformer winding;
 a second switch coupled to said primary transformer winding for allowing a reverse-biased DC current to pass through said primary transformer winding;
 a capacitor divider electrically coupled to said cold cathode fluorescent lamp for providing a first voltage feedback signal representing a voltage across said cold cathode fluorescent lamp;
 a first feedback signal line coupled to said capacitor divider for receiving said first voltage feedback signal from said capacitor divider representing said voltage across said cold cathode fluorescent lamp;
 a voltage detector coupled to said first feedback signal line for detecting said voltage across said cold cathode fluorescent lamp;
a voltage protection circuit coupled to said voltage detector to reduce power to said cold cathode fluorescent lamp when said voltage across said cold cathode fluorescent lamp exceeds a predetermined threshold;
a sense resistor electrically coupled to said cold cathode fluorescent lamp and electrically coupled to ground for providing a second voltage feedback signal representing current through said cold cathode fluorescent lamp;
a feedback control loop circuit electrically coupled to said cold cathode fluorescent lamp and said sense resistor and controlling power supplied to said cold cathode fluorescent lamp based on said second voltage feedback signal; and
an input selector pin coupled to said feedback control loop circuit for selecting between linear mode power control and pulse width modulation power control.

3. A liquid crystal display system as claimed in claim 2 further comprising:
a timer coupled to said voltage protection circuit to provide a time out period of predetermined duration when said first voltage feedback signal exceeds said predetermined threshold.

4. A liquid crystal display system comprising:
a liquid crystal display panel;
a cold cathode fluorescent lamp for illuminating said liquid crystal display panel;
a secondary transformer winding coupled to said cold cathode fluorescent lamp for providing current to said cold cathode fluorescent lamp;
a primary transformer winding coupled to said secondary transformer winding for providing magnetic flux to said secondary transformer winding;
a first switch coupled to said primary transformer winding for allowing a forward-biased DC current to pass through said primary transformer winding;
 a second switch coupled to said primary transformer winding for allowing a reverse-biased DC current to pass through said primary transformer winding;
 a feedback control loop circuit electrically coupled to said cold cathode fluorescent lamp receiving a feedback signal from a component electrically coupled to said secondary transformer winding to reduce power supplied to said cold cathode fluorescent lamp when said feedback signal indicates an open lamp condition; and
 an input selector pin coupled to said feedback control loop circuit for selecting between linear mode power control and pulse width modulation power control.

5. A liquid crystal display system as claimed in claim 1 further comprising:
a capacitor electrically coupled to said input selector pin and coupled to ground for selecting said pulse width modulation power control.

6. A liquid crystal display system as claimed in claim 5 further comprising:
an ignition circuit coupled to said feedback control loop circuit for providing lower amount of power to said cold cathode fluorescent lamp when said voltage feedback signal is below said predetermined threshold.

7. A liquid crystal display system as claimed in claim 5 further comprising:
an ignition circuit coupled to said feedback control loop circuit for providing a predetermined minimum amount of power to said cold cathode fluorescent lamp when said voltage feedback signal is below said predetermined threshold.

8. A liquid crystal display system as claimed in claim 1 further comprising:
a resistor electrically coupled to said input selector pin and coupled to an input voltage source for selecting said linear mode power control.

9. A liquid crystal display system as claimed in claim 8 further comprising:
an ignition circuit coupled to said feedback control loop circuit for providing lower amount of power to said cold cathode fluorescent lamp when said voltage feedback signal is below said predetermined threshold.

10. A liquid crystal display system as claimed in claim 8 further comprising:
an ignition circuit coupled to said feedback control loop circuit for providing a predetermined minimum amount of power to said cold cathode fluorescent lamp when said voltage feedback signal is below said predetermined threshold.

11. A liquid crystal display system as claimed in claim 2 further comprising:
a capacitor electrically coupled to said input selector pin and coupled to ground for selecting said pulse width modulation power control.

12. A liquid crystal display system as claimed in claim 2 further comprising:
a resistor electrically coupled to said input selector pin and coupled to an input voltage source for selecting said linear mode power control.

13. A liquid crystal display system as claimed in claim 2 wherein said predetermined threshold represents a value of said voltage across said cold cathode fluorescent lamp greater than a minimum striking voltage of said cold cathode fluorescent lamp and less than a rated voltage of said secondary transformer winding.

14. A liquid crystal display system as claimed in claim 3 wherein said predetermined duration is sufficient for ignition of said cold cathode fluorescent lamp when properly operating.

15. A liquid crystal display system as claimed in claim 14 further comprising:
a capacitor electrically coupled to said input selector pin and coupled to ground for selecting said pulse width modulation power control.

16. A liquid crystal display system as claimed in claim 14 further comprising:
a resistor electrically coupled to said input selector pin and coupled to an input voltage source for selecting said linear mode power control.

17. A liquid crystal display system as claimed in claim 4 further comprising:
a capacitor electrically coupled to said input selector pin and coupled to ground for selecting said pulse width modulation power control.

18. A liquid crystal display system as claimed in claim 17 wherein said feedback control loop circuit reduces power supplied to said cold cathode fluorescent lamp to a predetermined minimum amount when said feedback signal indicates said open lamp condition.

19. A liquid crystal display system as claimed in claim 4 further comprising:
a resistor electrically coupled to said input selector pin and coupled to an input voltage source for selecting said linear mode power control.

20. A liquid crystal display system as claimed in claim 19 wherein said feedback control loop circuit reduces power supplied to said cold cathode fluorescent lamp to a predetermined minimum amount when said feedback signal indicates said open lamp condition.

* * * * *